United States Patent
Skomra et al.

(10) Patent No.: US 9,456,302 B2
(45) Date of Patent: Sep. 27, 2016

(54) GEOSPATIAL ASSET TRACKING SYSTEMS, METHODS AND APPARATUS FOR ACQUIRING, MANIPULATING AND PRESENTING TELEMATIC METADATA

(71) Applicant: The Morey Corporation, Woodridge, IL (US)

(72) Inventors: Stewart A. Skomra, Poway, CA (US); Emil Sturniolo, Medina, OH (US); Robert N. Cichielo, Asbury, NJ (US); Andrzej Pienczykowski, Norwalk, CT (US); Mark Allen, San Mateo, CA (US); Julian A. Durand, San Diego, CA (US)

(73) Assignee: TeMeDa LLC, Chicago, IL (US)

( * ) Notice: Subject to any disclaimer, the term of this patent is extended or adjusted under 35 U.S.C. 154(b) by 0 days.

(21) Appl. No.: 14/295,030

(22) Filed: Jun. 3, 2014

(65) Prior Publication Data

US 2014/0357295 A1 Dec. 4, 2014

Related U.S. Application Data

(60) Provisional application No. 61/830,502, filed on Jun. 3, 2013.

(51) Int. Cl.
*H04W 24/00* (2009.01)
*H04W 4/02* (2009.01)
*G06Q 10/08* (2012.01)
*H04W 4/04* (2009.01)

(52) U.S. Cl.
CPC ............... *H04W 4/02* (2013.01); *G06Q 10/08* (2013.01); *H04W 4/04* (2013.01)

(58) Field of Classification Search
CPC ................ H04W 88/00–88/06; H04W 84/18; H04W 4/02; H04W 4/04; H04W 4/043; H04W 24/10; H04W 92/08; G06Q 10/0833; H04B 2001/71563
USPC ............... 455/404.2, 410, 411, 414.1, 414.2, 455/418–422.1, 456.1–457, 556.1–557, 455/569.1, 575.1–90.3
See application file for complete search history.

(56) References Cited

U.S. PATENT DOCUMENTS

| | | |
|---|---|---|
| 6,128,482 A | 10/2000 | Nixon et al. |
| 6,225,890 B1 | 5/2001 | Murphy |
| 6,232,874 B1 | 5/2001 | Murphy |
| 6,580,390 B1 | 6/2003 | Hay |
| 6,611,755 B1 | 8/2003 | Coffee et al. |
| 6,775,613 B2 | 8/2004 | Burt et al. |
| 6,812,832 B2 | 11/2004 | Lobaza et al. |
| 6,853,907 B2 | 2/2005 | Peterson et al. |
| 6,882,905 B2 | 4/2005 | Hall et al. |
| 6,892,131 B2 | 5/2005 | Coffee et al. |
| 6,950,638 B2 | 9/2005 | Videtich et al. |

(Continued)

OTHER PUBLICATIONS

International Search Report and Written Opinion of the International Searching Authority mailed Dec. 10, 2014, issued in corresponding International Application No. PCT/US2014/040738.

*Primary Examiner* — San Htun
(74) *Attorney, Agent, or Firm* — Nixon & Vanderhye P.C.

(57) ABSTRACT

A convenient, easy to use ubiquitous governance system to help manage and maintain the plurality of semi-autonomous devices that will be loosely coupled to and communicate via the Internet or other network, more commonly referred to as the network of things.

24 Claims, 41 Drawing Sheets

(56) References Cited

U.S. PATENT DOCUMENTS

| | | |
|---|---|---|
| 7,042,363 B2 | 5/2006 | Katrak et al. |
| 7,062,379 B2 | 6/2006 | Videtich |
| 7,113,860 B2 | 9/2006 | Wang |
| 7,142,099 B2 | 11/2006 | Ross et al. |
| 7,155,335 B2 | 12/2006 | Rennels |
| 7,224,805 B2 | 5/2007 | Hurst et al. |
| 7,227,499 B2 | 6/2007 | Fan et al. |
| 7,246,007 B2 | 7/2007 | Ferman |
| 7,302,371 B2 | 11/2007 | Oesterling et al. |
| 7,308,289 B2 | 12/2007 | Sychta |
| 7,356,304 B2 | 4/2008 | Zoeckler |
| 7,356,510 B2 | 4/2008 | Durand et al. |
| 7,406,321 B2 | 7/2008 | Beiermeister |
| 7,489,993 B2 | 2/2009 | Coffee et al. |
| 7,515,933 B2 | 4/2009 | Oesterling et al. |
| 7,526,284 B2 | 4/2009 | Gryc |
| 7,535,416 B2 | 5/2009 | Fan et al. |
| 7,760,077 B2 | 7/2010 | Day |
| 7,840,322 B2 | 11/2010 | Ross et al. |
| 7,877,275 B2 | 1/2011 | Ball |
| 7,920,944 B2 | 4/2011 | Gould et al. |
| 7,945,675 B2 | 5/2011 | Skomra |
| 8,149,850 B2 | 4/2012 | Krishnamurthi et al. |
| 8,200,736 B2 | 6/2012 | Shi et al. |
| 8,312,104 B2 | 11/2012 | Ramamurthy |
| 8,370,054 B2 | 2/2013 | Crady et al. |
| 8,423,791 B1 * | 4/2013 | Yu .................. H04L 63/1441 713/189 |
| 8,493,198 B1 | 7/2013 | Vasquez et al. |
| 8,494,710 B2 | 7/2013 | Harvie |
| 8,538,775 B2 | 9/2013 | Skomra |
| 8,595,302 B2 | 11/2013 | Krishnamurthi et al. |
| 8,600,932 B2 | 12/2013 | Poling et al. |
| 8,634,828 B2 | 1/2014 | Shi et al. |
| 8,639,245 B2 | 1/2014 | Shi et al. |
| 8,649,789 B2 | 2/2014 | Shi et al. |
| 8,713,140 B2 | 4/2014 | Videtich |
| 8,718,621 B2 | 5/2014 | Ross et al. |
| 8,738,214 B2 | 5/2014 | Olsen et al. |
| 8,811,969 B2 | 8/2014 | Shi et al. |
| 8,818,613 B2 | 8/2014 | Becker et al. |
| 8,918,232 B2 | 12/2014 | Lavi et al. |
| 8,983,752 B2 | 3/2015 | Harvie |
| 9,026,804 B2 | 5/2015 | Durand et al. |
| 9,043,402 B2 | 5/2015 | Fosburgh et al. |
| 9,060,245 B2 | 6/2015 | Baker et al. |
| 9,062,617 B2 | 6/2015 | Mauti, Jr. |
| 9,084,075 B2 | 7/2015 | Farley et al. |
| 9,197,984 B2 | 11/2015 | Kaufman et al. |
| 2002/0177476 A1 | 11/2002 | Chou |
| 2005/0046567 A1 * | 3/2005 | Mortenson ........... G06Q 10/047 340/539.13 |
| 2007/0188324 A1 * | 8/2007 | Ballin .................... G06Q 10/08 340/572.1 |
| 2008/0125965 A1 * | 5/2008 | Carani .................. G07C 5/008 701/408 |
| 2009/0088924 A1 | 4/2009 | Coffee et al. |
| 2010/0223090 A1 * | 9/2010 | Lozito .................. G06Q 10/08 705/333 |
| 2011/0205023 A1 | 8/2011 | Furey et al. |
| 2012/0038633 A1 | 2/2012 | Clark et al. |
| 2012/0322380 A1 * | 12/2012 | Nannarone ........ G08B 13/1427 455/41.2 |
| 2013/0116882 A1 | 5/2013 | Link, II et al. |
| 2014/0273961 A1 | 9/2014 | Narendra et al. |

\* cited by examiner

LOGO

| Product | Descrption | Quantity | Subscription | Cost |
|---|---|---|---|---|
| MT10 | • Wireless connectivity via cellular modem<br>• Location tracking via GPS receiver<br>• Motion Detection<br>• Over the Air Programming<br>• Battery Powered, Field Replaceable Internal Antennas<br>• Hardened, sealed enclosure designed to survive the harshest conditions | ▽ | 2 years ▽ | $xxxx.00 |
| MT15 | • MT15 description below...<br>• Location tracking via GPS receiver<br>• Motion Detection<br>• Over the Air Programming<br>• Battery Powered, Field Replaceable Internal Antennas<br>• Hardened, sealed enclosure designed to survive the harshest conditions | ▽ | 2 years ▽ | $xxxx.00 |

Total: $xxxx.00

Cancel    Checkout

FIG. 37

LOGO

Billing Information

First Name [ ] Last Name [ ]
Company [ ]
Address 1 [ ]
Address 2 [ ]
City [ ] State [▽] Zip [ ]
Country [▽]
Phone Number [ ]
email Address [ ]

☐ Ship To Billing Address

Shipping Information

First Name [ ] Last Name [ ]
Company [ ]
Address 1 [ ]
Address 2 [ ]
City [ ] State [▽] Zip [ ]
Country [▽]
Phone Number [ ]
email Address [ ]

Back    Next

FIG. 38

SHOPPING CART

| Product | Quantity | Subscription | Cost |
|---|---|---|---|
| MT10 | 50 | 2 years | $xxx.00 |

Tax $xx.00
Total $xxx.00

Credit Card Number [ ] Security Code [ ] What is the Security Code?

Month [ ] Year [ ]

Month

Back    Next

LOGO

FIG. 39

LOGO

Thank You for purchasing. You will receive email confirmation in your email account along with shipment tracking number.

| Product | Quantity | Subscription | Cost |
|---------|----------|--------------|---------|
| MT10 | 50 | 2 years | $xxx.00 |
| | | | $xx.00 |
| | | | $xxx.00 |

FIG. 40

Figure 41: Trusted Execution and Delegation
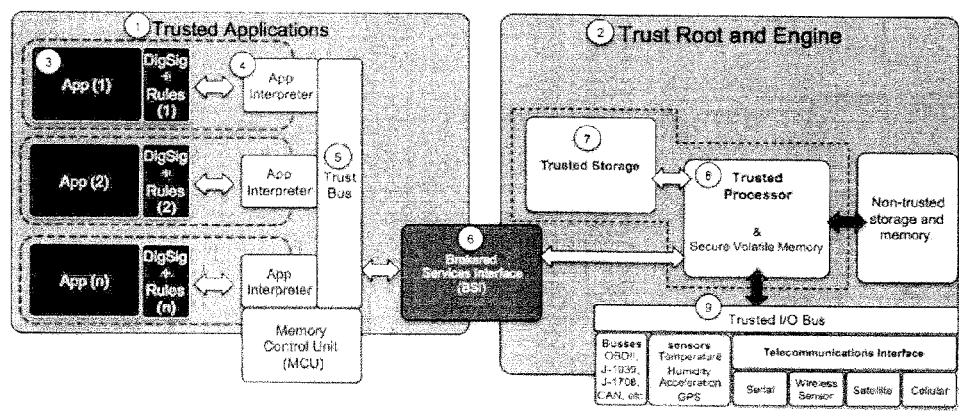

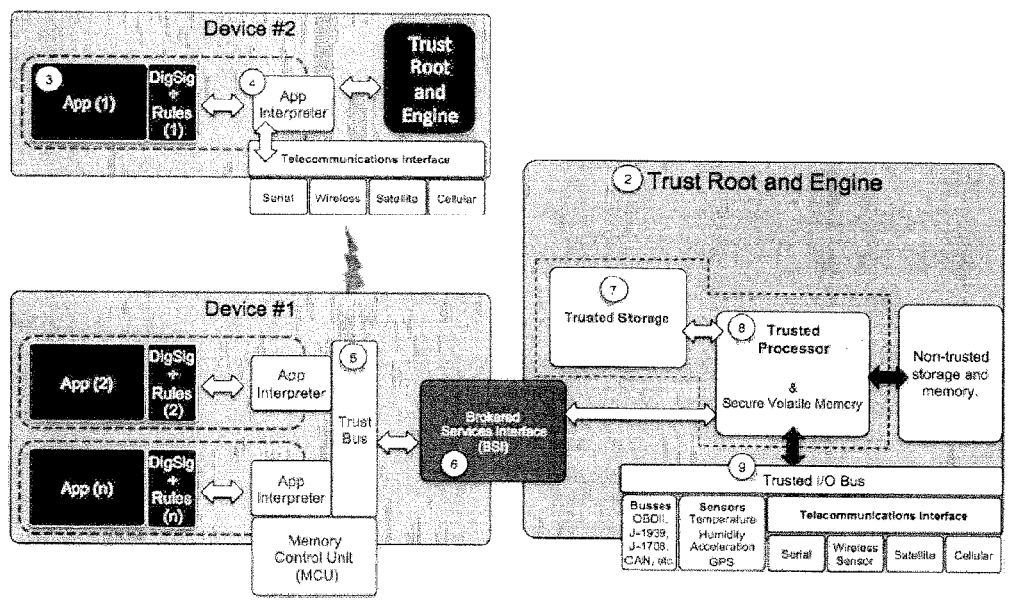
Figure 42: Trusted Execution and Delegation

GEOSPATIAL ASSET TRACKING SYSTEMS, METHODS AND APPARATUS FOR ACQUIRING, MANIPULATING AND PRESENTING TELEMATIC METADATA

CROSS-REFERENCE TO RELATED APPLICATIONS

This application claims the benefit of Provisional Application No. 61/830,502 filed Jun. 3, 2013, incorporated herein by reference.

STATEMENT REGARDING FEDERALLY SPONSORED RESEARCH OR DEVELOPMENT

None.

FIELD

The technology herein further relates to convenient, easy to use ubiquitous governance systems to help manage and maintain semi-autonomous devices that will be loosely coupled to and communicate via the Internet or other networks. As such, the technology herein relates to telematics, and more particularly to telematic and other systems and methods for securely tracking assets including but not limited to motor vehicles. However, this technology described here can more generally be applied to secure embedded computing abilities to cure and delegate authorized processes to other secure processes.

BACKGROUND

Wireless connectivity is now ubiquitous. People are wirelessly connected through their mobile phones, smart phones, tablets and numerous other devices and mechanisms. Yet, there are millions of "assets" that are not similarly connected. An "asset" can include any item or object of value. Motor vehicles, freight cars, trailers, containers, personal belongings, buildings, windmills, livestock, fuel tanks and certain persons are just some examples of assets, as is almost anything else that has sufficient value to justify keeping track of where it has been and/or what has happened to it. It would be highly desirable to provide an electronic presence for each of those fixed and mobile assets for purposes of tracking, chain of custody and other reasons.

Telematics has been used for some time to track the geospatial location of assets such as motor vehicles. One example fleet telematics solution offered by Networkfleet Inc. provides GPS fleet tracking, vehicle diagnostics, fleet maps, reporting, asset tracking, integration with external GPS devices, vehicle alerts and free roadside assistance. Compatible with light, medium, and heavy duty vehicles, the Networkfleet product line features two hardware devices. One device is GPS only, while another device connects directly to the vehicle's diagnostic port to continually monitor engine diagnostics. Both devices include a fast processor, built in accelerometer, and multi-port options. Both the GPS and cellular antennas are contained internally in the device, which can be expanded to offer a total of 6 sensors to monitor voltage events like PTO, secondary engine, door, and other in-vehicle devices. The serial port allows for integration with compatible external GPS type devices and also integrates with laptops and other devices. Remote vehicle diagnostics capabilities enable monitoring of diagnostic trouble codes, ignition status, speed, odometer, fuel efficiency and more. An additional "assert tracker" unit uses GPS technology to report location and movement for field assets like trailers, generators, heavy duty equipment or any valuable property. The battery life of this unit lasts up to three years, depending on the message configuration which can be customized. The unit features hardened, sealed enclosures to maintain maximum functionality in extreme weather conditions. Fleet managers using Networkfleet's online application can view assets equipped with the asset tracker unit on maps alongside vehicles in their fleet. Reports and alerts can be used to determine exact GPS location, if and when an asset has been moved, assets closest to a particular location or landmark, geofence violations and other information. See for example US20130116882 and www.networkfleet.com.

While such systems have been widely adopted and highly successful, further improvements are possible.

BRIEF DESCRIPTION OF THE DRAWINGS

Features and advantages of example non-limiting embodiments and implementations will be better and more completely understood by referring to the following detailed description of exemplary non-limiting illustrative embodiments in conjunction with the drawings of which:

FIGS. 11-40 show example non-limiting user interfaces; and

FIGS. 41-42 show example security architectures.

DETAILED DESCRIPTION OF EXAMPLE NON-LIMITING EMBODIMENTS AND/OR IMPLEMENTATIONS

Figure 1:
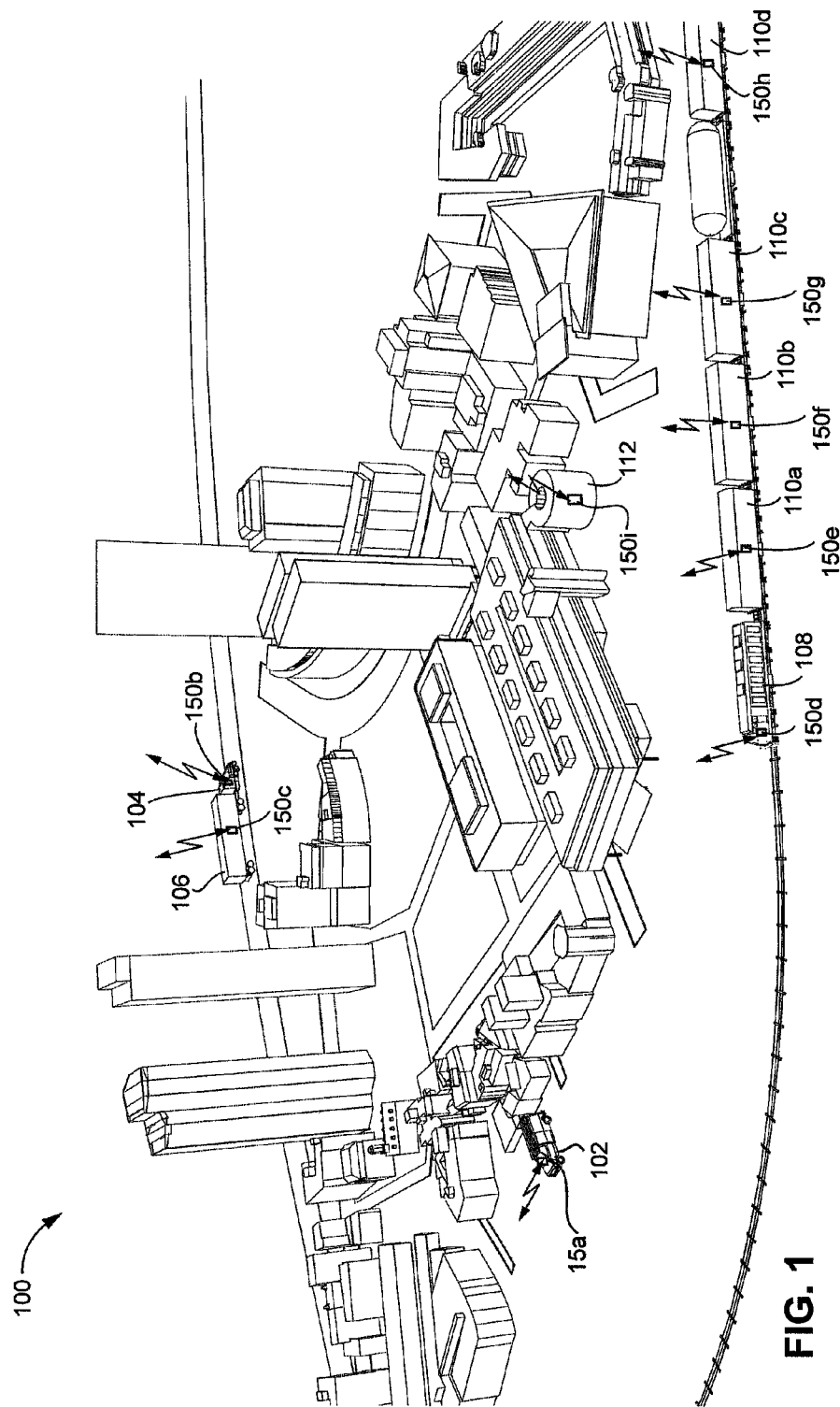
FIG. 1 illustrates a geospatial asset tracking system such as the TEMEDA™ tracking system, monitoring several different types of assets over a geographical area.

In the past, the price of telematics devices and the price of ongoing services can be high. Additionally, currently offered solutions are relatively complex in terms of what it takes to acquire data and do something with it, such as transmit, store and then retrieve and present data when the system user wants the way he or she wants it. It is not generally or always possible to predetermine how a customer will perceive value. Even within a particular customer, there are different perceptions of value and different perspectives. Customers may think they know what they want in such a system, but design based on what customers think they want can often result in undue complexity and higher cost. One desirable approach of non-limiting embodiments is to create a market not by giving customers what they want, but by giving them what they need, while still allowing flexibility in a system for growth and change.

For example, it would be desirable in some example embodiments to provide an example non-limiting system and solution that can grab or acquire any data elements from any time in the past that could develop meaningful information to any customers now.

It would also be desirable in some example embodiments to provide a system wherein the primary human-machine interface for field units such as in-vehicle devices is a smartphone or the like and where presentation information is presented in such a way as to be optimized for such presentation.

It would also be desirable in some example embodiments to provide a way to remediate a device when something goes wrong with it. As price point continues to erode and the number of devices increase significantly, service for a faulty device is likely to be cost-prohibitive. This makes it desirable to build recovery capability into the device itself.

It would also be desirable in some example embodiments to forward-integrate through data service and secure device management to turn the value chain over to the recipient. It would also be desirable to backwards-integrate through development planning, demand generation and demand fulfillment.

It would also be desirable in some example embodiments to provide standards and regulation compliance, telecommunications, hardware and software that enables a customer's solution and helps manage customer and end user expectations, driving and sustaining momentum while providing low barriers to entry for even the smallest customers and fleets.

It would also be desirable in some example embodiments to provide a telematics system that establishes a secure binding between (a) a telematics device installed in or on the asset; and (b) an associated user using (c) an interface device, for purposes of tracking chain of custody of the asset. Such chain of custody information can be valuable for keeping track of where the asset has been and what conditions it has been exposed to.

While several activity monitoring and management systems are already deployed in the field, decision makers are often on the revenue side. "Assets" typically have long useful lives. Devices used to protect, track, monitor and otherwise interact with assets also need to last a long time. A telematics or other monitoring device desirably in some example embodiments will outlast a fleet vehicle (which generally is turned over every 3-5 years), will be rugged and will mask complexity to the customer. Furthermore, the system will desirably in some example embodiments support the people operating the equipment to enable them to deliver people, services or products to their customers or otherwise. These people are, generally speaking, very interested in making sure that what someone bought has been delivered and can be efficiently invoiced. A smart handheld device such as a smartphone or the like can be used in some example embodiments for the human interface to help provide an information model providing end-to-end processing from data reporting to invoicing.

It would be further desirable in some example embodiments to provide a function to pull asset management as well as transaction processing data from a device(s) monitoring the asset so as to provide "asset management" for "free".

Such systems in some example embodiments will desirably provide basic information such as what, where, when (i.e., track and trace) as well as serving the needs of those running the business to deliver people, services and items to end customers. For example, time/location/velocity can be communicated in some example embodiments to a data center which can also provide feedback for dispatch. Such functionality desirably in some example embodiments can be used to help mobile operations make and save money, increase revenues, contain and reduce costs, improve safety and security and ensure regulatory compliance. Advanced reporting (e.g., just in time job operation) can desirably in some example embodiments be used to provide information based on gathered/monitored data in a way such that subscribers can get the information on their smartphone, desktop or any other convenient device.

Example Non-Limiting Feature Set of Example Non-Limiting Embodiments and/or Implementations Additional example non-limiting features and capabilities in some example embodiments can include any or all of the following or any combination thereof:

Multiple power arrangements

Multiple wireless capabilities

Ability to communicate with an in-vehicle electronic bus and get information

Useful with a whole range of assets, including non-powered and powered

Address heretofore unserved parts of the market

Logging (miles, fuel)

Track and trace diagnostics vehicle navigation (turn-by-turn navigation and mobile directions)

Asset utilization; asset may be a "container" used to deliver people/products/services Dynamic scheduling and dispatch chain of custody (e.g., where the asset has been, where it is now, what has happened to it, who has interfaced with it)

Remediation mechanism that allows the system to bring devices back to a known condition Programmability including OTAP Offer integrated scheduling and dispatch Managed adaptable trust engine highly user customizable easy to provision and activate Programmable on the fly Use of data about telematics data for delivering resilient networking rugged hardware/item of manufacture software as an extension can interface with a vehicle or other signal and/or control bus to receive and process signals provided by the "asset"; show vehicle data from the bus on a user interface "breadcrumb trail"

can provide a local area mesh or peer-to-peer sensor node network monitored and controlled by wireless WAN communication hub; such network enables e.g., temperature monitoring throughout for example the cab and trailer of a tractor-trailer combination; light detection to alert when and where the trailer has been opened; in addition to measurement of other environmental factors including but not limited to humidity, radiation, carbon monoxide, other.

"track and trace": monitor geospatial location of assets, their condition, speed, and assets that have either already left a location or entered one or to provide warning prior to entering or leaving a location Can monitor driving patterns including speeding, fast starts, sudden stops, excessive idle zone, battery level, speeding alerts Communication through a common interface Any kind of connectivity—any network transport can be used AAA: access authentication Geolocation—lat/long for google or other map lookup API that allows integration with any third party "curation"—friendly application environment permitting applications that meet device policy but barring applications that do not by means of e.g., a digital signature for identification of authentication and integrity of said applications End to end security—from trusted mobile entity all the way to the end customer-user—on both ends. That is, the operator with custody of the device in the field is authenticated to the system as is the operator/dispatch manager at the web based console The mobile entity is itself "tamper-evident" and "tamper-resistant" with ability to transfer intrusion information to the service including "last gasp" power capability in case power is disconnected Scripting engine, separate from operating system Specific policies may be applied that bring together input data from various environmental sensors combined with both the space and time for the asset Dynamic delegation enables devices that are bonded in a trusted fashion to share resources. For instance, if the cellular connection in the tracking device fails, it may make use of the cellular connection in the bonded smartphone. Devices may share certificates issued by a common Certification Authority (CA), with policy and hierarchy tables. Policy tables indicate the functions they are capable of, functions they may receive a delegation request for and finally the condition that will permit the requesting device to delegate a function to the performing device. Hierarchy tables detail the direction of delegation, and the granular permissions associated with each function.

Telematics hardware device mechanically securely fixed or otherwise bound to the "asset"

Device is securely virtually "bound" to a human who is currently associated with the asset Relationship between this device and the human will establish a trust bond Device constitutes an intelligent agent that will serve the system Entity that establishes credentials—based on context (where, when) it will serve.

Authenticated audit log of time and space. A spatial time stamp in the form of latitude, longitude, and altitude is combined with a time and date stamp. Sensory elements are included, including data from the vehicle bus, radio signal strength and other environmental sensors. These elements are digitally signed using the system private key. The log ensures data integrity and authenticity of origin.

A program running in these devices makes them appear to be an appropriate device; the person authenticates, and then his or her identity is used for security.

Intelligent Communicating entity bindable to an asset (e.g., could be hardware mechanically fixable to the asset, or a secure software entity that is authenticated to a user)

Trusted Intelligent Agent executes on the trusted entity

Agent gathers information from a sensor that monitors the asset (e.g., geolocation, operation and/or condition of the asset e.g., vehicle bus, biometrics of the user)

Binding/trust bond of asset to asset. Each device has an immutable, permanent, statistically unique identifier. This UID is exchanged in the establishment of the trust bond. Each device has a table that lists other UIDs that is bonded to it. This data is protected from modification by signing the information ensuring authenticity and data integrity.

Binding or trust bond between the user and the user's device; between the user's device and the asset's device; and between the user and the asset's device. In this case, the UID of the user is the fingerprint of the biometric. As in the asset to asset case above, the biometric fingerprint is signed and protected. As required, or on a periodic non-intrusive collection the device will assess the relevant biometric fingerprint of the human in proximity to the device and compare to the one that is stored in protected storage.

Enables system to continually securely monitor geospatial location, environment and interactions (e.g., chain of custody) of the asset over time Proximity-based binding based on overlapping geofences. The GNSS sensor in each device establishes a spherical, configurable geo fence of radius X. With an overlap of a configurable amount, Y % of the two geofence circles an assumption of proximity may be concluded. Another case is one where neither device has a GNSS sensor. Proximity may be concluded using Return Signal Strength Indicators (RSSI). At a specific signal strength or higher, it may be concluded the devices are in proximity. GNSS sensors with geofences may be combined with a non GNSS enabled device to enable a hybrid method of proximity detection.

Use of a user's own device sensors to create a trust bond with the embedded device Telematics entity can be remotely securely dynamically updated/maintained/extended Can leverage the user interface of an external device (e.g., smartphone)

Hardware pre validates the software environment as the first step of the power on self-test Once the trusted environment is operational, continual validation is performed after-the-fact for health and sanity check.

Devices receive signatures of known infected devices. If a device comes into contact with one of these infected devices, it broadcasts the UID of the infected device to all conforming devices in proximity and also informs the back-end system. It will include additional identifying metadata, for example, the location of the infected asset, any unique identifiers, what radio bearers they have in operation etc.

Devices may also be able to detect if another device is infected based on conformance to policies. A device violating polices encapsulated in code on the healthy device will be identified as a candidate for an infected device. It will prompt a closer inspection by the backend system.

Device not acting in accordance with a described healthy device can be quarantined—conforming devices will not communicate with a quarantined device—and then remediated by a side channel that can be reinitialized in accordance with secure mechanism to bring the device back to life.

A defensive node can be transformed into an offensive mode (using the system to disrupt an existing infrastructure). The system becomes the attacker rather than one susceptible to attack.

Frequency analysis and correlation on an engine or class of engines, based on rpm and other attributes; correlate to vehicle to identify undocumented OBD (on board diagnostic) or other vehicle (asset) bus codes.

Dynamic definition of behavior of the device based on a set of facts from an asset to define an agent that is going to take an action. Use of historical data to generate an alert to detect variance between planned and actual.

Self-remediation and propagation of instructions to self-diagnose and peer-diagnose; one device is granted the ability by policy to remediate other devices within its proximity Alerts generated by the embedded device to indicate the device needs remediation Downloading a plan to an embedded device in real time. Plan can include navigational route, preset threshold limits for sensor readings at specific locations. For example, vehicle speed threshold will be different in different geographical regions (e.g., driver safe driving may have tighter tolerances in schools zones). For example, threshold limits can be set for each and every sensor (camera, light, microphone, accelerometer, radio signal strength) etc. Logic for the integrated threshold values may be validated at each geo-spatial node on a route. For example, at position x, at time y, accelerometer readings should be within these particular parameters, the driver should be person Z as authenticated by voice (microphone), iris (camera) and perhaps also a key transmitted in light pulses from his/her smartphone to telematics device.

Customer can receive in one monthly price device, software solution (hardware as a service) which includes data services—low barrier to entry because hardware is a service Integration of novel STAGE architecture to pump into other third party systems High degree of granularity and visibility based on tracking both the user and the asset Secure self-healing mesh node network Server can detect intrusions and tampering Monitoring of trucks and the like as IT assets Integration to provide a more comprehensive alternative Example work order handling from a customer back office can involve a tracking device, a vehicle and a person with a smart phone. These are bound in a trusted relationship to authenticate that a desired action was performed. The smartphone is capable of bringing all these together based on sensors to record spatial, temporal, asset and environmental conditions. The smartphone has dedicated software to general public key pairs and have the public signed into the format of a certificate by a Certificate Authority. The customer back office can digitally sign the work order to ensure integrity and authenticity of the work order, and thereafter encode the details of a work order into a two dimensional symbol. This can be read by the camera of the device and the data extracted, and the digital signature verified using the public key certificate on the smartphone described earlier. This provides all the information in the work order. The camera reads the 2D or other identifying symbol or other information from the hardware device and brings in its ID and other unique information. It is also possible to take a picture of or otherwise acquire the VIN or other vehicle/asset identifier via the OBDII (On Board Diagnostic II) or other port to provide another source of data. Biometric sensors can capture iris, voice, facial patterns, etc. to provide multifactor personal authentication. The GPS/GNSS system also provides space (location) and time. This is packaged into a file format, signed with the private key and uploaded (e.g., wirelessly) into the database to provide an integrated report resistant to tampering with known authenticated origin.

A registration process is used beforehand to establish the key management and register individual users (e.g., capture biometrics information).

One-to-many relationship between vehicle and workers (e.g., binding can change shift by shift); applications may include a "car to go" (zipcar), car rentals (binding users with rental cars) or other spontaneous, changeable and/or ad hoc asset binding.

Telematics device and SmartPhone are in Peer-to-Peer communication session ("Peer-to-Peer" can be over WWAN, WLAN, WPAN or any other communication link) SmartPhone knows Human/Driver has established a trust bond through multi-factor authentication (some shared known by the user, something the user has possession of, and something the user "is" that is some biometric validation. E.g. fingerprint, iris etc).

Telematics device does not know human/driver, however, may be informed of driver through alternative session service outside of the Peer-to-Peer Human/Driver Biometrics—continuously harvested through the Challenge-Response Protocol with Driver and SmartPhone—and also harvested by overall system in the Driver enrollment process—may be used to create new seed for new pseudorandom Peer-to-Peer communication protocol(s)

Pseudorandom Peer-to-Peer communications protocols may be as simple or complex as WWAN-then-WLAN-then-WPAN-then WPAN-then WLAN-then-WPAN-then-WWAN-etc. (i.e., using multiple parallel communication paths interleaved with one another for evasion).

Can be used in addition to employing dynamically updated encryption as the Peer-to-Peer transport changes with a perpetual feeding of Encryption Key data for a particular transport out-of-band through one of the other transports (e.g., WWAN keys sent over WPAN, WPAN keys over WLAN, WLAN keys over WWAN, etc.).

Using light as an additional bearer of any information by leveraging the fact the smart phone has both light emitter (flash) and light sensor (camera). Non-limiting examples include use of the hardware device LEDs and light sensor for communication of authentication and challenge response protocol with a smart phone using the smart phone's flash and camera as part of the authentication and challenge response protocol.

Use of simply coding such as Morse code or even a dynamically mutating protocol that uses the wireless WAN connection as a means to educate both Nodes as to the interpretation of the mutating protocol.

Means to transfer a secret key that can only be intercepted via man in the middle/line of sight to avoid security risks presented by Bluetooth, WIFI, NFC, RFID or any radio protocol that can be intercepted from a distance using hi gain equipment.

MATE—Managed Adaptable Trust Engine (on telematics device)

TEAM: Telematics Extensible Application Module

TEE: Telematics Execution Engine

TSB—Telematics Service Bus: disposed in cloud but partly also distributed; supports dynamic instantiation of Intelligent Agents at both server and device, Extends and compliments data acquisition and control from remote asset (mobile and fixed). Provides ability to more easily integrate with customer ERP systems.

STAGE—Spatial Temporal Active GeoEncyclopedia (data store): part of the TSB; Queries enable derivation of values for "Actionable Intelligence"—enables intelligent agents at TSB and TEAM environments to execute Intelligent Actions PLANT—Process Layout And Navigation Tool TCOC—Trusted Chain of Custody may be pre-planned through a PLANT, may be used to capture an initial baseline PLANT that will be introduced to as a starting point for documenting and formalizing processes that can be memorialized and managed TCOC makes use of the continuous data harvesting on the device and the associated authenticated log. Triggers may be enabled, for example, to send an alert if velocity exceeds x mph for y minutes.

A smart phone app can be used to manage device install onto an asset. This allows the owner to have a management tool to self-manage the installation. The client purchasing the system can use this installation app on the smartphone to manage the installation. The app takes the field data related to installation and provides it for incorporation into the database. The device can take a picture of a one or two dimensional symbol, or use Bluetooth to access the device, or type in an identification for the device, or by other means. The installer can provide authorization based on serial numbers associated with the installation job. Meanwhile, the mobile device can obtain various information including the VIN or other ID from the vehicle/asset itself, tag number or other more commonly-used identifiers for the asset.

A business owner may have their specific applications leverage the trust bond between worker, smart device and asset. The trust bond combined with the authenticated log provides a high level assurance that workers and assets are in proximity, and records vehicle, system and environmental factors recorded. Such functions manage personnel (e.g., creating, adding, editing and deleting workers). This also permits personnel management by viewing a breadcrumb trail, set exception triggers, ping workers, get real-time status, find nearest, view workers on a map, etc. Installation tokens can be issued on provisioning or issuance of a ticket. This also allows schedule and dispatch to assign an installer to do the installs, monitor work progress, etc. This provides an active engaged environment so the owner knows exactly what is happening when and can see progress, conditions and potential problems in near real time.

Busy small businesses out in the field themselves can perform configuration and monitoring on their own smartphone or other mobile interface.

The worker's screen may provide a different user interface than a manager's interface in an example non-limiting implementation. A particular worker is bound to the electronic device in the vehicle or other asset to thereby assign a driver to a particular vehicle via a smart phone. The workers can also see who else is in the field and where their reports are (if they are a supervisor for example). Work management can provide for dispatch and work assignments. Such scheduling and dispatch confirms arrival location at the customer location. The worker can report what they are doing in real time with their smartphone.

The third party installer can become a worker during the install, and can be tracked by the system. This enables the third party to be tracked and to track for the duration of the trust bond between worker, smart device and asset.

Device synchronization for permissioning: There is logging associated with a smartphone being married with an installed telematics device or entity. Possible to synchronize and link, using a Bluetooth or other interface, the user with the device.

Worker functions include entering worker information such as by providing a token for install. A smart phone application can be downloaded, and the device can be synchronized for provisioning. Individual driver assignments can be provided for the mobile device and mobile interface device synchronization. Users can be granted access to the mobile device user interface. Users are authenticated to the TeMeDa system and keyspace as are their smart device and the asset being registered.

Mobile applications can be used to integrate GPS tracking with work management and remote collaboration. The application on the mobile device can provide additional functionality to the worker in addition to GPS/GNSS geospatial information. Workflow control can be provided by such a mobile app. Location, communication and back office functions are all supported in an integrated manner.

As discussed above, it is possible to bind assets together (e.g., trailer to tractor, etc.) allowing the system to track both the person and the asset(s). Placing an active tracking device in a truck or other asset provides continual monitoring of any asset (powered or non-powered).

GNSS or other geolocation in both the mobile device and the worker's device can be used in conjunction with proximity detection via GNSS overlap and/or by ability of the two devices to communicate.

Binding is between the user and the user's device, and between the user's device and the asset's device.

The user interface provides a visual tool that pulls data in from an end-to-end system.

Scripting language allows the end user to be other than the developer. A visual diagramming tool can be used to develop the scripts for execution by the device that is bound to the asset. Visual flowcharting interface allows anyone to develop scripts for the embedded device in the asset. The scripts can be linked with scheduling so that new scripts can be downloaded on an as-needed basis. There is no need to download firmware updates to provide such dynamic functionality. These scripts can incorporate all inputs relevant at every geo-spatial location on a particular route.

Any type of sensors can be used (infrared, vibration, etc.) or added and connected to the embedded device. A number of nodes can be created along the destination to ensure that all parameters are correct. Scripts can be downloaded over the air into the embedded device on a dynamic basis based on the instantaneous context of the asset in real time based on evaluation in real time of the current state/context of the asset (e.g., GNSS geofence, but also a wide array of sensor data depending on the use case). Decisions can be made in the embedded asset device based on a static PLANT. The asset device dynamically determines whether there are variances to the static plan and can take appropriate action.

Example non-limiting systems, apparatus and methods for associating with an item may comprise a processor disposed and structured to receive inputs from at least one sensor; and a non-transitory memory device storing instructions that when executed by the processor provides a trusted engine that develops and maintains a secure, trusted chain of custody with respect to the activities associated with delivery of people, products and/or services.

In some example embodiments, a device housing is bound to an asset, wherein the processor is disposed in the housing. The memory device may store further instructions that when executed by the processor securely manages and executes applications. At least one sensor may comprise a geographical locating sensor and/or a biometrics sensor. The processor may be structured to securely receive inputs from at least one sensor over one or more wireless links. The processor may be structured to securely authenticate and bind with an additional portable device providing said at least one sensor. The processor may be structured to receive inputs wirelessly from the at least one sensor disposed in a handheld device. The processor may be structured to be securely managed and monitored remotely, and may execute secure intelligent agents of a remotely located management entity.

Example Non-Limiting System Architecture

FIG. 1 shows an example non-limiting geospatial asset tracking system (such as the TeMeDa™) system used within a cityscape 100 including assets. In this particular non-limiting example, the assets shown include a delivery van 102, a tractor (cab) 104 pulling a trailer 106, a train engine 108 pulling freight cars 110, and a fixed storage facility 112.

However, these assets are merely non-limiting examples for purposes of illustration. Assets can be virtually any item, object or person. For example, assets are things, objects or living things that may be fixed, moveable or moving; large or small; vehicular or non-vehicular; animate or inanimate; operated by or otherwise associated with a human user or not; capable of carrying or containing other objects or not; valuable or not; indoors or outdoors; active or passive; self-powered, externally powered or unpowered; electronic or mechanical; singular or in sets; interactive or not; programmed, programmable or not; possessing any other desired characteristic; or any combination of the above.

In the non-limiting example shown, each asset 102-112 has at least one telematics device 150 associated therewith. Thus, delivery van 102 has a telematics device 150a installed on board; tractor 104 is equipped with a telematics device 150b and trailer 106 has a telematics device 150c onboard; train engine 108 has a telematics device 150d; each of freight cars 110 has an associated telematics device 150(e-h); and fixed storage facility 112 is provided with a telematics device 150i. Telematics devices 150 can have different configurations and capabilities. They may be integrated as part of the asset at the time the asset is manufactured or added to or installed in the asset later. They can be powered by the asset, self-powered by their own internal power source, or powered from an external source such as sunlight, kinetic energy, electromagnetic fields or other source. They can have more or less capabilities depending on the application, use or customer need.

In this example, telematics devices 150 each have the capability to communicate information. Such communications can be wireless or wired, continual or intermittent, verbose or compact, periodic or non-periodic, digital or analog, one-way or bidirectional, single-mode or multi-mode, optical, radio, or any combination of the above. In one example non-limiting example, each of telematics devices 150 is equipped with a wireless electromagnetic transceiver that communicates digital data over conventional electromagnetic frequency bands such as the 900 MHz, 1800 MHz, 2.4 GHz and other bands using cellular telephone, Bluetooth, WiFi, WiMAX, or any other conventional communications technique or combination of multiple such techniques. Such communications capabilities allow telematics devices 150 to report and receive information at desired time intervals and/or circumstances. Such information reported and/or received can be any kind of information including but not limited to information concerning the geospatial location, environment, state and/or status of the telematics device 150. For example, telematics devices 150 can report geolocation or other location-based information such as GNSS (Global Navigation Satellite System); acoustic, sound and/or vibration; automotive and/or transportation; chemical; electric current, electric potential, magnetic, radio; thermal, heat, and/or temperature information; environment, weather, moisture and/or humidity; flow and/or fluid velocity; ionizing radiation and/or exposure to subatomic particles; navigation instrument information; position, angle, displacement, distance, speed and/or acceleration; optical, light, imaging and/or photon information; pressure information; force, density and/or level information; proximity and/or presence information; or any information concerning any other sensed or other properties, concepts and/or characteristics affecting, in the environment of or otherwise sensible by the telematics device. Telematics devices 150 can also report information acquired from human users including but not limited to speech, commands, touch inputs, button presses, biometrics, facial recognition, heart rate, sleep state, eye movement, blood alcohol level, reaction time or other physiological information; or any other information acquired from a human or other living thing.

Telematics devices 150 can receive commands, control information, programming, software, state change information, instructions, status information, visual and/or audio information, or any other kind of information. In the example non-limiting embodiment, telematics devices 150 can communicate with any desired type or configuration of external device(s) including but not limited to smart phones, tablets, computers, cellular telephone systems, the Internet or other network, humans, and/or other telematics devices.

Figure 2A:
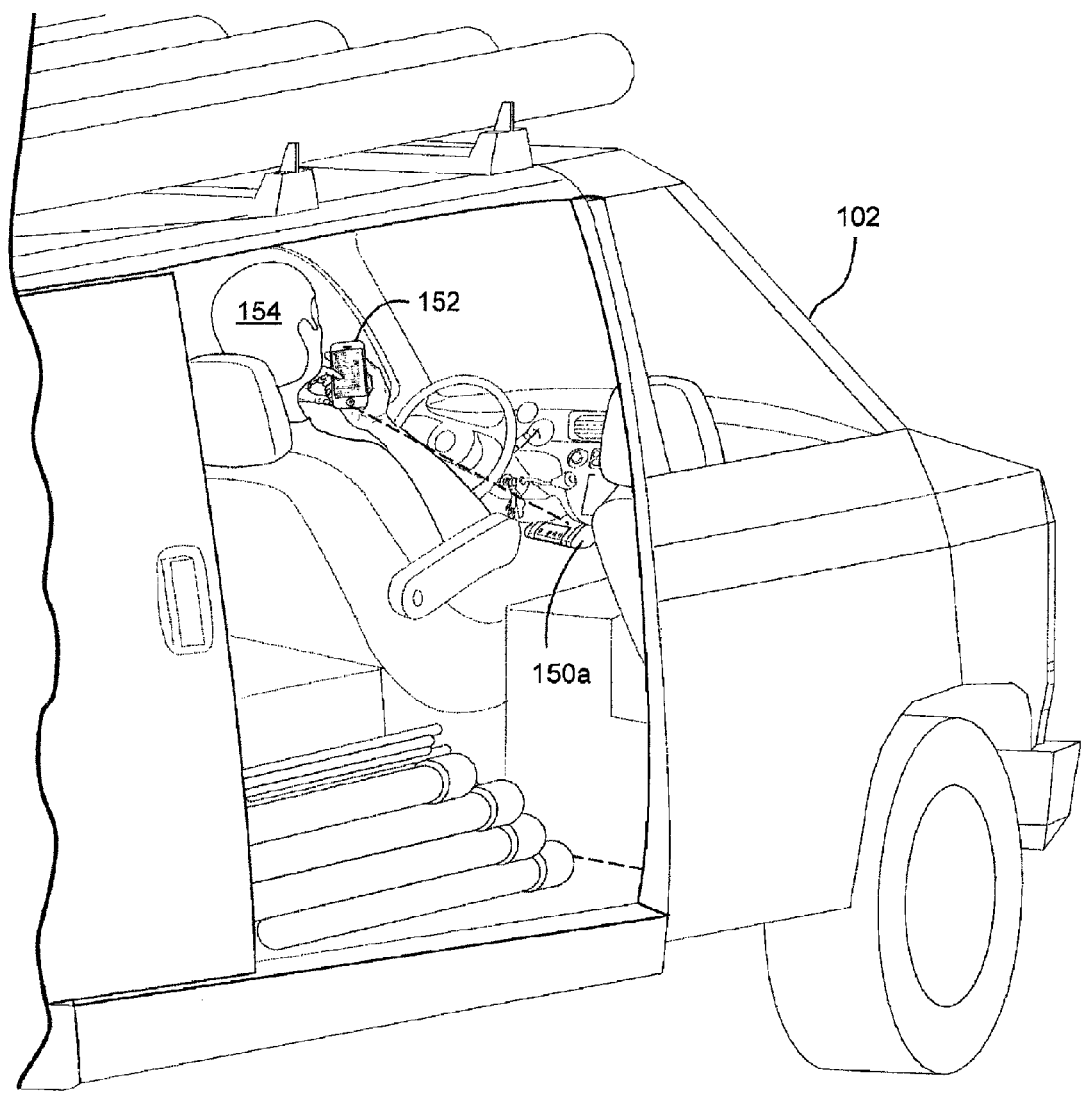
FIGS. 2A, 2B and 3 illustrate how example telematics devices can be applied to different assets.
Figure 2B:
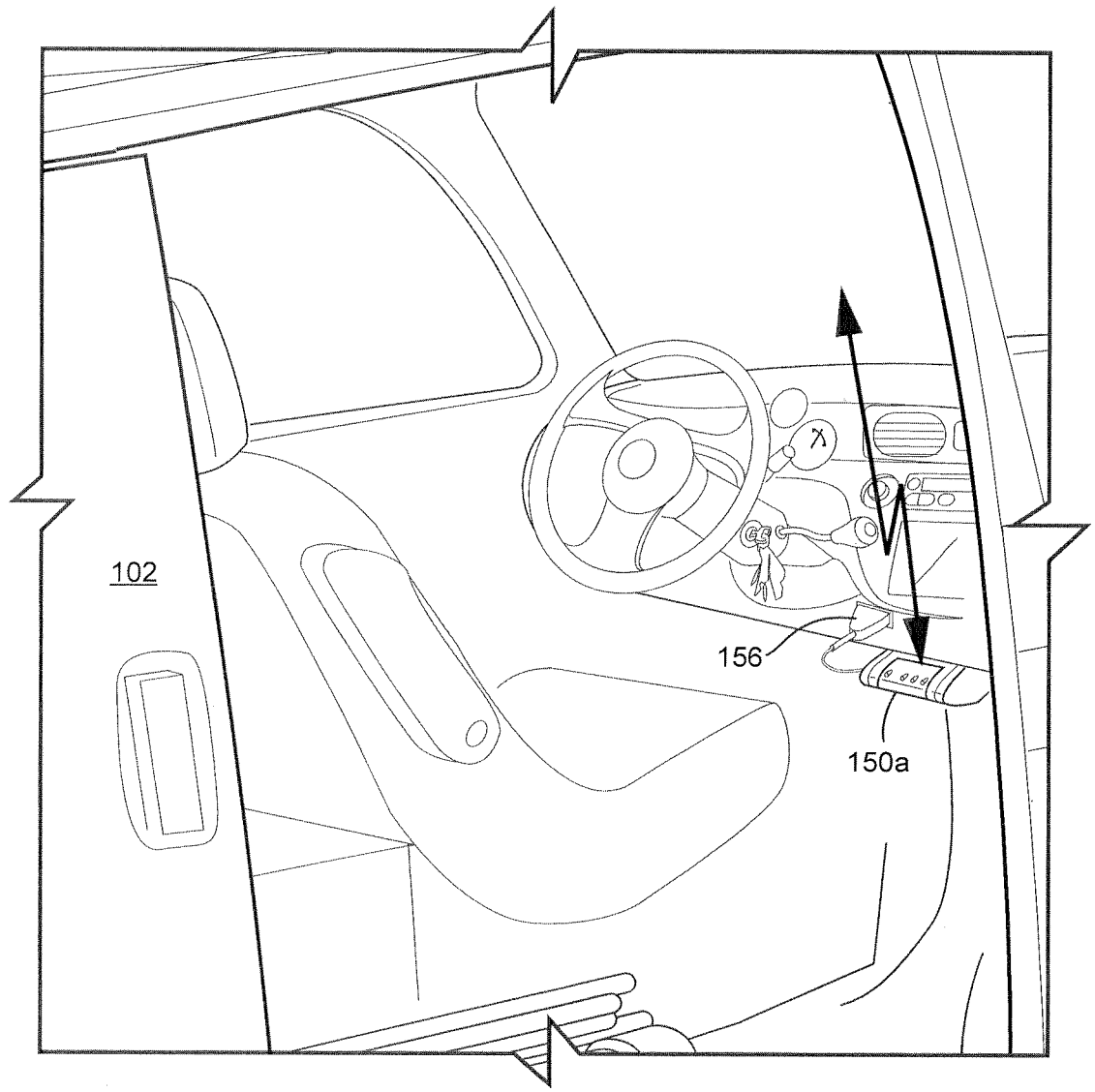

FIGS. 2A, 2B, 3 and 4 show example non-limiting example scenarios. In FIG. 2A-2B, a telematics device 150a is installed on-board delivery van 102. The telematics device 150a can be fixedly installed and bonded in a trusted way to the van 102 so that it remains with and travels with the van wherever the van goes. In this particular non-limiting example, telematics device 150a communicates wirelessly via Bluetooth or other conventional RF communications with a smartphone or other user interface device 152 operated by a human driver 154. Such information exchange (which can be wired and/or wireless) permits telematics device 150a to exchange information with one or more applications ("apps") executing on or otherwise provided by user interface device 152. Such information exchange permits telematics device 150a to leverage and use sensing, displaying, transducing, computation, storage, communications and/or other capabilities provided by user interface device 152 to interact with user 154 and/or for other purposes. Thus for example, the user can use the user device 152 for conventional telephone calls, texting, emailing, and the like. Telematics device 150a may interact with an application installed on the user device 152 to permit the user to interact with the telematics device. As will be discussed below, such interaction between telematics device 150a and user device 152 can provide trusted bindings or bonds to reliably and securely establish trusted associations between devices and other devices and/or people. Such trusted bindings are highly useful for knowing where the asset has been, what has happened to it, where it is now, etc.

Additionally, as illustrated in FIG. 2B, telematics device 150a may communicate with equipment, sensors, processors, memories, devices or other capabilities on-board the asset (in this case van 102). In the particular example shown, van 102 includes a conventional OBD-II on-board diagnostic system including a digital bus accessible via a conventional connector. In the non-limiting example shown, telematics device 150a includes a wired or wireless capability (e.g., a connector 156 and associated cable) for interfacing with such on-board vehicle data bus. Using such connection capability, telematics device 150a may receive/monitor various information concerning van 102 including but not limited vehicle speed, engine RPM, fuel level, and a variety of other vehicle operating parameters. Additionally, in some example non-limiting installations, telematics device 150a may apply signals to the van 102's bus to control certain aspects of the asset, access the asset's internal user interfaces (e.g., dashboard display, sound system, etc.) and for other purposes. Of course, the technology is by no means limited to an OBDII vehicle or asset bus and can be used with any on-asset communications or network capability(ies) including but not limited to CAN (Controller Area Network), D2B (Domestic Digital Bus) FlexRay, DC-BUS, IDB-1394, IEBus, I$^2$C, ISO-9141-I/-II, J1708, J1587, J1850, J1939 and ISO 11783, KWP2000, LIN (Local Interconnect Network), MOST (Media Oriented Systems Transport), Multifunction Vehicle Bus (part of the Train Communication Network IEC 61375), SMARTwireX, SPI, VAN (Vehicle Area Network), WIFI or any other desired communications facility and associated protocol. Some such busses may also provide power for telematics device 150.

Figure 3:
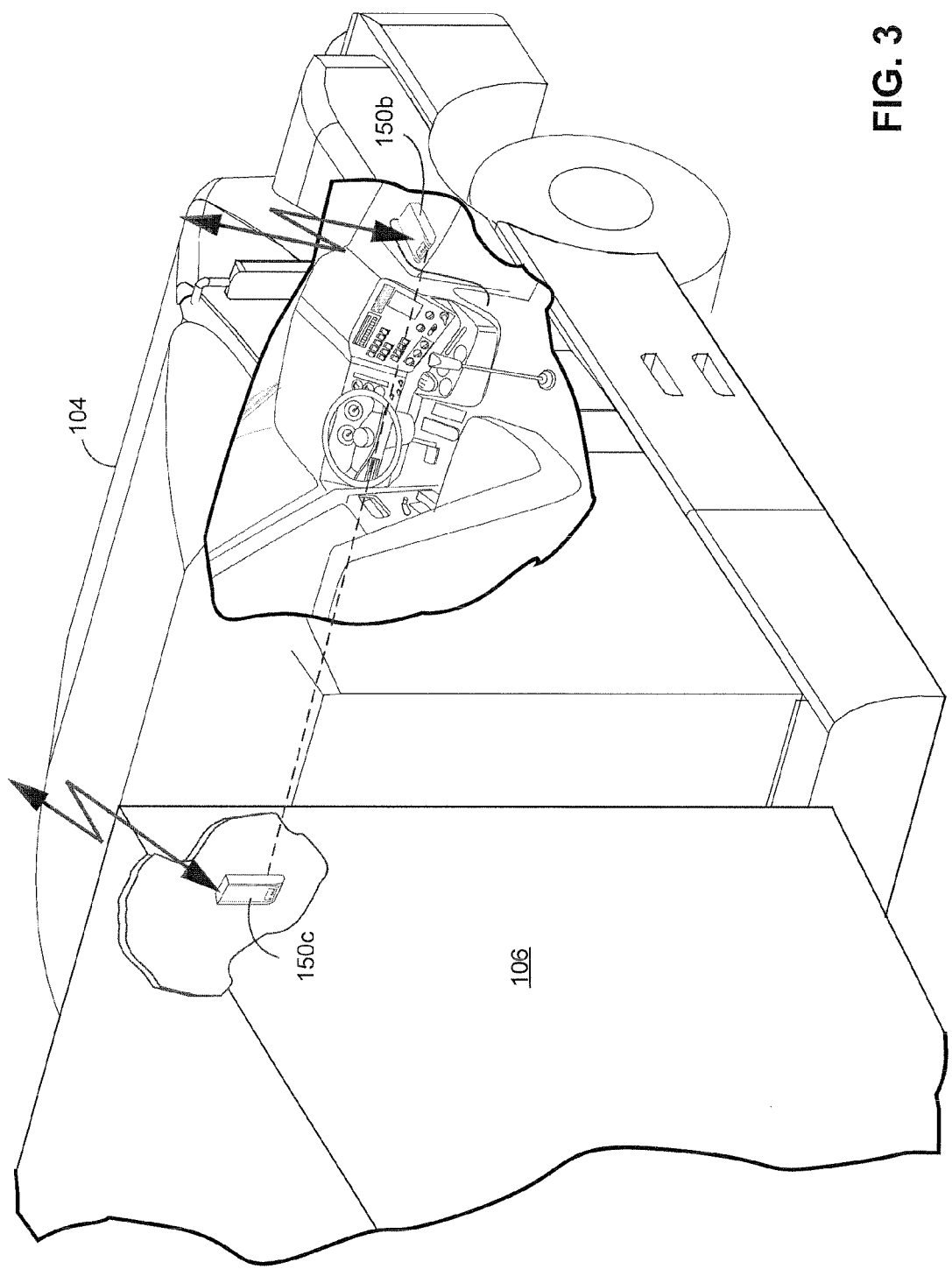

FIG. 3 shows another example installation configuration where a telematics device 150*b* is installed in/bound to tractor (cab) 104, and another telematics device 150*c* is installed in/bound to trailer 106 of an 18-wheeler, semi or other large vehicle. In this particular case, because tractor 104 is not necessarily permanently attached to or otherwise associated with trailer 106 but rather is designed so that the tractor can pull any trailer and trailer 106 is designed to be pulled by any tractor 104, it is desirable to use separate telematics devices 150*b*, 150*c* to provide separate points of presence for these two distinct assets.

In this particular example, telematics device 150*b* may be connected to a J1939 9-pin diagnostic port connected to a CAN bus of tractor #104 to monitor engine operation, vehicle speed, vehicle braking, engine temperature, engine RPM, vehicle braking, vehicle distance, vehicle wheel information, fuel economy, ambient conditions, water in fuel indications, inlet-exhaust conditions, shutdown, diagnostic trouble codes, etc. Telematics device 150*b* may further include internal sensors including but not limited to a GNSS receiver, an accelerometer or other vibration or motion sensor, a temperature sensor, a sound/noise/speech sensor, or other sensors providing information for processing, logging and/or reporting by the telematics device.

In the non-limiting example shown, telematics device 150*c* installed on trailer 106 may not need to connect to any other facility or capability provided by trailer 106, but may be self-sufficient and/or self-reliant in terms of being self-powered, self-sensing, self-aware and the like. In the non-limiting example shown, trailer telematics device 150*c* and tractor telematics device 150*b* can automatically detect that they are in proximity to one another, establish wireless communications exchange over a wireless communications link, and leverage and/or otherwise coordinate each other's sensing, processing, storing, reporting and/or other capabilities. Such coordination can further involve a user device 152 as shown in FIG. 2A.

Example Non-Limiting Inter-Device Communications

Figure 4:
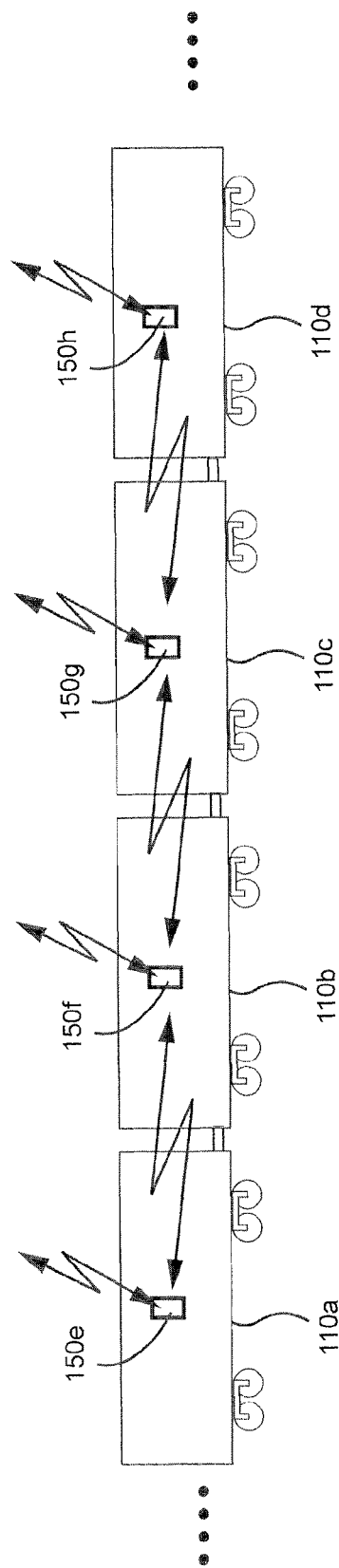
FIG. 4: illustrates how multiple telematics devices can communicate with one another.

As shown in FIG. 4, such inter-device communications and coordination between telematics devices 150 can be scaled and expanded to involve any number of such telematics devices communicating in a chained network; ad hoc or other mesh network; one-to-many, some-to-many or many-to-many networks; or any other network or communications type or style. In such installations, it may not be necessary for each telematics device 150 to include long-range communications facilities. For example, some such telematics devices 150 can acquire and store/log data and rely on its short-range communication with other devices in communication therewith to communicate the stored data over longer distances. In still other example non-limiting embodiments, each telematics device 150 can acquire and log information, and then report logged information (or processed versions thereof) intermittently when in range of or otherwise connected to an external network, station or other authorized device.

Example Non-Limiting Trust Bindings

Figure 7:
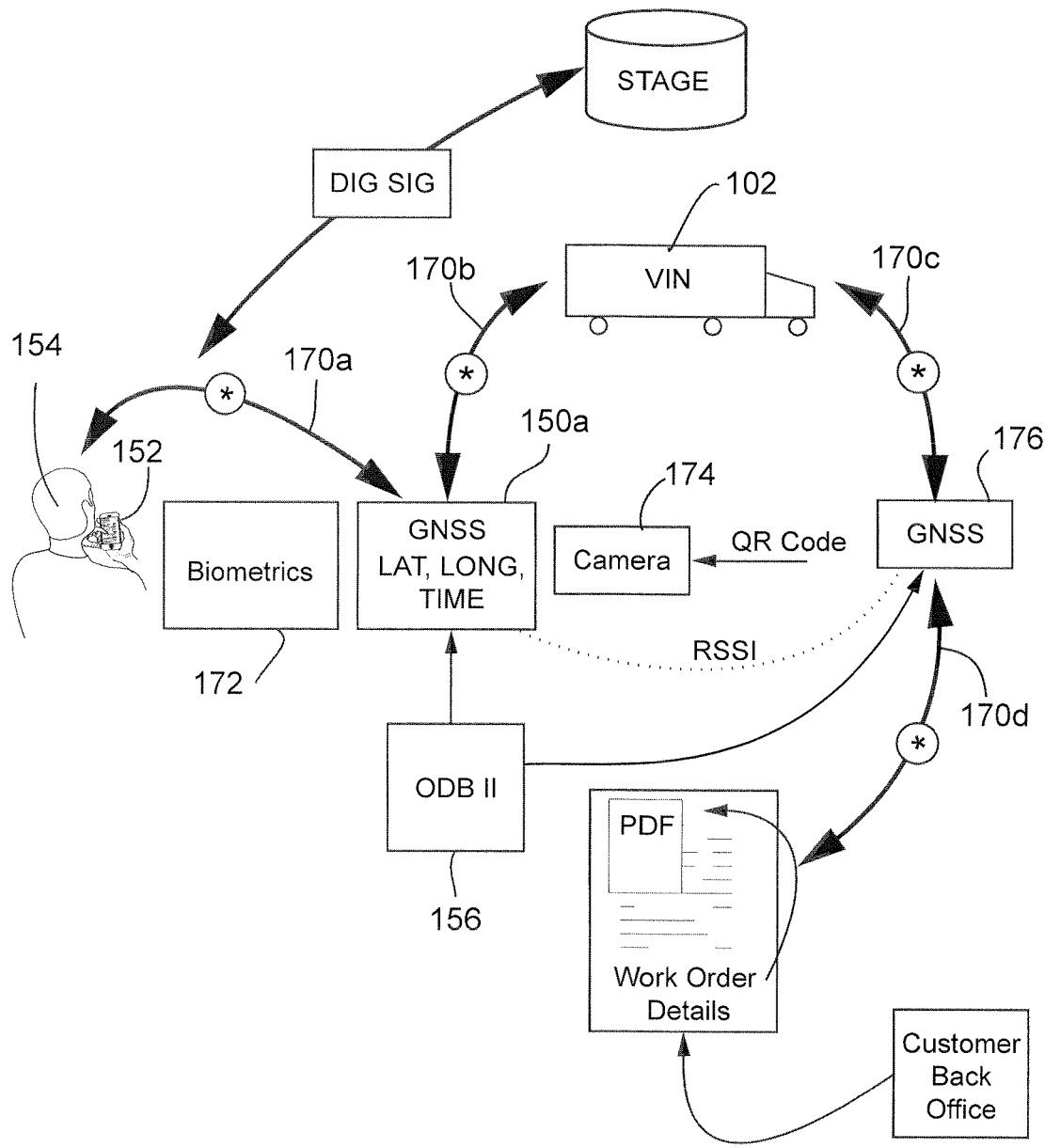
FIGS. 7 and 7A show example non-limiting trust binding between a telematics device, a user device, a user and a centralized system.

In the non-limiting examples shown, telematics devices 150 can be physically and/or virtually bound to assets, humans, other telematics or other devices and/or centralized or other reporting systems. For example, in the FIG. 2A/2B non-limiting example, telematics device 150*a* is physically bound to van 102 by gluing, bolting or otherwise attaching the telematics device to the asset. In some example non-limiting installations, attempts to remove telematics device 150*a* from the asset may result in destruction, disablement, alert generation or other state change of the telematics device. Meanwhile, a virtual binding or trust bond may be established between telematics device 150*a* and smartphone 152, and a further virtual binding or trust bond may be established between telematics 150*a* and user 154. Such non-limiting example bindings are illustrated in FIG. 7. In the example shown, lines 170 indicated by "*" show secure trust bindings. In this example, a telematics device 150*a* providing GNSS geolocation information (latitude/longitude/time) can be bound (see binding 170*a*) (for example using a password or other challenge; biometrics including but not limited to facial recognition, fingerprints, voice recognition, iris or retina recognition, or other single or multifactor biometric authentication technique; or by other means) to a user 154. The telematics device 150*a* can, in addition or alternatively, be bound to a user device 152 using cryptographic, digital signature or other authentication means or protocols. Telematics device 150*a* may also be bound (see binding 170*b*) to vehicle 102 (e.g., by reading a vehicle identification number from an OBDII or other vehicle bus or network, by using the camera 174 of user device 152 or other sensor to recognize a one or two dimensional symbol or other optical code affixed to the vehicle 102; and/or by using proximity detection based on received signal strength (RSSI), geolocation (GNSS) affixed to the vehicle, or other capability to ensure that the vehicle 102 and the telematics device 150*a* are co-located or in close proximity to one another.

In one example non-limiting embodiment, the SmartPhone 152 knows the Human/Driver 152 (i.e., person authenticated to it). The telematics device 150*a* does not know human/driver, but may be informed of the driver through alternative session service outside of the Peer-to-Peer. Human/Driver biometrics 172 is used to continuously harvest biometric information concerning driver 152 through a Challenge-Response Protocol with the Driver and SmartPhone 152 to establish a trust bond 170*a*. Such biometric information could also or alternatively be harvested by the overall system in the Driver enrollment process, and may be used to create a new seed for new pseudorandom Peer-to-Peer communication protocol(s).

Pseudorandom Peer-to-Peer (PPP) communications protocols may be as simple or complex as WWAN Carrier#1-WWAN Carrier#2-then-WLAN-then-WPAN-then WPAN-then WLAN-then-WPAN-then-WWAN-etc. (e.g., using multiple parallel communication paths interleaved with one another for evasion). Such communications can be used in addition to employing dynamically updated encryption as the Peer-to-Peer transport changes with a perpetual feeding of Encryption Key data for a particular transport out-of-band through one of the other transports (e.g., WWAN keys sent over WPAN, WPAN keys over WLAN, WLAN keys over WWAN, etc.). PPP communications also expand the effective coverage for a device as it is able to opportunistically use bearers as and when they are available. For example, if the device leaves coverage area of one Carrier (e.g. #1) it may automatically switch to the next available carrier.

It is also possible to use light as an additional bearer of any information, leveraging the smart phone 152 light emitter (flash) and light sensor (camera) 174 capabilities. Non-limiting examples include use of telematics device 150*a* LEDs or other light or radiation emitters and a light sensor for communication of an authentication and challenge response protocol with a smart phone 152 using the smart phone's flash and camera as part of the authentication and challenge response protocol. Morse or other coding using a dynamically-mutating protocol over a wireless WAN connection can be used as a means to educate both nodes as to the interpretation of the mutating protocol. This can provide a means to transfer a secret key that can only be intercepted via man in the middle/line of sight. This can be used instead of or in addition to Bluetooth, WIFI, Near Field Communications, RFID or any radio protocol to increase trustedness of a continual trust bond. Of course, if lesser security is tolerable, any other protocols or techniques could be used alternatively or in addition.

In one example implementation illustrated, a work order comes from a customer back office. A telematics device 150a, a vehicle or other asset 102 and a person 154 with a smart phone 152 are bound in a trusted relationship to authenticate the action that was performed. The smartphone 152 is capable of bringing all these together based on sensors and also a PK Public-Private and/or symmetric cryptographic pair. The customer back office can encode the details of a work order into a 2D or other optical symbol. This can be read by the camera 174 of the device and the data extracted. This provides all the information in the work order. The camera 174 reads the 2D symbol from the telematics device 150a and brings in its ID and other unique information. The camera 174 can also take a picture of the VIN or other vehicle identifier. The telematics device 150a connects to the OBDII on-board diagnostic or other port of the vehicle to provide another source of data. Biometric sensors 172 can capture voice, facial patterns, etc. to provide multifactor personal authentication. The GPS system also provides space (location) and time. This is packaged into a file format, signed with the private key and uploaded into the database to provide an integrated report with an authenticated log of events, locations, and sensor readings. A registration process can be used beforehand to establish the key management and register individual users (e.g, capture biometrics information).

Since there is a one-to-many relationship between vehicle and workers (e.g., binding can change shift by shift), each new driver of the vehicle 102 can be bound to the telematics device 150a in turn. Telematics device 150a and Smart-Phone 152 may be in a Peer-to-Peer communication session over WWAN, WLAN, WPAN or any other communication link.

Figure 7A:
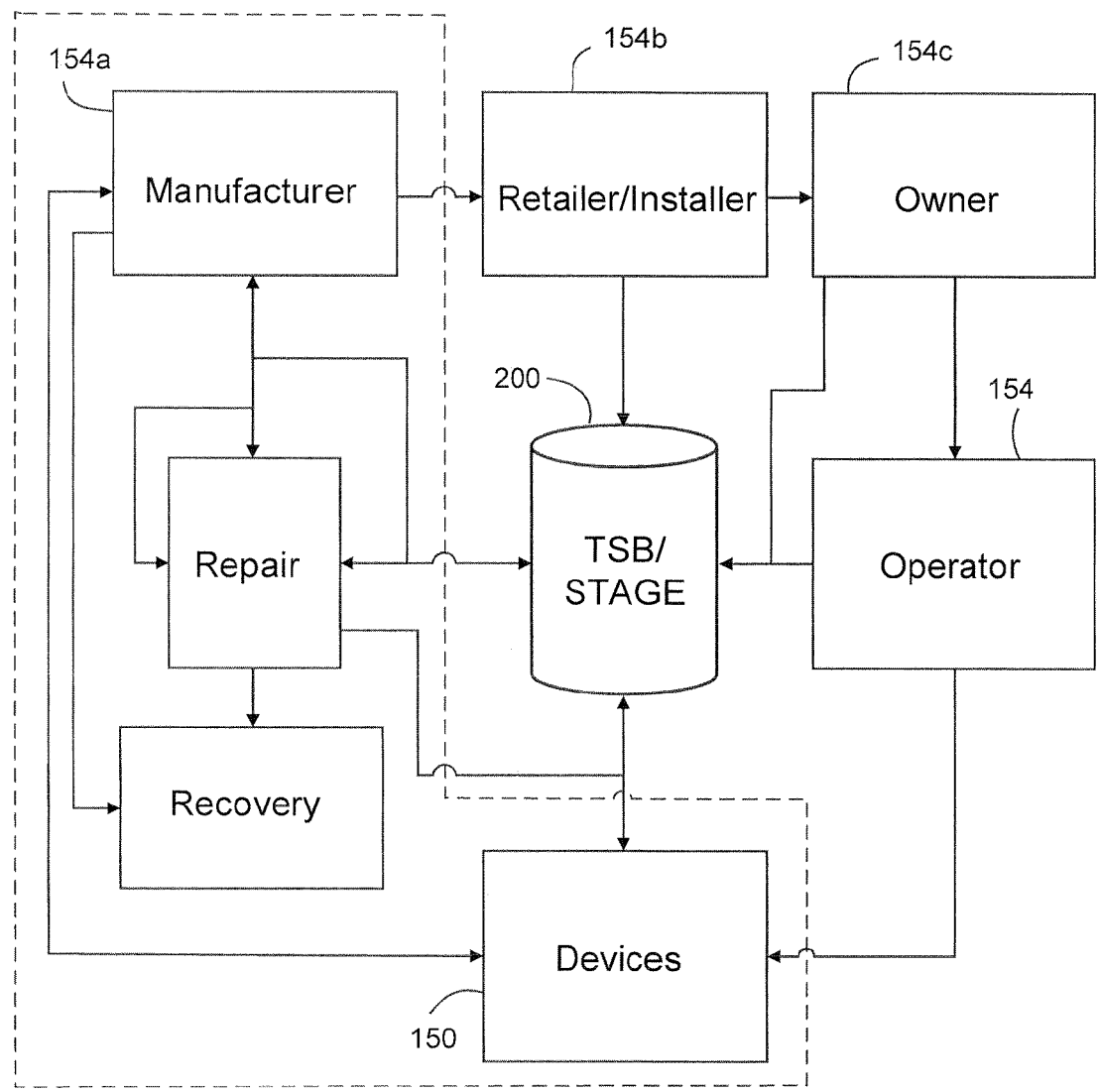
Figure 8:
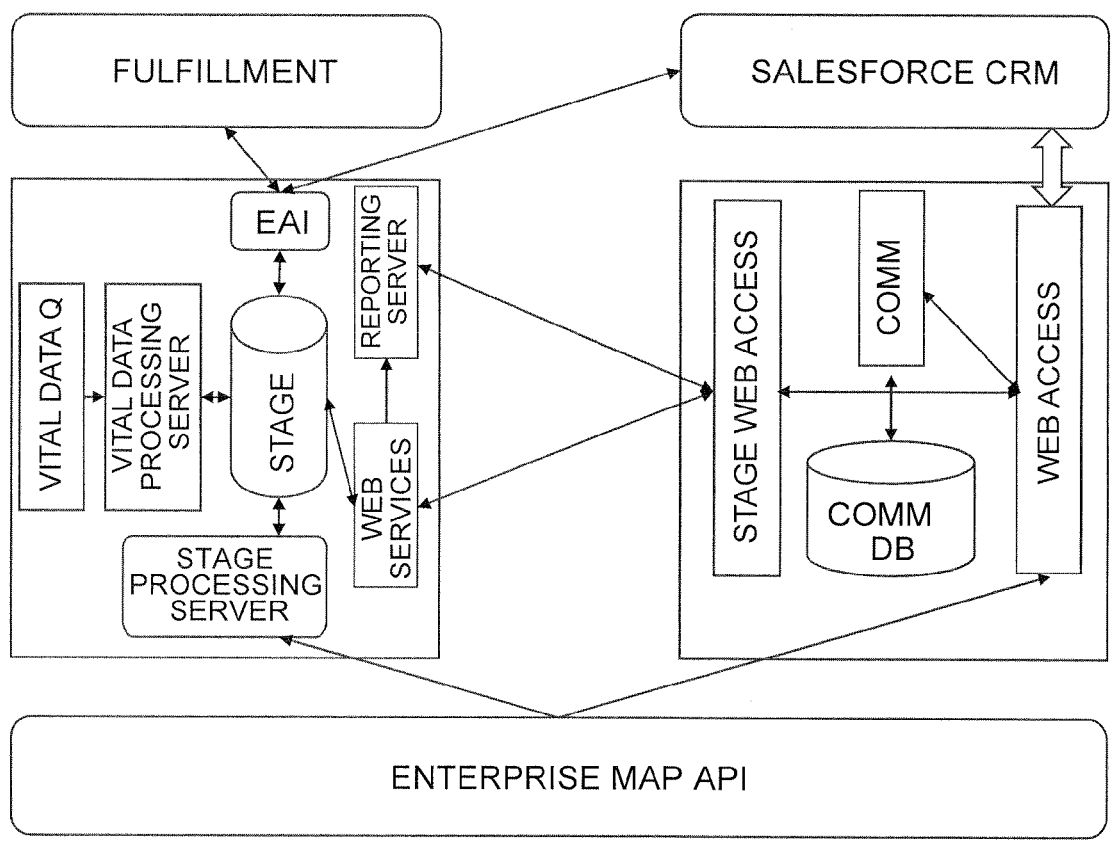

FIG. 7A shows an example non-limiting flow of trust between example entities that participate in a normal relationship with the device/asset 150. As will be understood, a number of external interfaces of FIG. 7A are not shown but rather are described in more detail elsewhere in this application. The top right of the drawing indicates a closed loop system—as indicated elsewhere herein, the chain of custody can encompass the entire life cycle of the device/asset 150 from creation to retirement or destruction. The relationship may be broken into at least two pieces (depicted by the dotted line). One example trust relationship allows the manufacturer or other authorized person or entity to remediate the device back to a known good state. There is a second trust relationship that is transferred from the manufacturer, through the retailer to the owner/operator. This allows the owner/operator to manage, configure and/or modify the operation of the system to their needs, but in one example non-limiting arrangement, not affect the core components of the system. If the hardware malfunctions, breaks, etc. in a way that it is no longer useful, a secure recovery mechanism may be in place. This could simply be that the device is quarantined, if it cannot physically be recovered. Otherwise, the device is returned to the manufacturer or its authorized agent for corrective action or disposal. The manufacturer or its authorized agent may also have policies and procedures to thwart any cloning or repurposing attempts for systems that have reached their end of life.

FIG. 7A further shows the various parties/entities of FIG. 7 including an operator 154 and devices 150a, 152. At each step, a STAGE environment (200) (described below) is apprised of the current relationship between the parties/entities involved. Also note that multiple roles may be assumed by the same individual. For instance the installer and the operator may in fact be the same person or different people or entities.

In example non-limiting implementations, the system as described can use the trust bindings to maintain a "chain of custody" of the asset(s) monitored by device 150a. An example non-limiting chain of custody may involve both a chronological procedure and a logical procedure with time-based recordkeeping having no gaps or dark or unknown time periods. As one example, consider a climate-controlled refrigerator truck transporting rare wine. To ensure the provenance of the wine as well as guarantee its condition, it may be desirable to continually monitor and log the temperature within the container. It may also be desirable to log when the container is opened, by whom and where. Other conditions that might affect the shipment (e.g., vibration, weather, etc.) may also be noted. Additionally, the people involved in supervising the shipment (e.g., who packed the shipment, who drove it, and who unpacked it) may be logged. Secure trust bonds can be formed, substituted and reformed as the asset is processed and transported. Such provenance and traceability may be important in ensuring the value of the shipment, to assign responsibility, or for other purposes. Such "chain of custody" may in some example non-limiting implementations be designed to be sufficiently secure, formal and robust to provide admissible evidence in a courtroom or for other purposes to prove everything that has happened to the asset since its creation.

Example Non-Limiting Telematics Device Configuration

Figure 5:
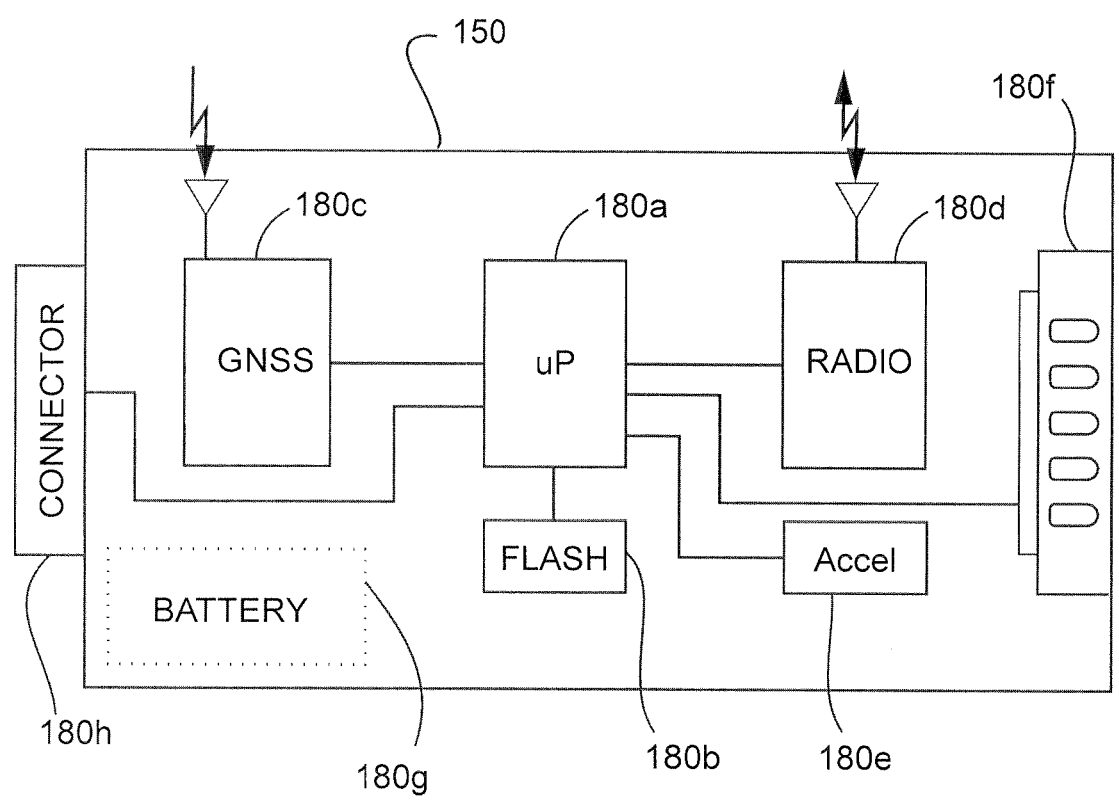
FIG. 5 is a schematic diagram illustrating an example telematics device.

FIG. 5 shows an example non-limiting schematic diagram of a telematics device 150. In the example shown, telematics device 150 includes a microprocessor, microcontroller or other programmable or non-programmable automatic computing or other processing device 180a coupled to a non-transitory storage device such as FLASH memory 180b that stores program instructions that the processor executes to perform or provide certain features and/or functions. In one example non-limiting implementation, processor 180a can comprise a conventional low-power microcontroller that executes program instructions stored in memory 180b. However, other configurations including but not limited to FGPA's, embedded logic, digital signal processor(s) or the like are also possible.

Figure 9:
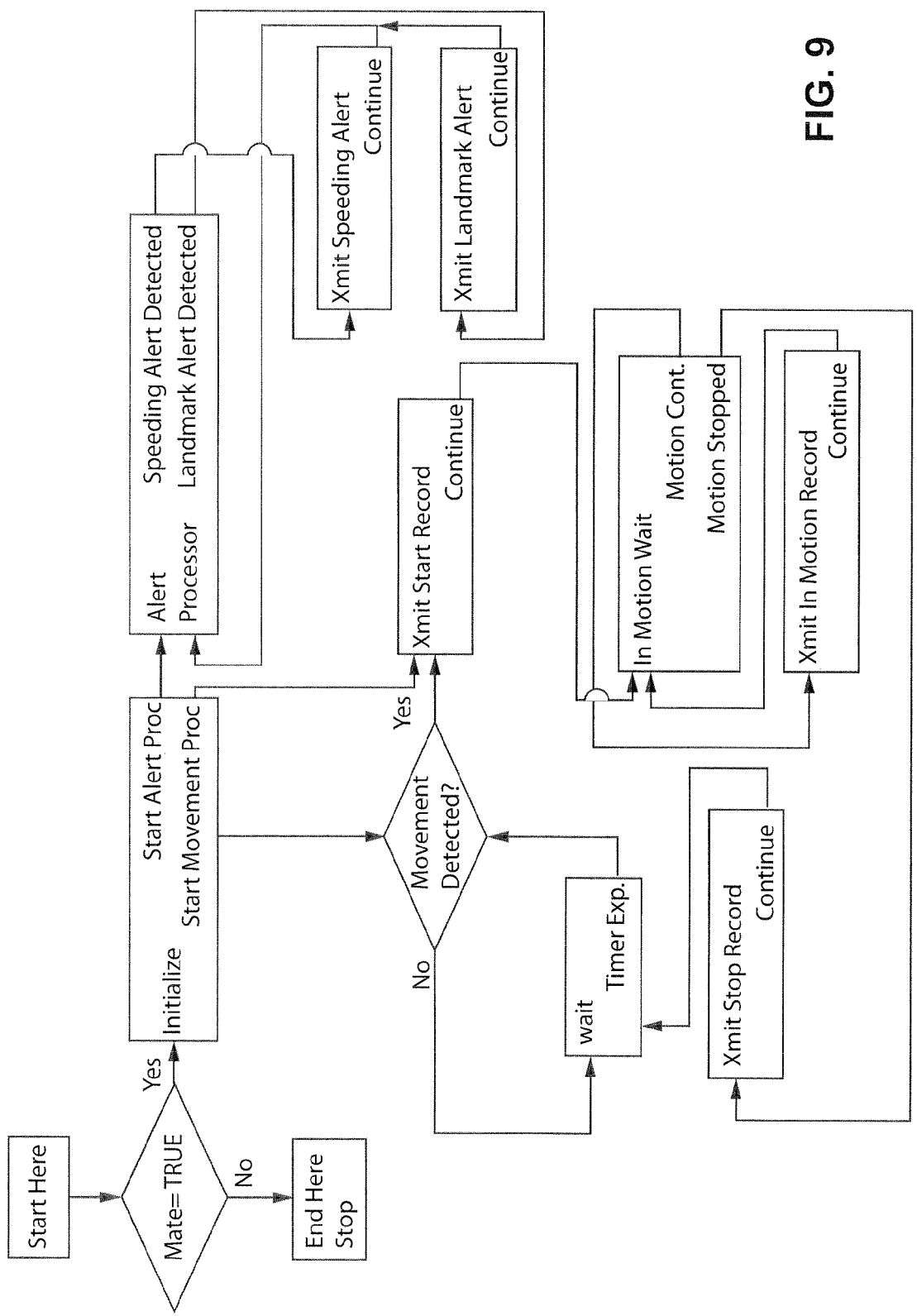
FIGS. 9-10 provide an exemplary non-limiting diagrammatic illustration of the flow of data for a device as it is being processed by the Spatial/Temporal Active GeoEncylopedia (STAGE) engine.

The functions of telematics device 150 may be determined in part or in whole by program code or other programming stored in non-volatile memory 180b. In one example non-limiting implementation, additional or different programming including but not limited to scripts may be dynamically downloaded into telematics device 150 and stored in FLASH memory for execution or other configuration by processor 180a. FIG. 9 shows one example non-limiting operating set for a telematics device, but such operations can be changed dynamically on demand by simply loading different and/or additional programming and associated configuration information into the device via over-the-air programming (OTAP). The device 150 in one example non-limiting implementation includes a core immutable code set that upon restart can restore the device to a known state to provide self-remediation.

Any type of sensors can be used (infrared, vibration, etc.) or added and connected to the embedded device. A number of nodes can be created along the destination to ensure that all parameters are correct. Scripts can be downloaded into the embedded device on a dynamic basis based on the instantaneous context of the asset in real time based on evaluation in real time of the current state/context of the asset (e.g., GNSS geofence, but also a wide array of sensor data depending on the use case). Decisions can be made in the embedded asset device based on a static PLAN. The asset device dynamically determines whether there are variances to the static plan and can take appropriate action.

Scripting language allows the end user to be other than the developer. A visual scripting tool can be used to develop the scripts for execution by the device that is bound to the asset. Visual flowcharting interface allows once to develop scripts for the embedded device in the asset. The scripts can be linked with scheduling so that new scripts can be downloaded on an as-needed basis. There is no need to download firmware updates to provide such dynamic functionality.

In the example shown, telematics device 150 includes a geospatial sensing and/or receiving device such as a conventional GNSS or GPS receiver that receives geospatial information from geosynchronous satellites and calculates current position of the device. Other types of spatial, positioning and/or location devices including but not limited to geomagnetic sensors, optical sensors or the like may be used additionally or alternatively.

In the example shown, telematics device 150 further includes a radio transceiver 180*d* that permits the telematics device to communicate electromagnetically using conventional telecommunications means such as Bluetooth, WiFi, CDMA, TDMA, 3G/4G, GSM, near field communications or any desired data, telephony, radio, data or other communications protocol.

Telematics device 150 may further include an accelerometer 180*e* or other vibration, movement, or kinetic sensor or any other sensor.

Telematics device 150 may further include one or a set of optical indicators or illumination elements 180*f* such as a bank of light emitting diodes. Such optical illuminating elements 180*f* can emit visible light for purposes of communication to a user, and/or infrared or other light for communication with other devices. Additional user interface input/output devices are possible.

Telematics device 150 may further include a battery 180*g* or other power source to power the components of the telematics device. Such power source could alternatively include a capacitor, solar cells, near field communications power supply means, or any other conventional power supplying arrangement.

Telematics device 150 may further include a connector 180*h* for communicating using cables or conductors with external devices including but not limited to a vehicle bus as described above. In one example implementation, the telematics device 150 is self-configuring to communicate with any of a number of desired vehicle or other asset bus configurations after being connected and listening to traffic and signaling on the bus.

Example Overall Non-Limiting More Detailed System Architecture

Figure 6:
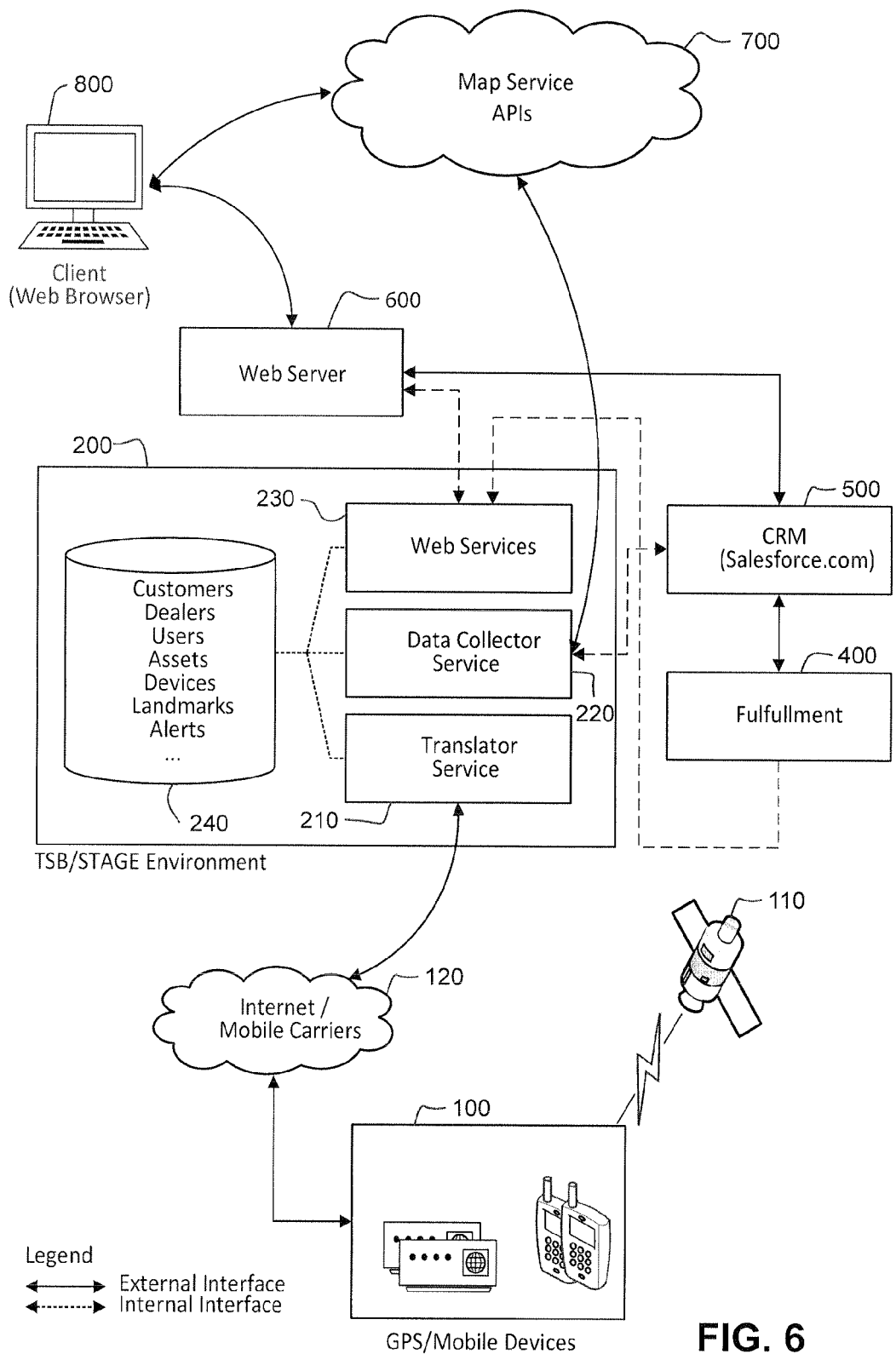
FIGS. 6, 6A & 8 schematically illustrate an exemplary illustrative non-limiting embodiment of the geospatial asset tracking system including an example server architecture.
Figure 6A:
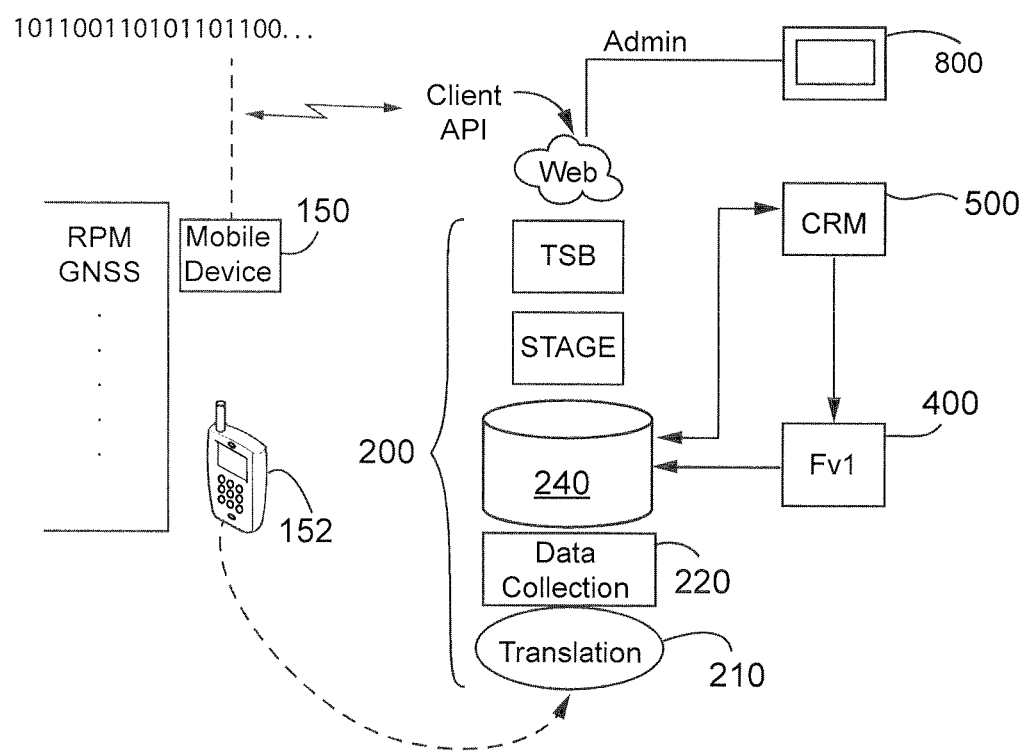

Looking at the FIGS. 6 and 6A, at the core of the TSB/STAGE environment (200) is a database system (240). However the system is designed differently than more traditional systems found on the market today. To understand why, one may consider the following problem that is occurring within the next 10 years. Currently estimates indicate that there are about 9 billion devices (150) connected to the Internet. Contrast that to the more than 7 billion people who living today. And while the number of people are expected to increase to close to 9 billion in the next ¼century, the number of devices (150) are estimated to increase exponentially when compared to the growth rate of the human population. Some organizations are indicating that there will be more than 50 billion devices (150) connected to the Internet by the year 2020. Many sources are now calling the next evolutionary step in the growth of the Internet, the "Internet of Things". These "things" may not only be a computational devices, the may be also encompass the "asset" the communications devices is coupled to.

There likely will not be enough human capital available to install, manage, and/or maintain these devices (150) in the same manner that we do today. There is a drive to make these devices (150) smarter, and not rely on humans to work harder. However making the devices (150) smart also comes at a cost. If the estimates suggested are reached, there will be at least 5 of these smart devices (150) for every man, women, and child on earth. When contemplating this mass scale of semi-autonomous devices (150) (e.g., they can follow a set of instructions), one must also look back at history. We should also guard against these smart devices (150) being used for nefarious purposes, unbeknownst to devices owner/operator, and potentially along with its originally intended use. Simply stated, to effectively achieve some semblance of reliability and manageability, these devices (150) need to be governed. Therefore it is highly desirable to design a system to ensure that these devices (150) are operating according to an expected plan, and depending on the deviation from that plan, can be quarantined and/or potentially remediated without human interaction.

The system as depicted in the non-limiting illustrative embodiment of FIG. 6 was designed to provide such constructs of governance. The system may or may not be the custodian for the information being captured or generated by these devices (150). However the system retains the data about the data, or Meta Data: The who, what, where, when, why, and how. By keeping track of the data about the data, the example non-limiting asset tracking system can provide additional insight into the operation of a device (150). Using the knowledge that devices (150) are very much like humans who are creatures of habit, unless some external input causes a variance from a given task, they execute within narrow margins and regimes. Therefore, by tracking a device's operation against a given plan, which may be learned over a period of time, and denoting the variance from this plan, inferences can be made as to the overall health of a device (150).

As part of this governance, one must also consider the privacy and veracity of the data that is being capture. As indicated previously, the example non-limiting asset tracking system may or may not be the custodian of the data being captured, generated, and/or consumed by these devices (150). To ensure the veracity of the data as well as the data about the data, a root of trust and chain of custody is maintained. The example non-limiting asset tracking system allows for the entire life-cycle of these devices 150 to be catalogued, from assembling the molecules into a functional device, to its installation and deployment, to its ultimate demise. In short, the example non-limiting asset tracking has the ability to record a device 150's chronological map from cradle to grave. Given this unique understanding about the device 150, the example non-limiting asset tracking system can potentially (re)instantiate a device 150 to any given point on that map, enabling remediation or cloning of a device to a last known good state.

In more detail, the example non-limiting asset tracking system as depicted in the non-limiting illustrative embodiment of FIG. 6 is made up of many components. The devices (150) can be any carbon, biological, or other type of computational resource that can consume, for instance a GPS signal (110) and communicate data over some medium (120). Each device (150) itself may be made up of many sub components or sensors that enable the device to consume, capture, and/or generate information from a variety of different sources (humidity, temperature, light, vibration, movement, etc.). The TSB/STAGE environment (200) is at least the repository for the Meta Data about the data, and can also be the custodial repository for the actual data being consumed/generated by a device (150). The TSB/STAGE is also comprised many sub-components:

The database (240);

A translator service (210) that can communicate with the device in its given tongue (protocol, etc.) and convert the information to an appropriate format that can be processed by the TSB/STAGE system if necessary;

A data collector service (220) that interacts with the Meta Data and potentially the data itself based on the requirements of the owner/operator of the device. The data collector may also implement logic that aids in determining any variances from the given plan;

An access services interface that enables external entities to input into or consume information from the repository such as through web services interface (230);

Other;

External to the TSB/STAGE (200) environment, other systems provide input to or consume information from the repository.

A Web Server (600) that enables client systems (800) to view and/or consume information or Meta Data generated by or about devices (150). This same interface may allow the configuration and/or modification of the operation of a device (150) or group of devices (150) under the control of the owner/operator;

A device fulfillment interface that enables manufacturers of devices to register a device (150) into the TSB/STAGE (200) repository and to initiate the chain of custody;

A Customer Relations Management interface (500), that enables authorized individuals to transfer and track a device (150) from cradle to grave, maintaining a chain of custody;

An external resource interface (700) that enables the TSB/STAGE (200) environment to further correlate the Meta Data and potentially the data such as reverse geocoding GPS data via Google Maps API;

Other;

One component of TSB/STAGE (200) system is the data collector service (220). This event driven service is charged with processing the Meta Data, and potentially the data that is being generated or consumed by the devices (150). As part of its functionality it:

Maintains the relationship and chain of custody between manufacturers, owners, operators, customers, retailers, wholesalers, assets/devices (150). In essences all actors, whether they be human or not, that interact with the assets/devices through the TSB/STAGE (200) system.

Potentially track the relationship between assets/devices (150) and defined zones and/or landmarks. The relationship compromises of at least:

Unknown
In
Out
Other

And may be updated as each event is presented.

Each zone and/or landmark is stored using a geographic vs. geometric shape (circle w/radius, polygon, multi-polygon, etc.) where the exact curvature of the environment, for instance the earth's surface is factored into the shape's actual "surface" area.

The relationship is derived from the provided GPS location information (FIG. 6-110).

Track Transitions in the relationship such as In->Out or Out->In can trigger additional processing (e.g., ingress, egress events).

Track Transitions in the relationship such as Unknown->In|Out may not trigger any additional processing event (ignore) base on governing policy for the device.

Potentially compare each location Meta Data item (latitude/longitude/elevation, other coordinate systems, etc.) against the zones and/or landmarks records presented to STAGE.

The data collector (FIG. 6: 220) may also provide alerting services to an interested consumer of changes to the relationships defined in the TSB/STAGE (FIG. 6: 200) system. The alerting services allow for the definition a policy that a given asset/device should operate within. Based on this policy, any deviation from the expected plan of operations of a device/asset can then cause the generation of a notification to a specified consumer. For instance, deviations from the current plan may include, but not limited to:

Speeding (meters/second)->"speed" limit in MPH/KPH with optional "duration"
Battery temp->"temp"
Battery level->"amps", "ma"
Battery percent->"percent"
Zone entry->zone/landmark record(s)
Zone exit->zone/landmark record(s)
Zone idle->zone/landmark records(s) and "idle" time in minutes or hours
Location entry->zone/landmark records(s)
Location exit->zone/landmark record(s)
Location idle->zone/landmark records(s) and "idle" time in minutes or hours
Other Each policy definition may have an associated a measurement attribute for items that are measurable (velocity, temperature, power, etc.). Part of this attribute definition has a measurement type preferred presentation value defined by consumer of the information. For instance a consumer may prefer speed in "KPH" vs. "MPH," or power in "ma" (milliamps) vs. "a" (amps), or preferred time zone for the presentment of date/time information, etc. Each policy entry may contain a list of target notification methods, such as data-push to a URL, SMS, and e-mail (SMTP). Along with the method, each policy contains zero or plural targets (data-push URL, SMS (phone number), email address, additional processing procedure (e.g., need for further analysis or exception handling), etc. Other notification mechanisms would be apparent to those schooled in the art.

As with any items associated with the operation, interaction with, and/or chain of custody of a device/asset, each triggered alert condition and/or notification is recorded within STAGE.

Other non-limiting architectural features include for example:

Users access TWA (web access)

SWAB: stage web access broker—a serverside layer to broker services to reporting services or web access Web access: ajax/html/java stored on web server, accessed by the user The service broker provides secure access Web access maintains a session about the user before and after authentication. Once a user is authenticated, every single request from web access is made through the broker to the stage on behalf of this specific user. The view of the world is in the context of this specific user. What does he want to do>What kind of access does he support?

TFF: Fulfillment and TCRM is run by sales force

GEMA: a google set of services is used on the stage side when we are processing data and assisting geospatial information Everything on the user interface is a canvas that can be embedded into any application Possible to take the web access and put it anywhere in any customer system (different entities can use and service this web app)

Branding can be what reseller wants—just a canvas that can be changed in size

As far as the user interface design is concerned:

Everything that is being done in this user interface is done in the context of the map All the data collected in the stage is in the context of geospatial information—The application never leaves the map; you always interact with the map, that is how the data is presented.

Example Non-Limiting Operations Flow

Figure 10:
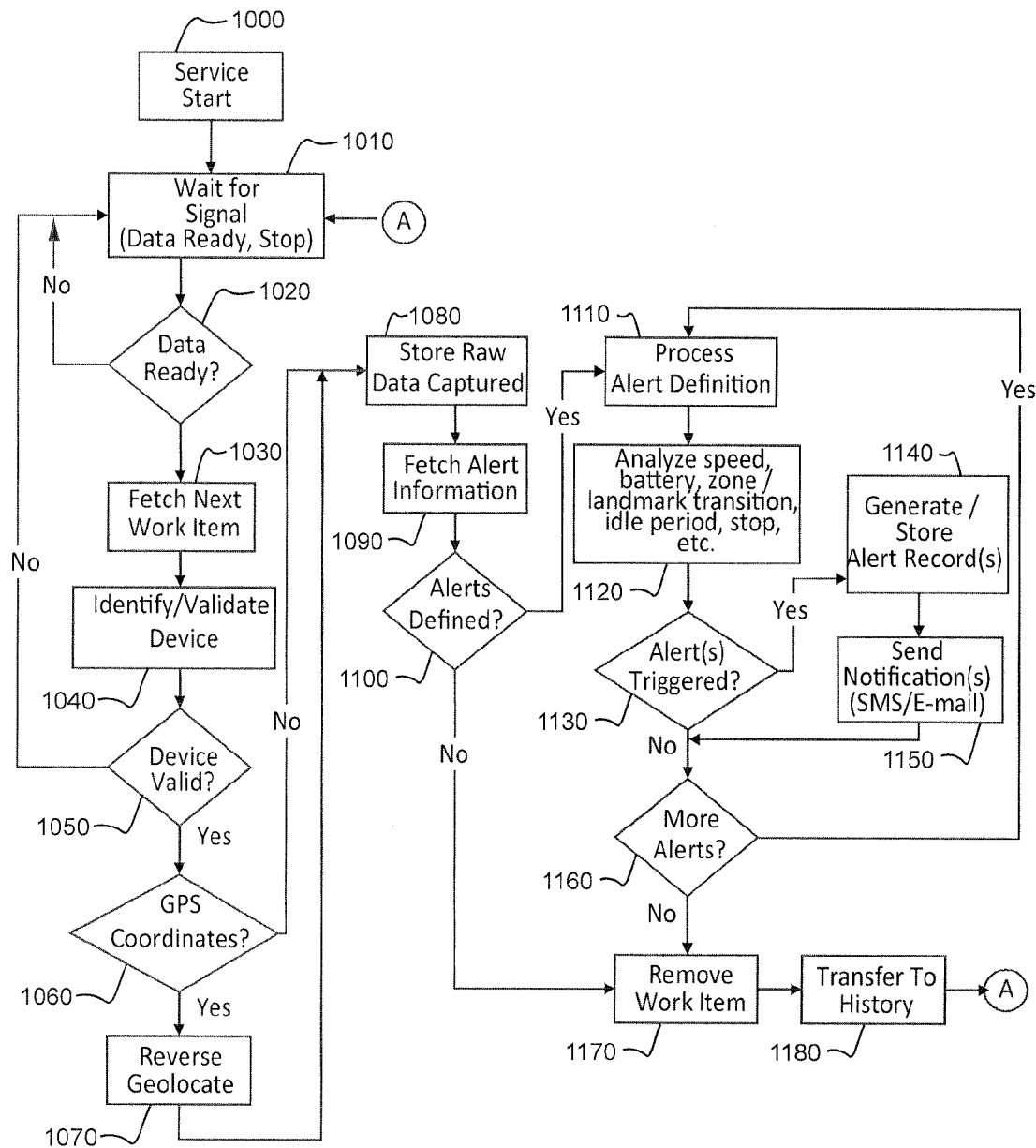

Referring to FIG. 10, the data collection as depicted in this non-limiting diagrammatic illustration, starts off at its initialization point (1000). Once the data collection system has been started, it is an event or work request driven process. This allows the system to be replicated by more than one thread of execution, each waiting for work to be assigned. Upon the presentation of a work item in the data collection work queue, the data collection thread of execution is signaled (1010). Upon receiving this signal, the thread is processing its work queue to determine if there is any data or Meta Data to process. At step 1020 this determination is made. If data is not available at this time, the thread of execution returns to step 1010 and sleeps or does other housekeeping tasks waiting for another signal to arrive. If however data is available, at step 1030, the thread fetches the first work item from its work queue. Prior to doing any further work, the data collector validates that the information being processed is from a device/asset under its governance. If it is an unknown device, further processing of this work item is terminated the thread of execution returns to step 1010.

Assuming that the device/asset has been validated, the data collector checks for the presence of GPS information (step 1060). If such information is not available, the thread of execution will advance to step 1080. If however the appropriate data is present, the thread of execution proceeds to step 1070 to reverse geolocate the information. At this point the data collector has answered the "who, where, when, how".

It is to be understood, that the where component may be processed later if deem necessary by policy or physical limitations apply. For example, consider devices that are not located within range of the traditional GPS system (Thermosphere, Exosphere, etc.). In many cases reverse geolocation referencing may be delayed until that information is needed for further processing.

Once the thread of execution has transitioned to step 1080, the raw data capture process has ended, and the policy enforcement/inference phase is initiated. Based on the Meta Data collected, and the validity of the identity, the policy for the given asset/device is referenced. In the non-limiting exemplary embodiment, at step 1090, alert information is retrieved. If no alert policy information is determined to be available (step 1100), the work item is deemed processed, execution moves to step 1180 to remove the item from the work queue. The information is then added to the history of the device at step 1190. The thread of execution returns to step 1010 where it awaits for more work to be presented that needs to be processed.

However, if policy information is defined, the thread of execution proceeds to step 1110 to begin further analysis of the data and Meta Data (step 1120). Based on the definition of the governance policy defined by the at least one of the owners and operators of the device/asset, inferential and comparative analysis is executed upon the presented data and Meta Data (step 1130). For instance, the device/assets speed may exceed previously defined parameter, or the may be a landmark or zone transition, etc. Any or all of these conditions occurred, is occurring, or may occur based on the current and historical data and Meta Data available to the data collect. If any of these conditions cause a transition in the relationship between the device and its associated plan of execution, the data collectors alert system may be invoked (step 1140). If alerts conditions are satisfied, a record of the conditions is generated (step 1150) and the potentially forwarded to any consumer configured to receive such notifications (step 1160). This may include the execution of additional inferential or analytical analysis. Once all alert conditions have been satisfied (step 1170), the data collector thread of execution processed to step 1180 to remove the work item from its queue, and transfers any results into is recorded history store (step 1190). For sake of brevity, the thread of execution now returns to step 1010 to await the signaling of additional work. It is to be understood that additional steps may be taken to analyze the historical nature of the data. From this data, an inferential or learned plan can be determined based on the operation of a device/asset.

It is to be further understood that other steps may be take in the event that rogue information is present to the data collector. For instance base on policy, if at any step during its thread of execution the data collector determines that the information is invalid or improper, the alert and/or notification subsystem may be called upon to generate an indication to an interested consumer to signal them that a deviation has occurred. This philosophy extends through out the entire Example non-limiting asset tracking system, which allows for governance by exception, therefore reducing the overall work to be completed by more traditional management entities.

Additionally, it is to be understood that the steps that are being described may be subsumed by other components of the TSB/STAGE (FIG. 1:200) system. For example, step 1040 may be totally subsumed or cooperatively distributed to a loosely coupled entity known as the Managed Adaptable Trust Engine (MATE). In one non-limiting illustrative embodiment, the MATE component, in cooperation with the data collector may assume the responsibility to validate the identity of a given asset and/or device or check the veracity of the data the device/asset is consuming or generating. This may be accomplished with well known cryptographic primitives. Other responsibilities may also be delegated. MATE may for instance participate in the root of trust that is created between the asset/device and the TSB/STAGE system, or participate in verifying or augmenting the chain of custody, or in the remediation or (re)instantiation of the given asset/device. MATE's functionality may also be distributed, with part coupled to the device and another part at the TSB/STAGE environment.

Example Non-Limiting User Interface Features

FIGS. 11-40 illustrate various aspects of a graphical user interface in accordance with the instant disclosure. In an embodiment, the various graphical user interface screens illustrated in FIGS. 11-40 may be displayed to a user via a computing device equipped with a suitable display. For example, and as illustrated in FIG. 6, the graphical user interface screens may be presented to a user via a computer (including, but not limited to, desktop computers, laptop computers, handheld computers such as tablets, smartphones, etc. or the like) implementing a web browser. Techniques for displaying graphical user interfaces via a web browser are well known in the art. As will be appreciated by those having ordinary skill in the art, the graphical user interfaces illustrated in FIGS. 11-40 may be presented using techniques other than a client-server model based web browser, and the instant disclosure is not limited in this regard.

As noted previously, the system disclosed herein as capable of generating alerts based on a variety of conditions as applied to the assets being tracked. In an embodiment illustrated in FIG. 11, these various alerts may be summarized in a Global Update Tray (GUT) the, thereby permitting the user to quickly develop a sense of the collective status of all assets being tracked. In the exemplary embodiment illustrated in FIG. 11, the GUT comprises a first field, labeled "Alerts" along with a numerical value and a color-coded status indicator. The numerical value provides an indication of the total number of alerts currently pending for all tracked assets. In the illustrated example, the "Alerts" field shows 40 available alerts along with a red status indicator. In one example non-limiting embodiment, the GUT displays the readings from a tracking device relative to pre-set thresholds. For example, threshold values for speed can be set at 65 and 75 mph. If the asset is travelling at less than 65 mph the GUT will show green. If between 65 and 75 the GUT will show yellow, and if over 75 mph the GUT will show red. In one example non-limiting implementation, these settings may be configured by the user. As further illustrated, the "Alerts" field may include a user-selectable expand/collapse icon (illustrated as an upward-facing triangle) whereby a user may cause the display of more detailed information (illustrated as an "Alert Categories" field) regarding the various alerts. In the illustrated example, the various alerts include 18 "Speeding" alerts, 12 "Parked" alerts, 4 "Erratic" alerts, etc. Additionally, as shown, each category of alerts may include a color-coded status indicator. When the "Alerts Categories" field is displayed, further selection of the expand/collapse icon will cause the "Alerts Categories" field to collapse.

Figure 11:
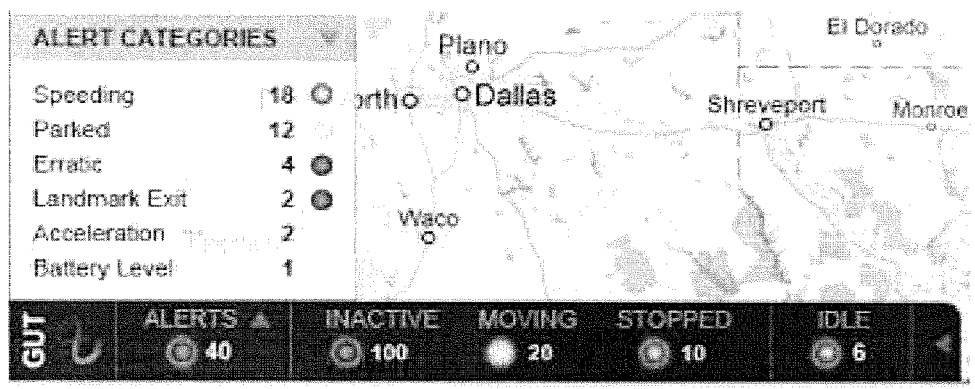

As further illustrated in FIG. 11, other non-alert status indicators may be provided, as illustrated by the "Inactive", "Moving", "Stopped" and "Idle" fields. In these instances, a numerical value indicative of the total number of assets meeting the noted status may be displayed. Additionally, a color-coded status indicator may also be provided for each of these fields. In one example non-limiting implementation, it is possible to "drill down" into an alert to get more detail. For example, clicking on "alert" shows the types and quantity of alerts such as speeding, location entry and exit. This too may be configured for a user.

As further shown, an additional user-selectable expand/collapse icon (illustrated as a leftward-facing triangle to the right of the illustrated fields) may be provided, thereby allowing the user to expand and collapse the GUT as desired.

A feature of the disclosed system is the ability to associate specific individuals with particular objects being tracked. In this context, both objects and individuals may be considered "assets." Graphical user interfaces for this purpose are further illustrated with reference to FIGS. 12 and 13. In particular, FIG. 13 illustrates a screen whereby a user can add an asset to be tracked. In is noted that, in the illustrated example, object-based assets are presumed to be vehicles. However, the instant system is not limited in this regard and tracked objects may comprise virtually any object that may have a tracking device (described above) attached thereto or associated therewith. As shown, radio buttons are provided for adding either a "vehicle" or "person" as an asset. As shown in FIG. 13, selection of the "vehicle" radio button causes a number of text boxes and pull-down menus to be displayed, thereby permitting relevant information regarding the vehicle to entered. A "name" text box allows a user to enter an identifier for the vehicle and a "description" text box allows the user to describe the vehicle. Drop-down menus are provided that permit the user to enter a tracking device identification as well as a group identification (i.e., which group of vehicles the added vehicle belongs to). In the event that the "person" radio button is selected, a display in accordance with FIG. 12 may be provided, whereby a user can enter information regarding a user's identification (name and profile) and contact information. Additionally, similar drop-down menus are provided permitting the person to be associated with a particular tracking device identification as well as a group identification.

Figure 12:
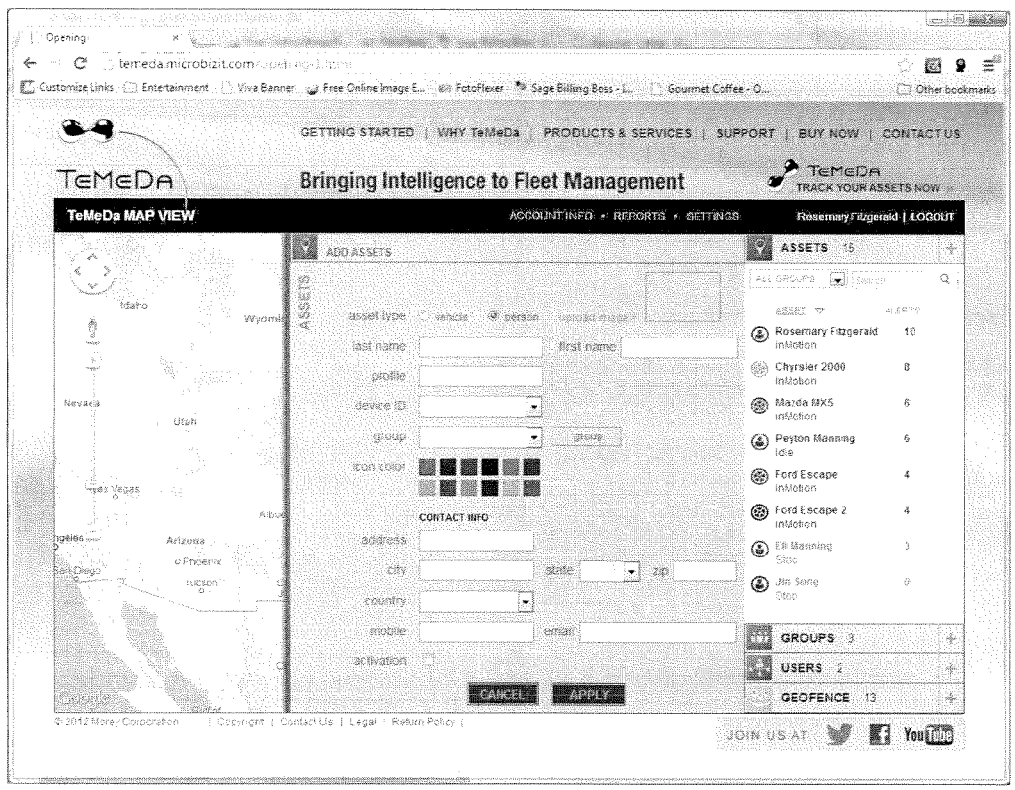
Figure 13:
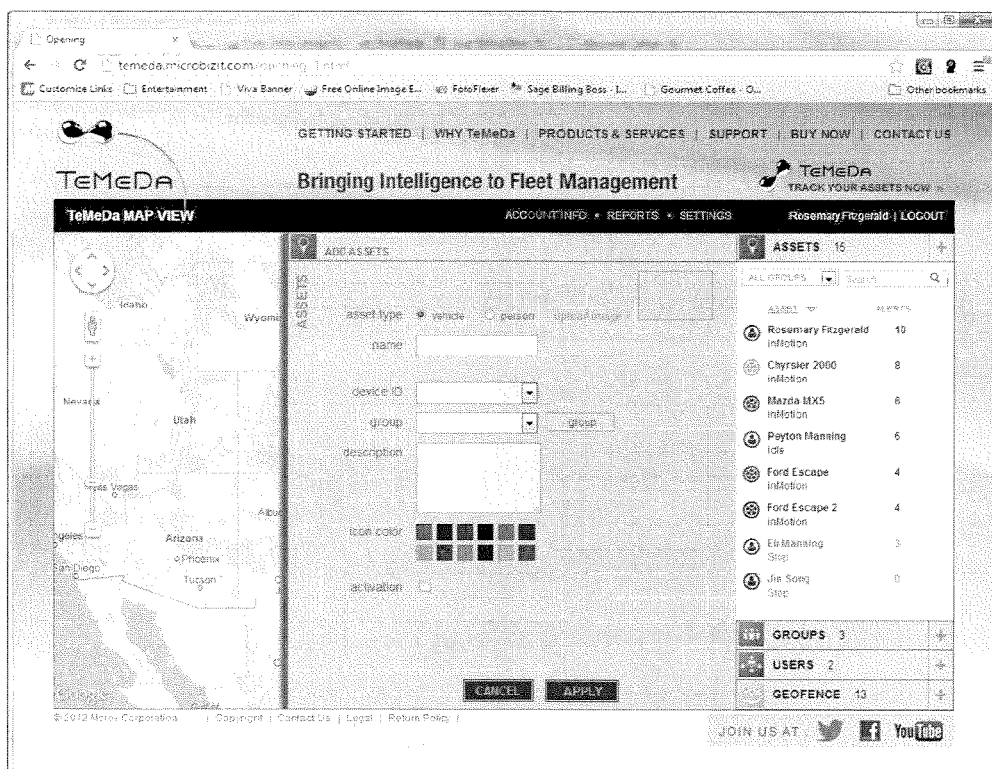

As further illustrated in FIGS. 12 and 13, expandable/collapsible areas may be provided for the display of individual assets (as shown) or groups. Likewise, specific users (i.e., persons having permission to access the graphical user interface or at least portions thereof) and "geofences" (as described below) may also be displayed in a similar manner.

Figure 14:
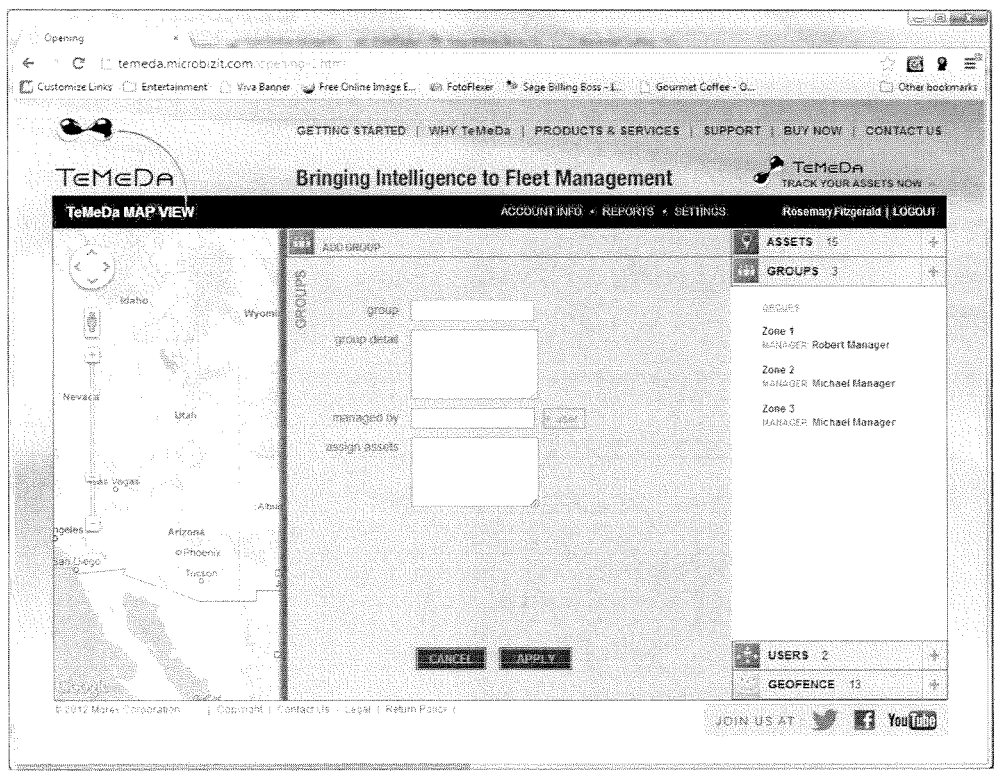

Referring now to FIG. 14, a screen is provided whereby individual groups may be added or edited. As shown, text boxes are provided permitting users to enter information regarding a group name, group details (i.e., a description of the group), identification of a managing user and identification of specific assets included in the group.

Figure 15:
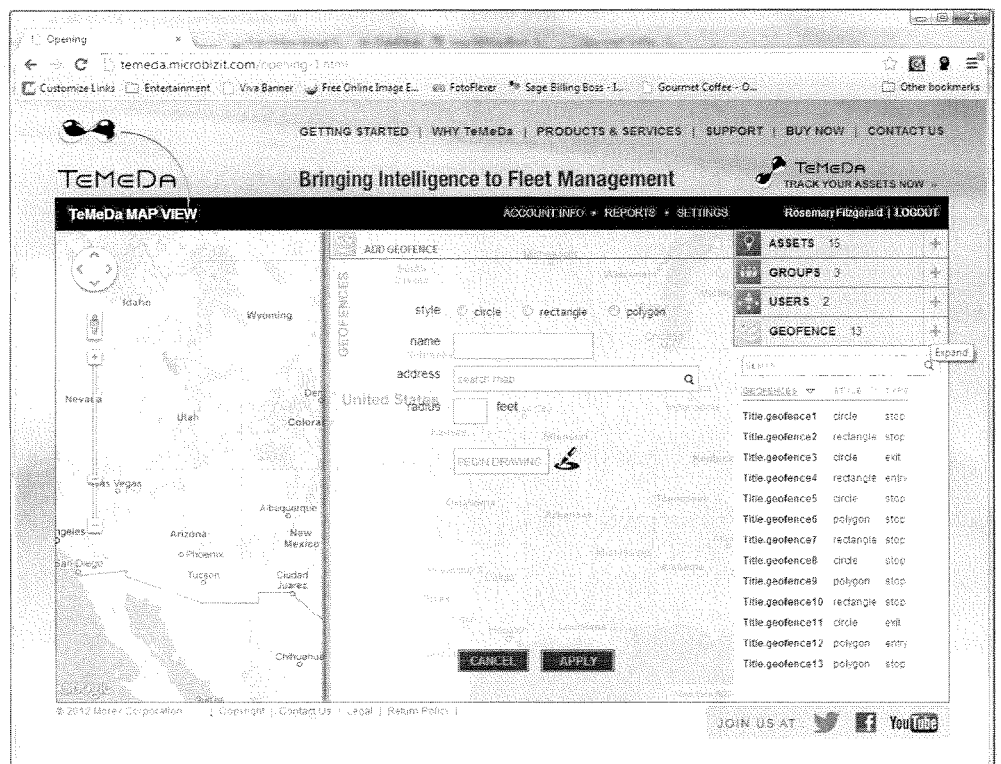

FIG. 15 illustrates a portion of the graphical user interface that permits a user to define a so-called "geofence." As used herein, a geofence is a logical construct describing a boundary that may be used to generate alerts relative to one or more tracked assets. To this end, as illustrated in FIG. 15, a user is provided with various techniques for defining a boundary. Particularly, radio buttons are provided that allow the user to define the boundary as a "circle", "rectangle" or "polygon." A text box is also provided that permits the user to provide a name for the geofence. In the case of a "circle" boundary, the user can provide a specific address via a search text box and further set a radius (via a text box input) around the entered address, thereby defining the geofence as a circle. Although the radius input is illustrated in terms of feet in FIG. 15, it is appreciated that any convenient form of measurement may be employed, e.g., miles, kilometers, blocks, etc. Once defined, the circular boundary can be converted into coordinates that may be used by the system to compare locations of assets with the boundary, i.e., whether assets are within or outside the boundary, and generate alerts or other data accordingly.

Alternatively, selection of either the "rectangle" or "polygon" radio buttons enables drawing tools that permit a user to define the boundary as a simple rectangle or more complicated polygon relative to a map. Drawing tools that permit creation of such shapes are well known in the art and need not be described in detail here. Using known techniques, the boundaries lines defined in this manner may once again be translated to actual map coordinates.

Figure 16:
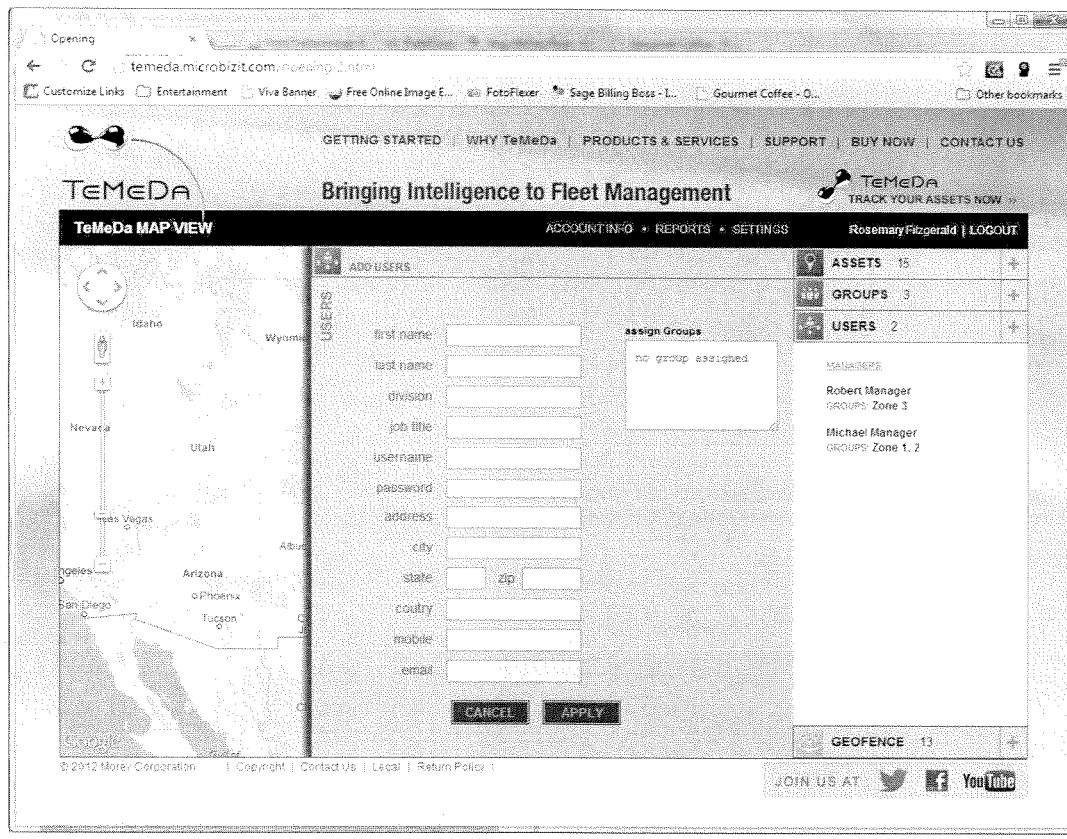

FIG. 16 illustrates a user interface screen permitting the addition of new users. As shown, various text boxes are provided permitting entry of identifying and contact information for users of the system.

Figure 17:
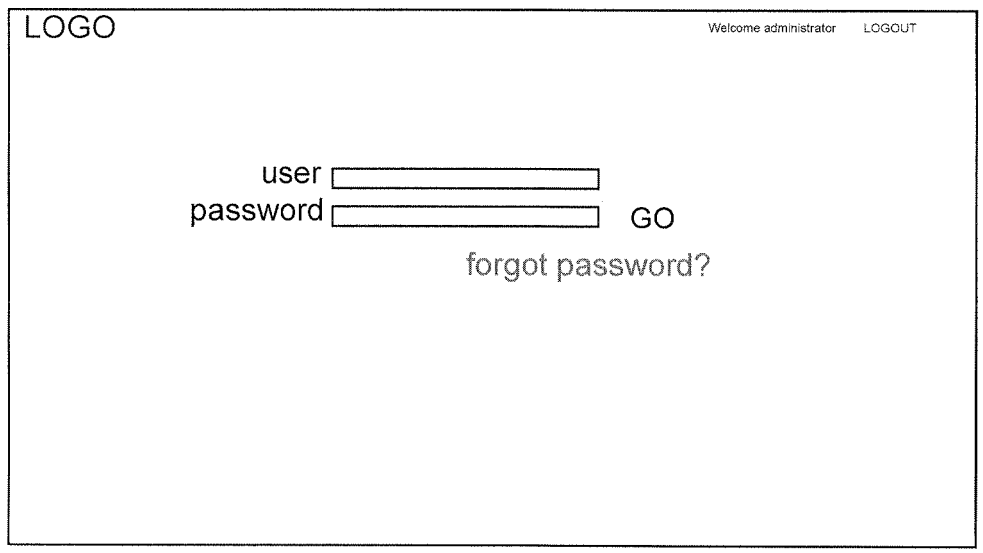

FIG. 17 illustrates a login page whereby users of the system can enter a user name and password to gain access to the graphical user interface. Because the user interface described herein is, in one embodiment, implemented via password protected web services, the user interface may be replicated for different entities or organizations such that each entity or organization is permitted access to only that portion of the system data attributable to the entity's or organization's tracked assets. As illustrated in FIGS. 17-41, a "LOGO" may be provided on the various user interface screens. That is, the user interface screens may be customized for a particular entity or organization to include that entity's or organization's logo or other marketing material.

Figure 18:
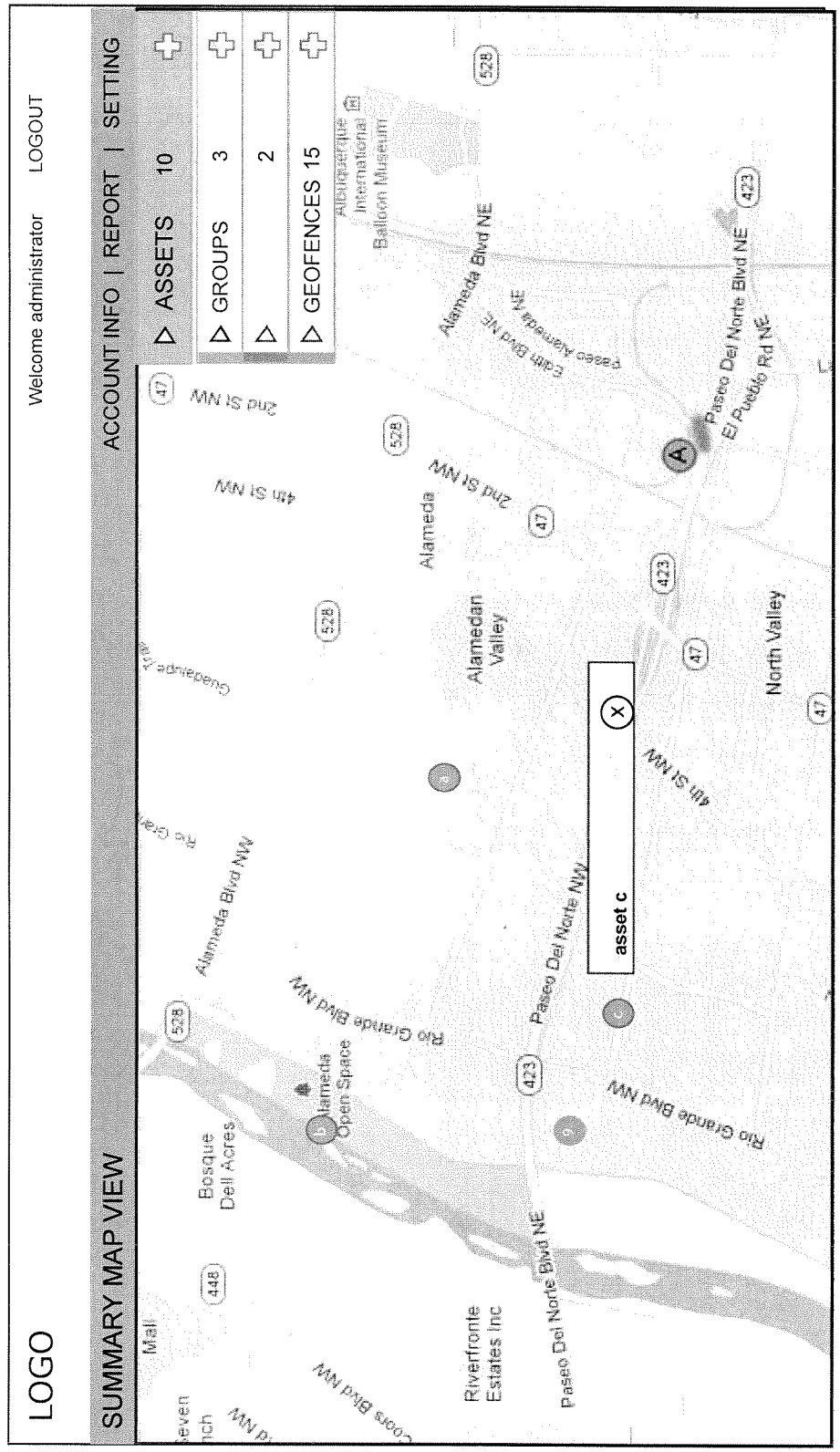
Figure 19:
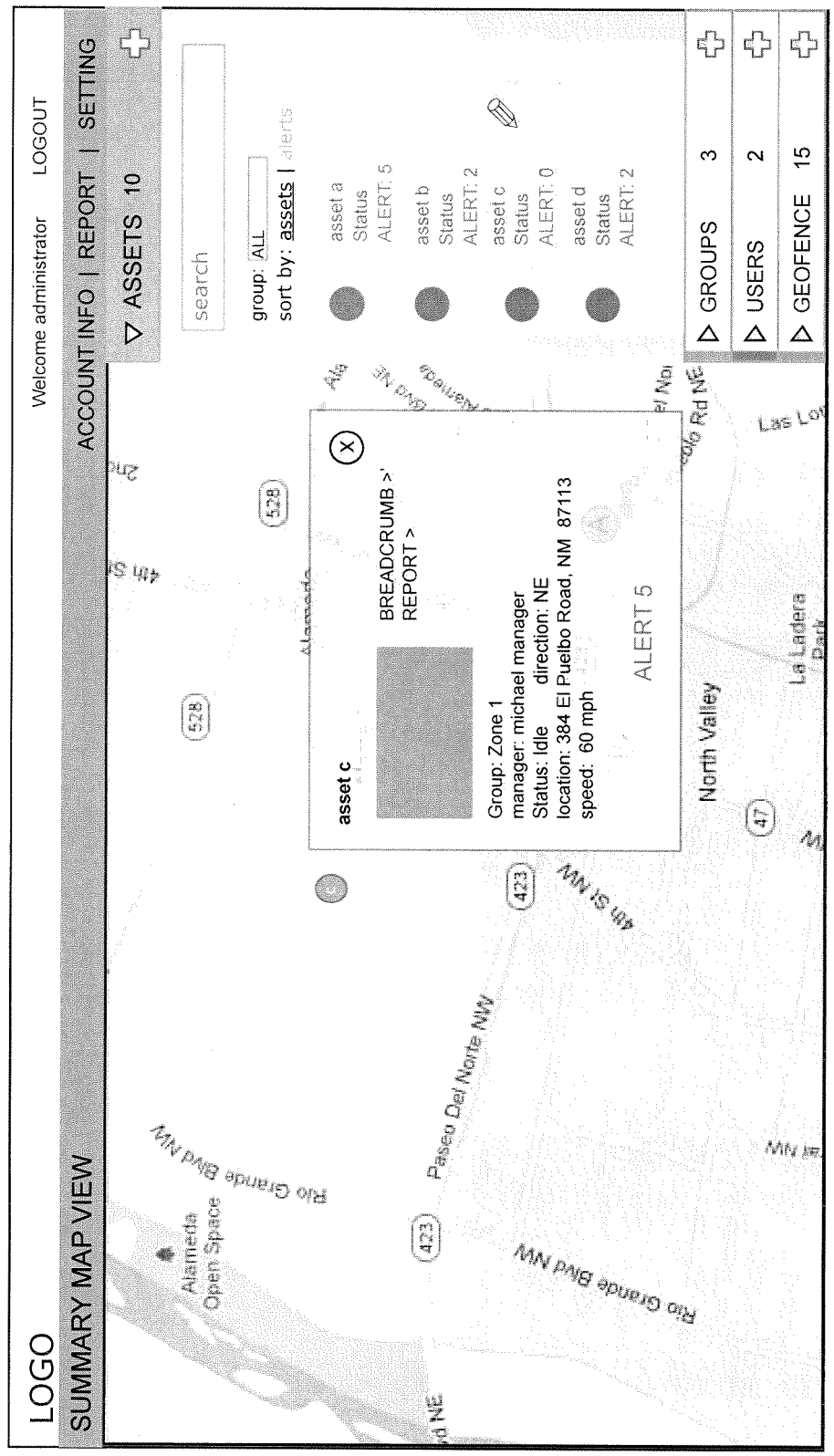

FIG. 18 illustrates a default user screen once a user has logged into the system. In particular, the default user interface screen illustrates on a map all of the assets currently associated with the user's entity or organization. As shown, each asset is illustrated by an icon on the map. User-selectable inputs may be provided on the default and subsequent user interface screens. For example, an "Account Info" option permits users to have information displayed about their account; a "Report" option permits the generation of various user-configurable or statically defined reports; and a "Setting" option permits the user to define various settings for operation of the system for those assets associated with the user's account. For example, the reporting interval for the tracking devices associated with the tracked assets can be set via the "Settings" option.

As further shown in FIGS. 18-35, four main navigational elements are provided: "Assets", "Groups", "Users" and "Geofences." Alternatively, the navigational elements may arise under different labels. For example, and with particular application to an embodiment in which the system is used to tracked vehicles or the like, the navigational elements may be "Mobile", "Groups", "Managers", "Locations", and "Zones". In this alternative example, the label "Geofences" has been separated into two separate navigational elements, i.e., "Locations" and "Zones," where a "Location" is a particular point, spot, address, coordinate set, etc. whereas a "Zone" defines a wider region, area, locale, etc., where a Zone may encompass or be centered on a Location. The number next to each category (e.g., Assets 10, Groups 3, etc.) illustrates the number of separate records for each category. The expand/collapse icon (right-facing triangle) shown next to each of the main navigational element permits the user to display a panel for that category, thereby displaying context-dependent information for that category. In turn, the "+" symbol next to each navigation element permits the user to add to the corresponding category, e.g., to add a new asset, group, user or geofence via the user interface screens described above.

By selecting any individual asset icon displayed on the map, for example, by using a user input selection device such as a mouse ("clicking", "hovering", "double clicking", etc. as known in the art), a label for the selected asset is shown, which label may be subsequently dismissed by selection of the "X" symbol within the label. Alternatively, the user may further select the asset label to focus the displayed map (which may be provided using any mapping service, such as Google Maps) on the selected asset. This is further illustrated in FIG. 19 where the "Asset" panel has been expanded and the asset label has also been expanded to display additional information about the selected asset. As shown, the expanded "Assets" panel includes a search input box that permits a user to search for specific assets, as well as text input box that permits the user to filter which assets are displayed in the panel according to specific groups. Additionally, selectable options are provided that permit the sorting of the displayed assets within the panel according to asset names or the number of alerts for each asset. Much like clicking on an asset icon displayed on the map causes the map to focus on the selected asset and display a corresponding label, selection of an asset within the "Assets" panel cause the map to focus on the selected asset and to display a corresponding asset label. Hovering over an asset selected in the panel causes an edit icon (illustrated, in this example, as a pencil) to be displayed; selection of the edit icon permits the user to edit information specific to the selected icon.

Figure 21:
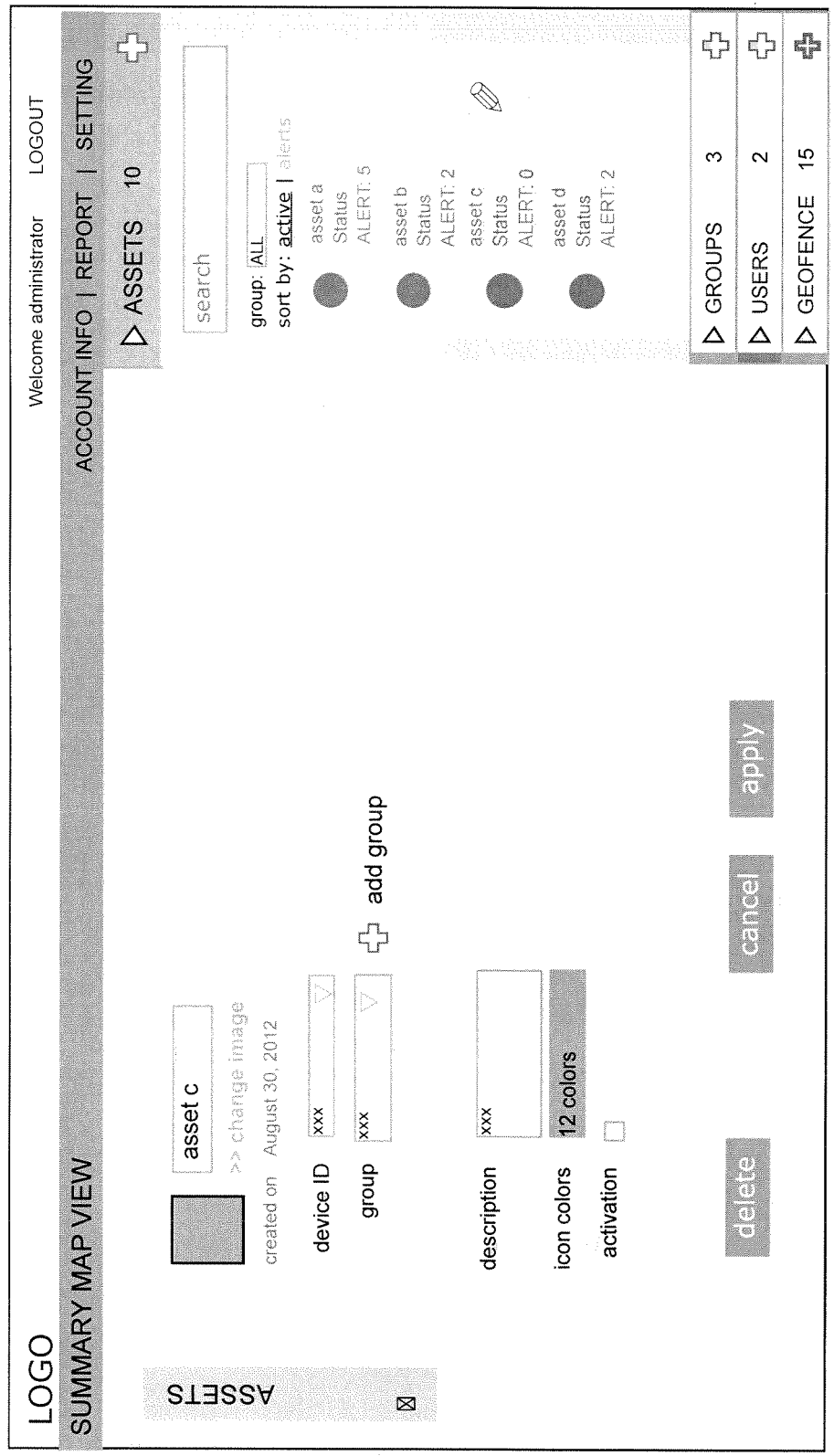
Figure 22:
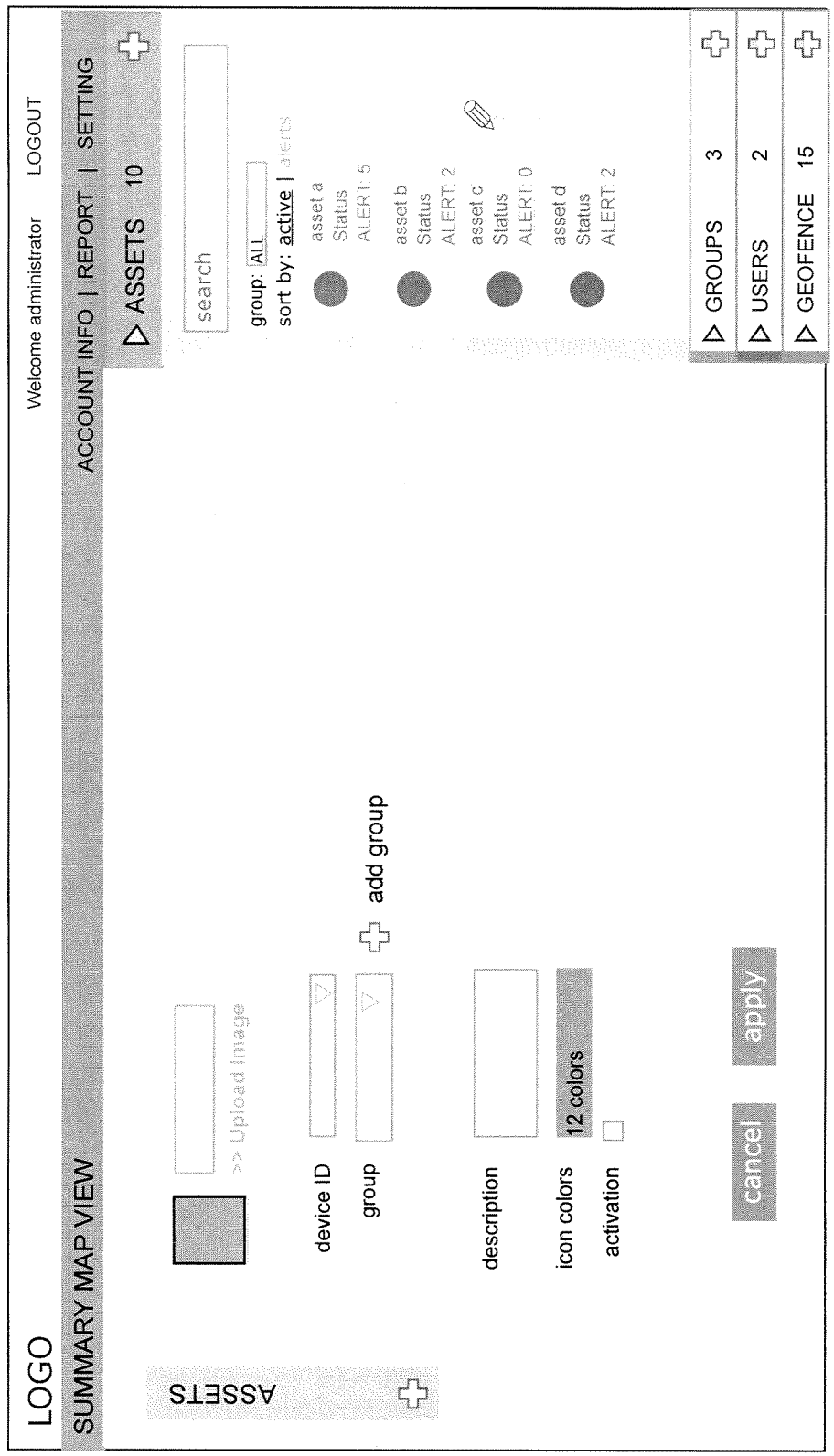

FIGS. 21 and 22 illustrate alternative embodiment of an user interface screen resulting from selection of the edit icon for a given asset. As shown, FIG. 21 is substantially similar to the user interface screen illustrated in FIGS. 12 and 13, with the exception that the user is not permitted to select another asset (i.e., a person) from this screen. Additionally, the edit screens of FIGS. 21 and 22 illustrate user-selectable options for changing or uploading an image, as described below, to be displayed whenever the asset is selected on the user interface.

Figures 35, 36:
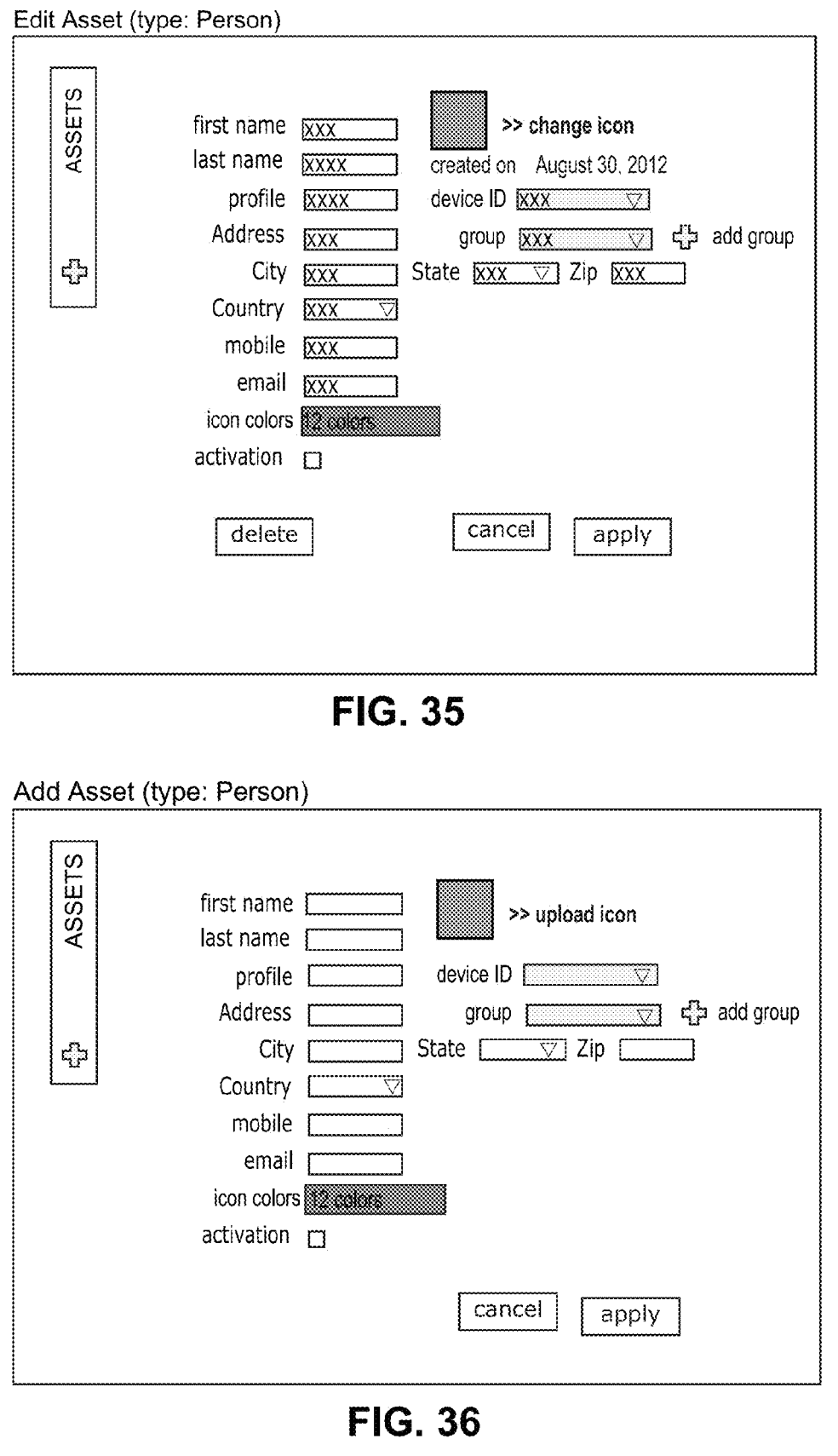

Referring once again to FIG. 19, within the asset label displayed on the map, basic information about the selected asset is displayed, e.g., its group name, manager, current status, location and/or speed. A region (illustrated as a rectangular are in the upper left corner of the label in FIG. 19) is provided that may be used to display a photo or other image representative of the selected asset. A "Breadcrumb" selectable option is also provided. As known in the art, a "breadcrumb" display is an illustration of all of the recent location data for the asset, such that the user is provided with insight as to the recent travels of the asset. In an embodiment, selection of the "Breadcrumb" option causes the asset label overlay to be removed in favor of the breadcrumb display. An example of this is illustrated in FIG. 35 where a breadcrumb trail of "asset c" is illustrated by the red path and green directional arrows. As further shown in FIG. 35, selection of any one of the direction arrows causes the display of an overlay including data for the asset corresponding to a particular point in time, including, for example, the direction, location, speed, etc. of the asset.

Figure 20:
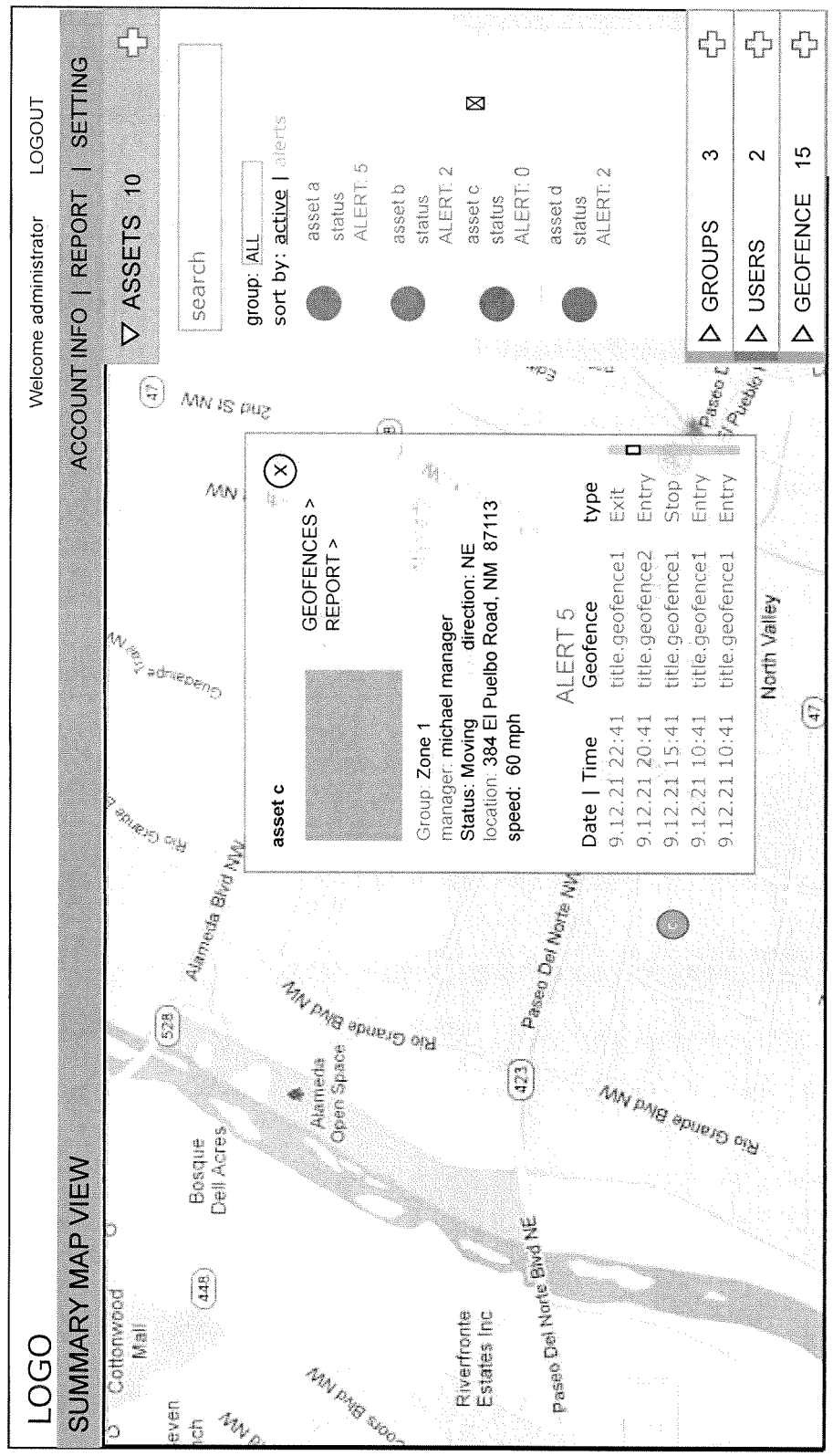

Referring once again to FIG. 19, the asset label may include selectable "Alert" indication. Selection of the "Alert" indication within the asset label of FIG. 19 causes the asset label to expand to show any alerts currently available relative to the selected asset, as shown in FIG. 20. In an embodiment, the available alerts are listed chronologically from most recent to least recent, with a scroll bar further provided if necessary. For example, as illustrated in FIG. 20, each of the alerts for "asset c" relate to the entry or exit of that asset relative to "geofence1." Although not illustrated in FIG. 20, an option may be provided whereby individual alerts may be dismissed by the user, whereby the dismissed alert is no longer displayed (although not deleted from the system database).

Figure 23:
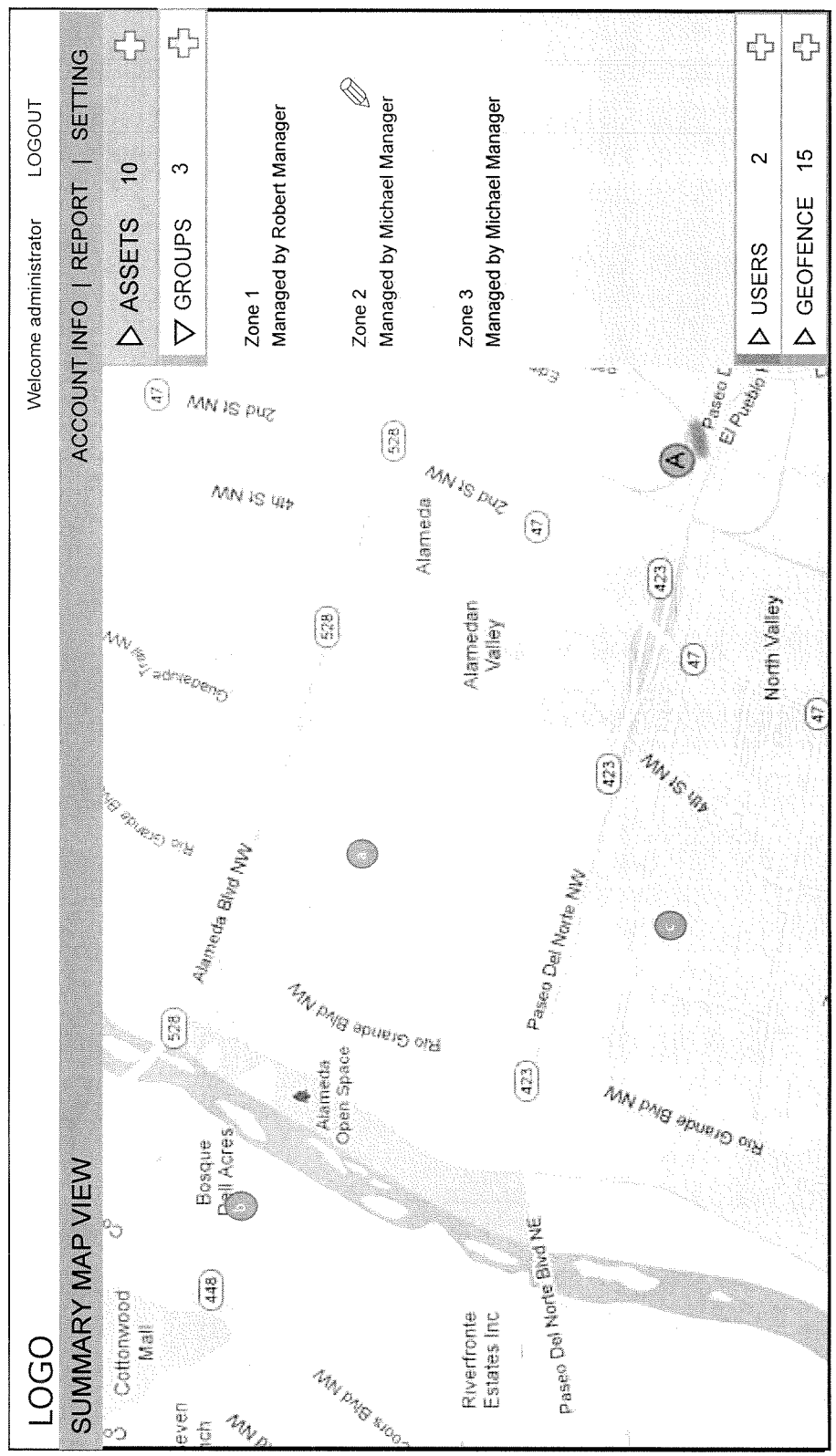
Figure 24:
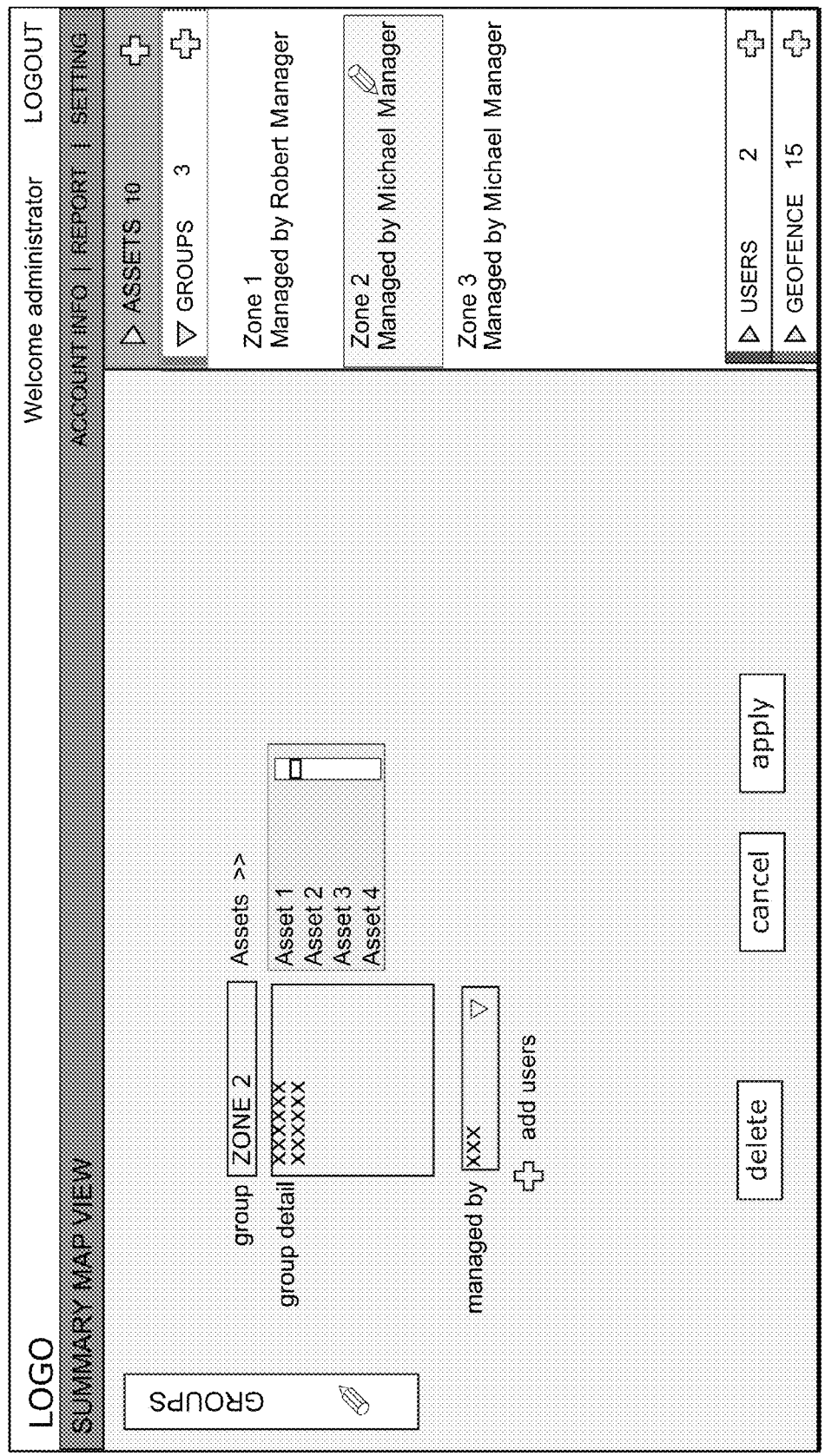

Referring now to FIG. 23, a user interface screen resulting from selection of the "Groups" navigation element is further illustrated. In the illustrated example, three groups are displayed within the resulting "Groups" panel. Further selection of one of the groups, e.g., the "Zone 2" group, causes the map display to be updated to display only those assets belonging to the "Zone 2" group. Once again, hovering over a group in the panel will cause an edit icon to be displayed, whereby edits to the selected group may be entered. Selection of the edit icon causes a group edit screen as shown in FIG. 24 to be displayed. The group edit screen of FIG. 24 is substantially similar to that shown in FIG. 14, with the exception that assets to be added to the group may be identified using a scrollable window listing assets available to be added to the group.

Figure 25:
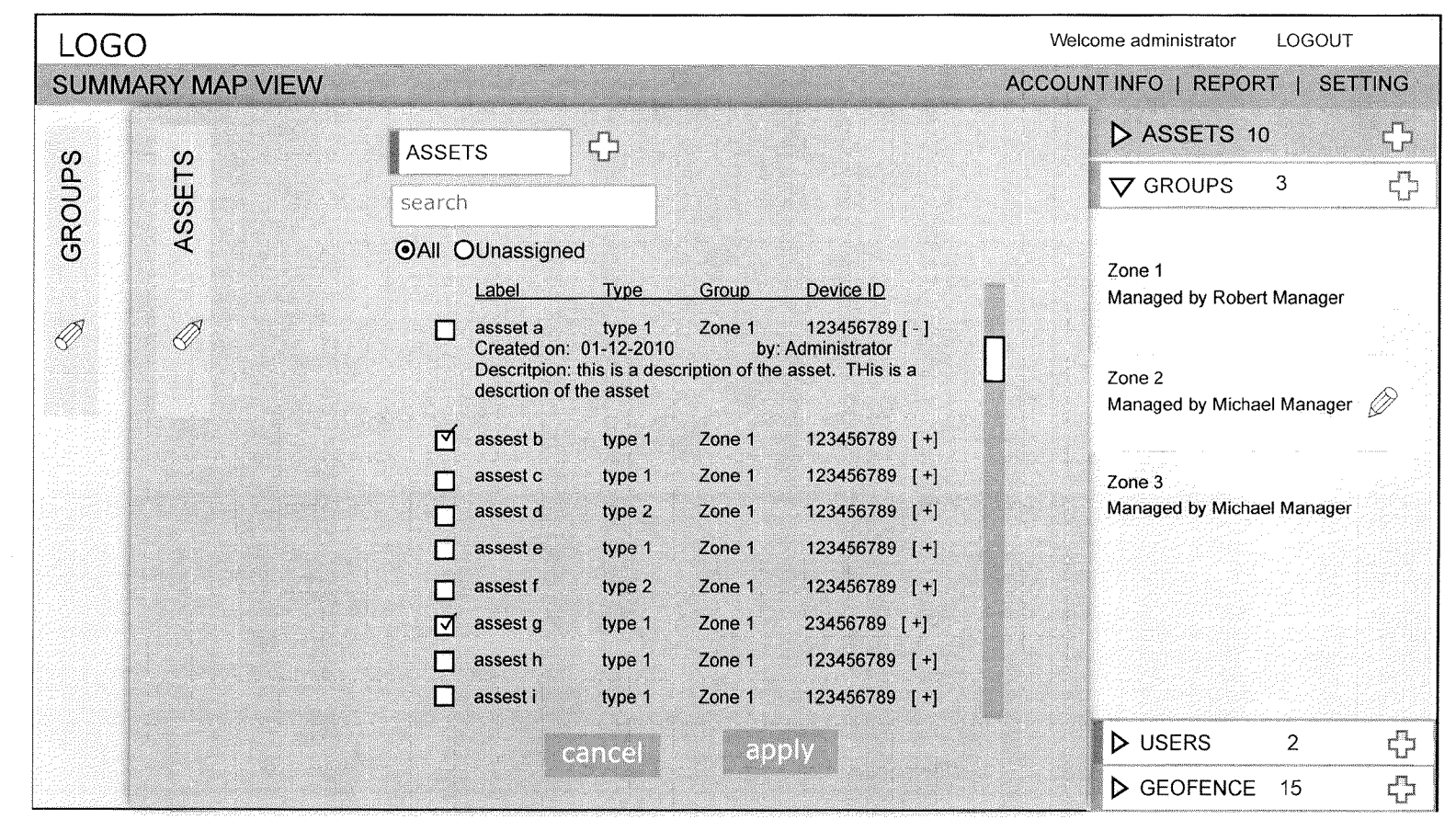
Figure 26:
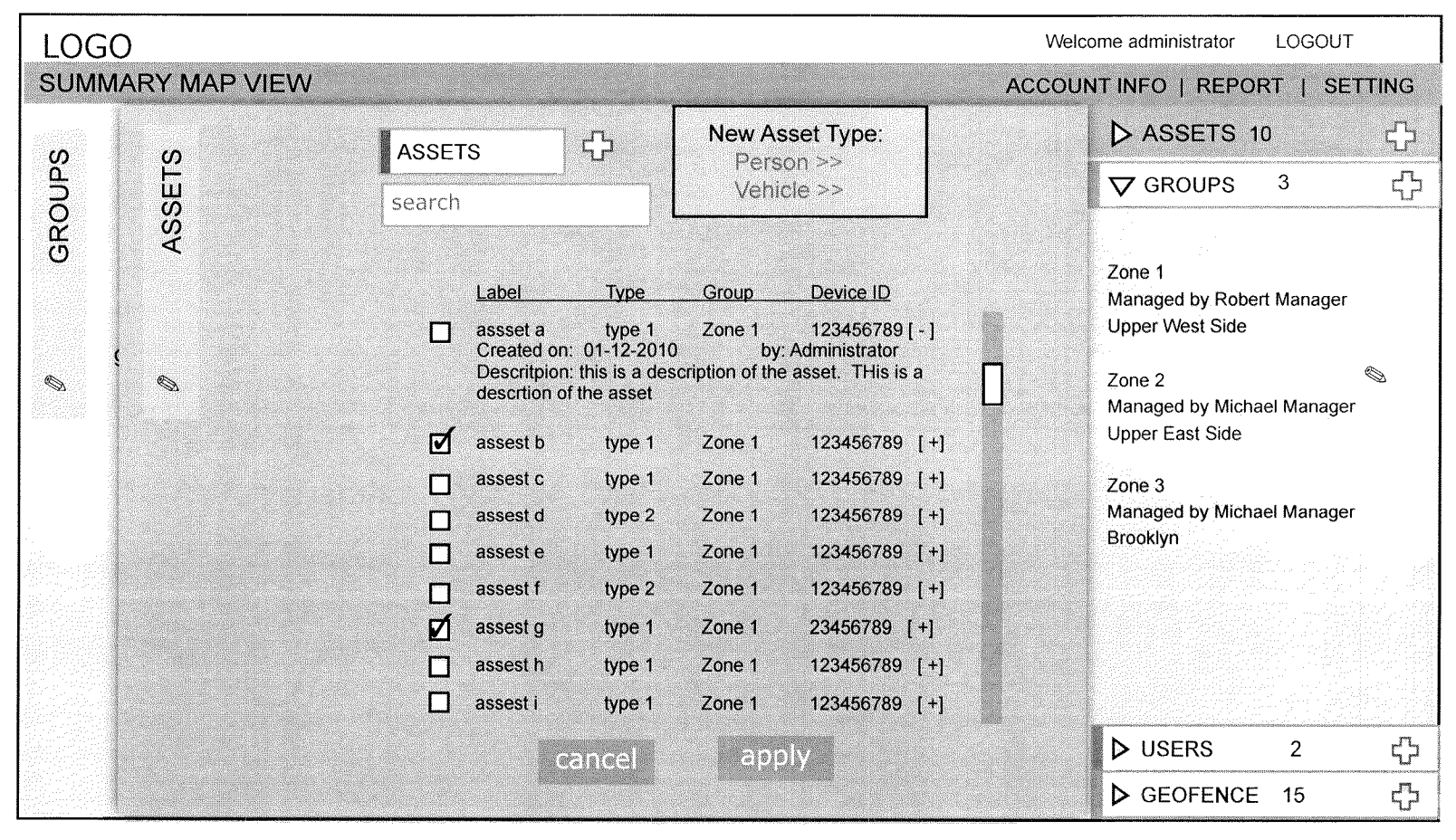
Figure 27:
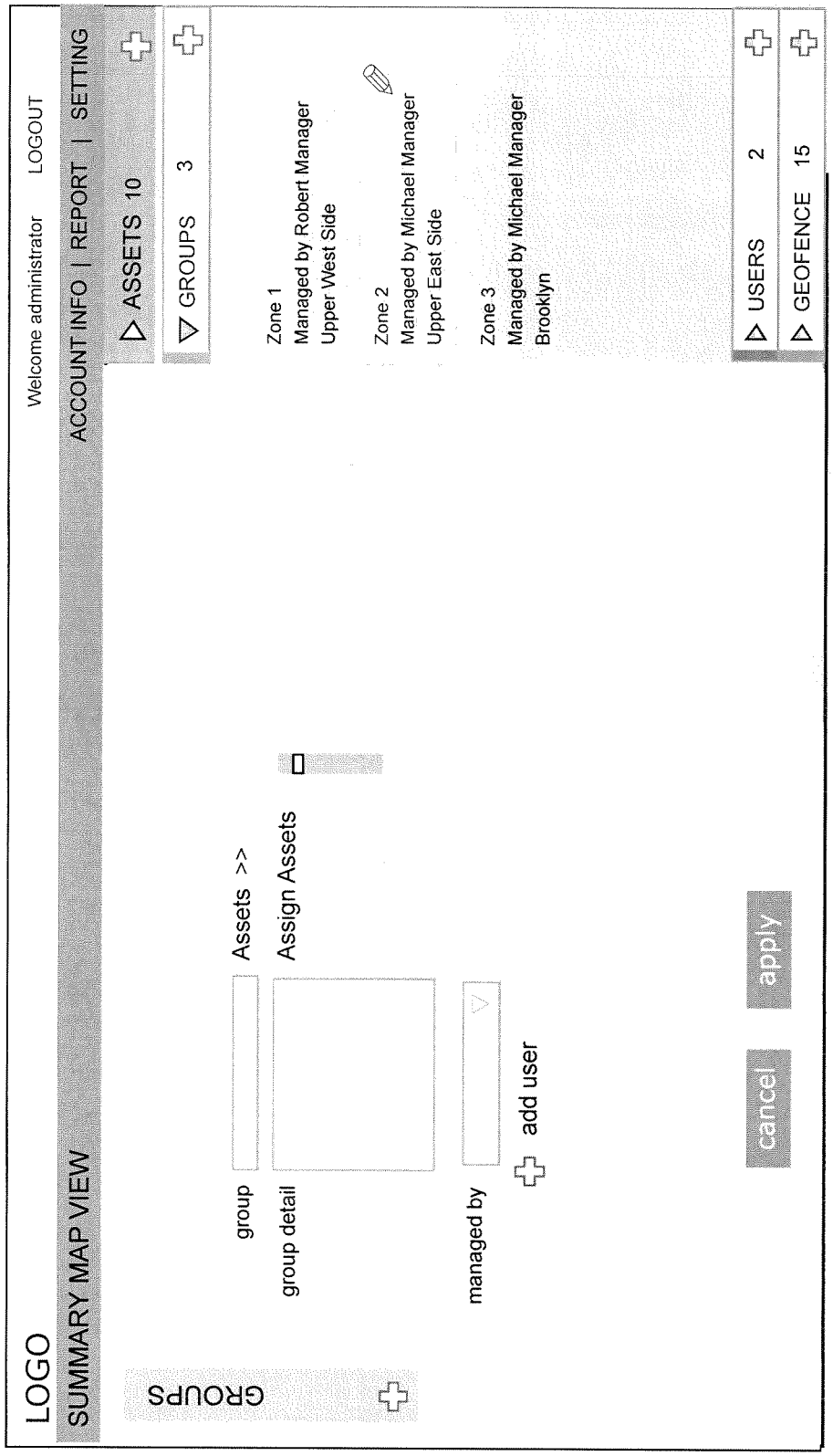
Figure 29:
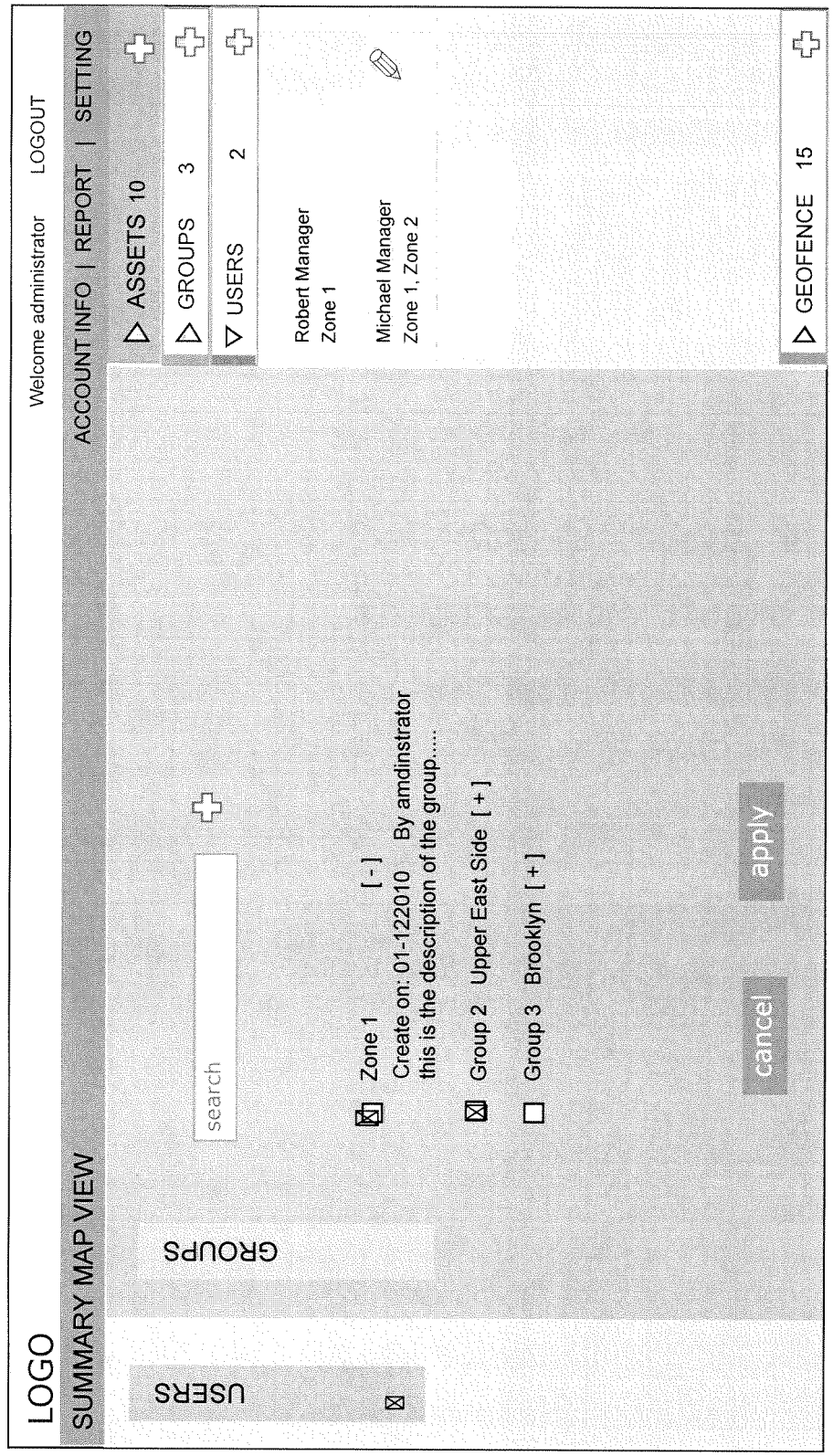

FIGS. 25-27 provide more details of how assets are managed in groups.

Figure 28:
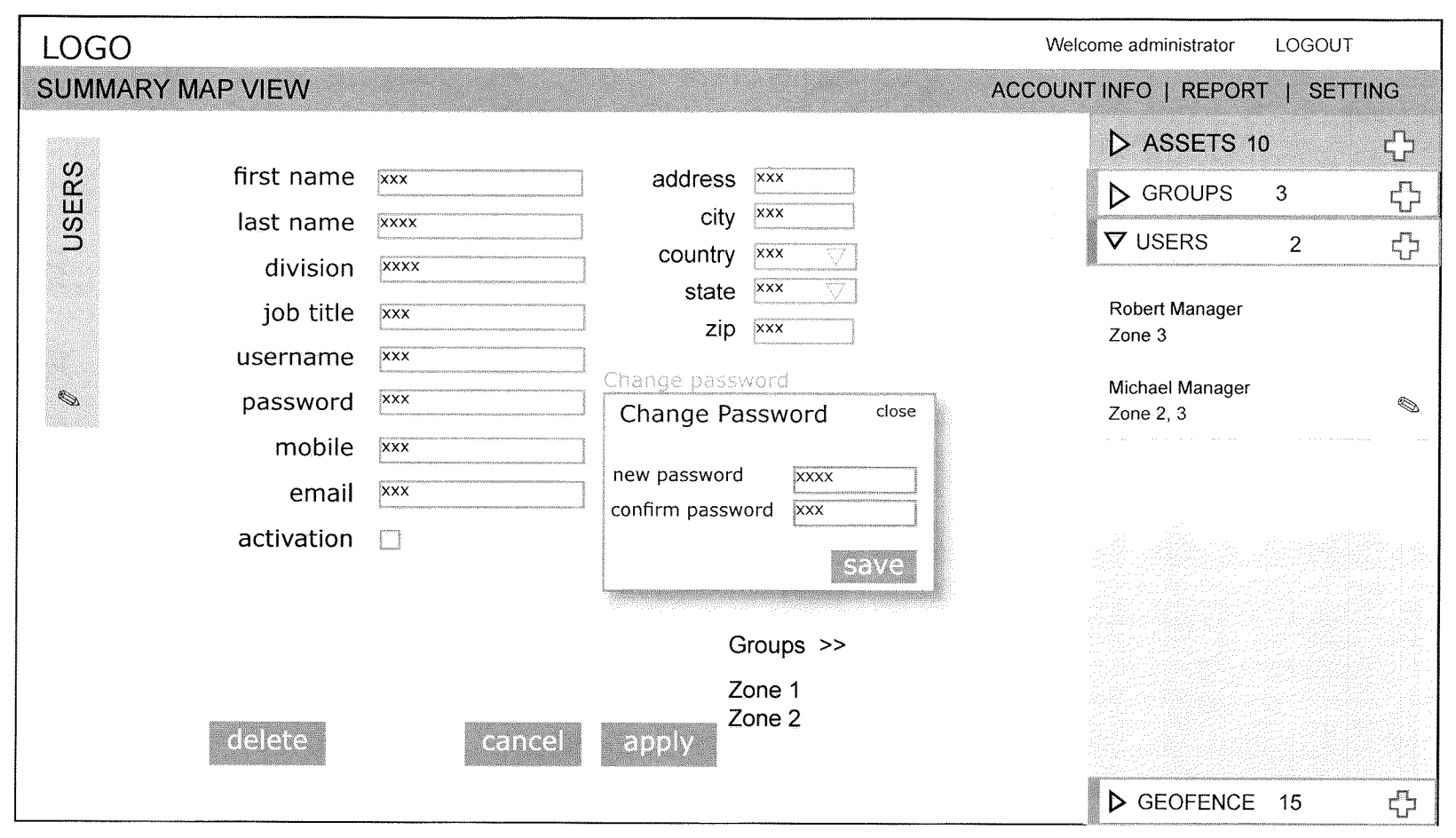

Referring now to FIG. 28, a user interface screen resulting from selection of the "Users" navigation element is further illustrated. In the illustrated example, two users (or mangers) are displayed within the resulting "Users" panel. Further selection of one of the users, e.g., the "Michael Manager" user, causes information about that user to be displayed. As described previously, hovering over any of the listed users causes an edit icon to be displayed. In the example shown, a change password dialogue box is illustrated. As further shown, a "Groups" option is available whereby groups associated with the selected user can be modified. In particular, selection of the "Groups" option causes the display of the screen illustrated in FIG. 29, where a search box is provided permitting searching of available groups. As further shown in FIG. 29, available groups and corresponding descriptions may be displayed. Check boxes next to each displayed group permits the selected groups to thereafter be associated with the selected user.

Figure 30:
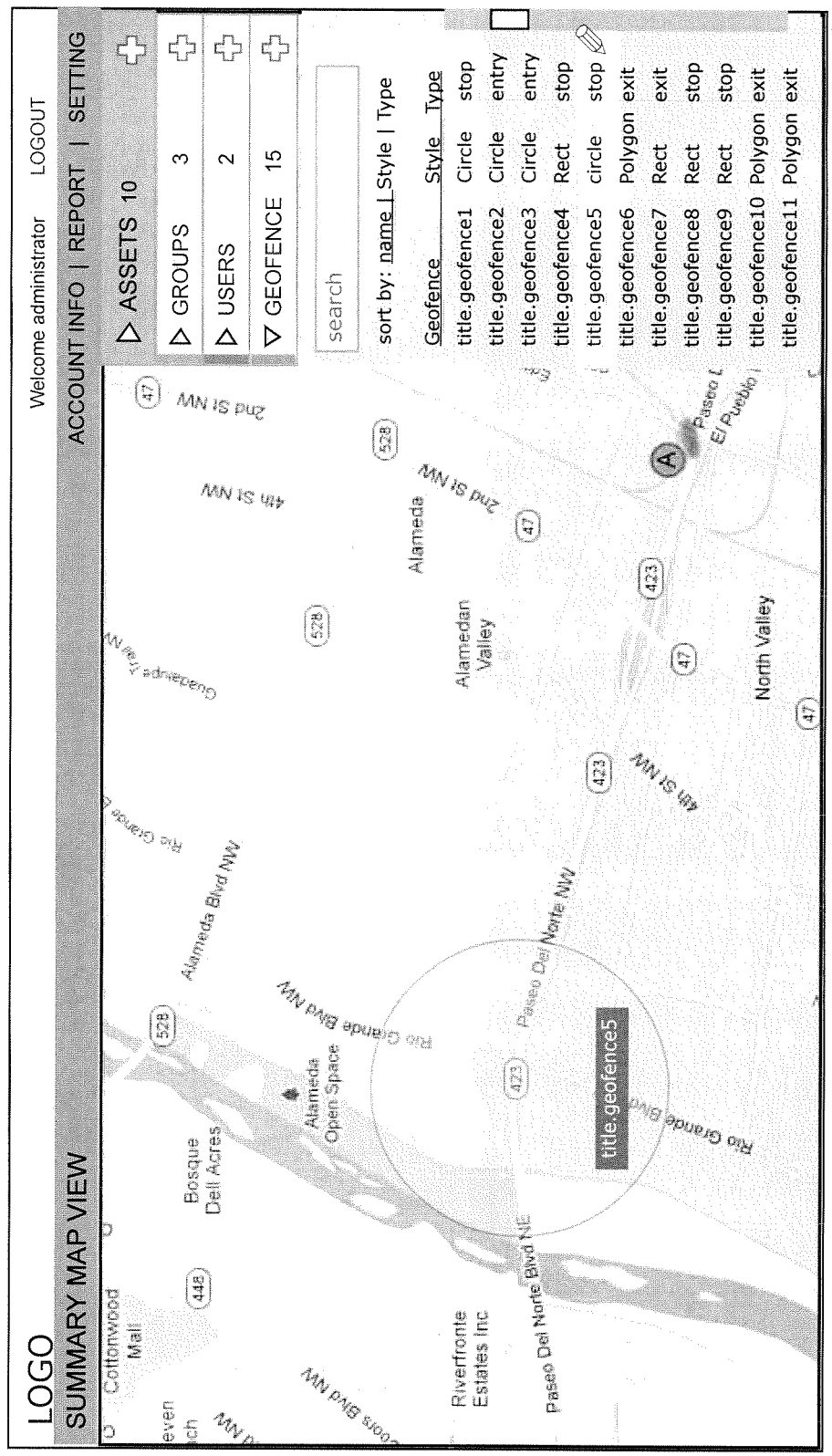
Figure 31:
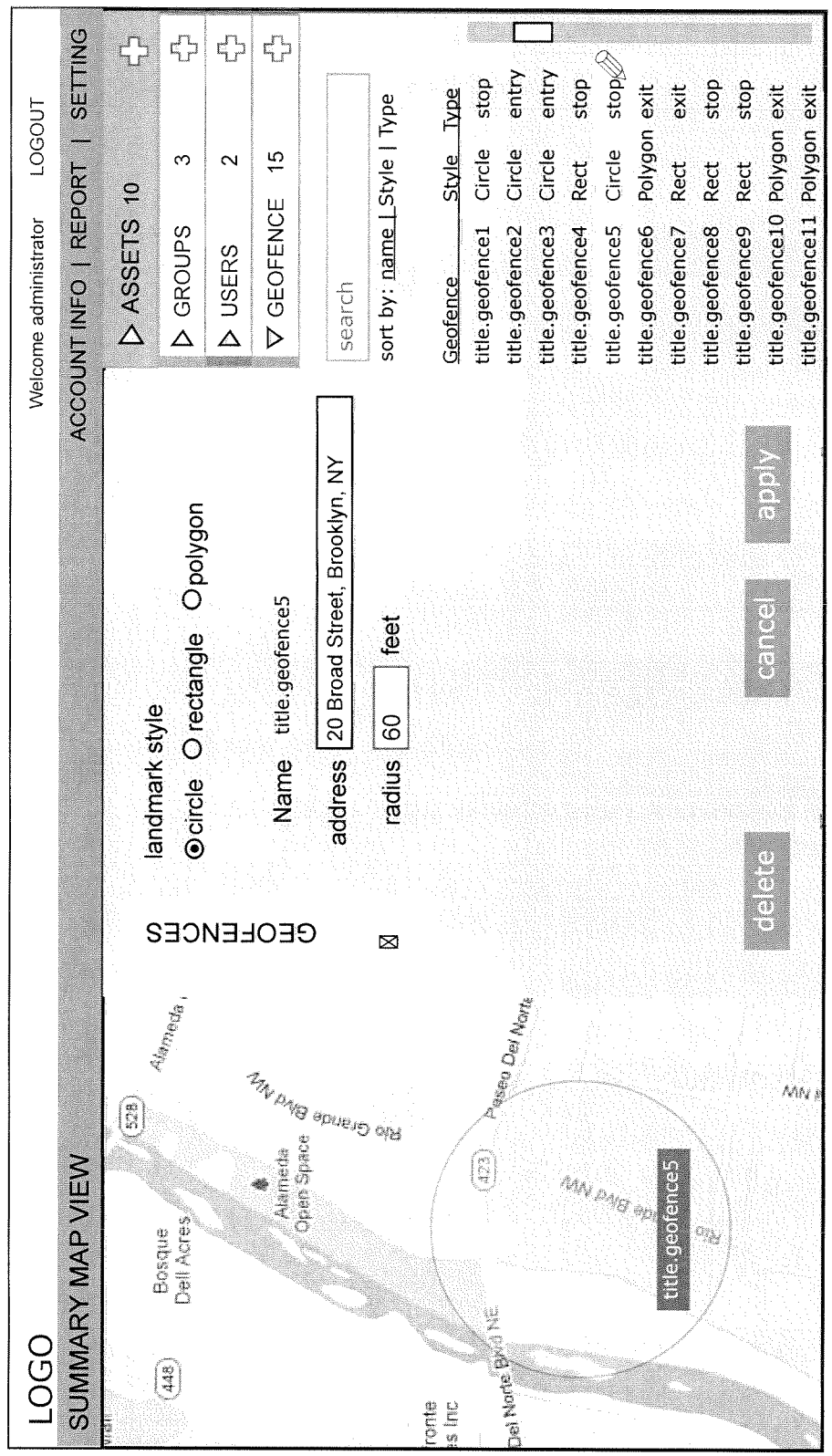
Figure 32:
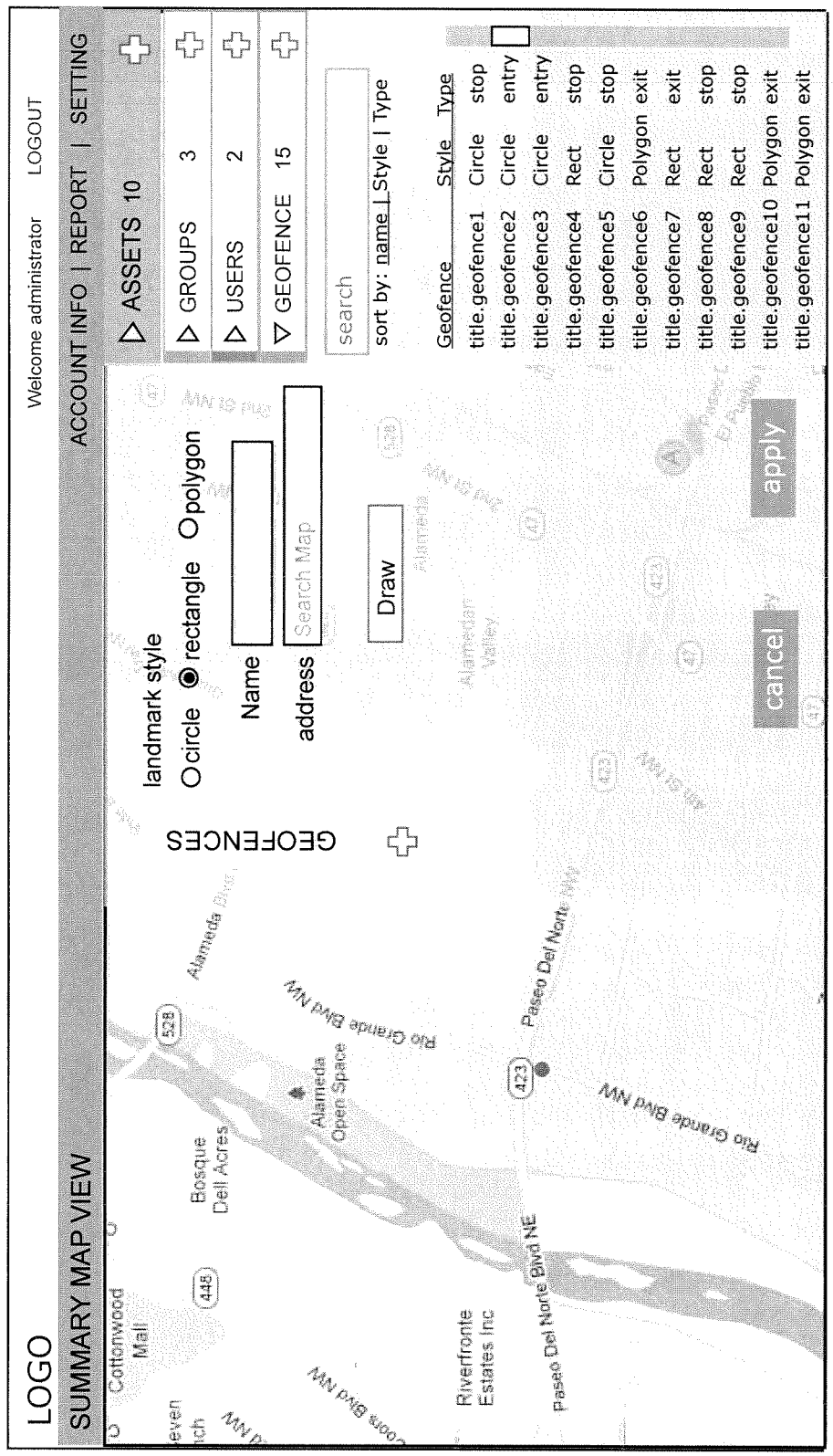
Figure 33:
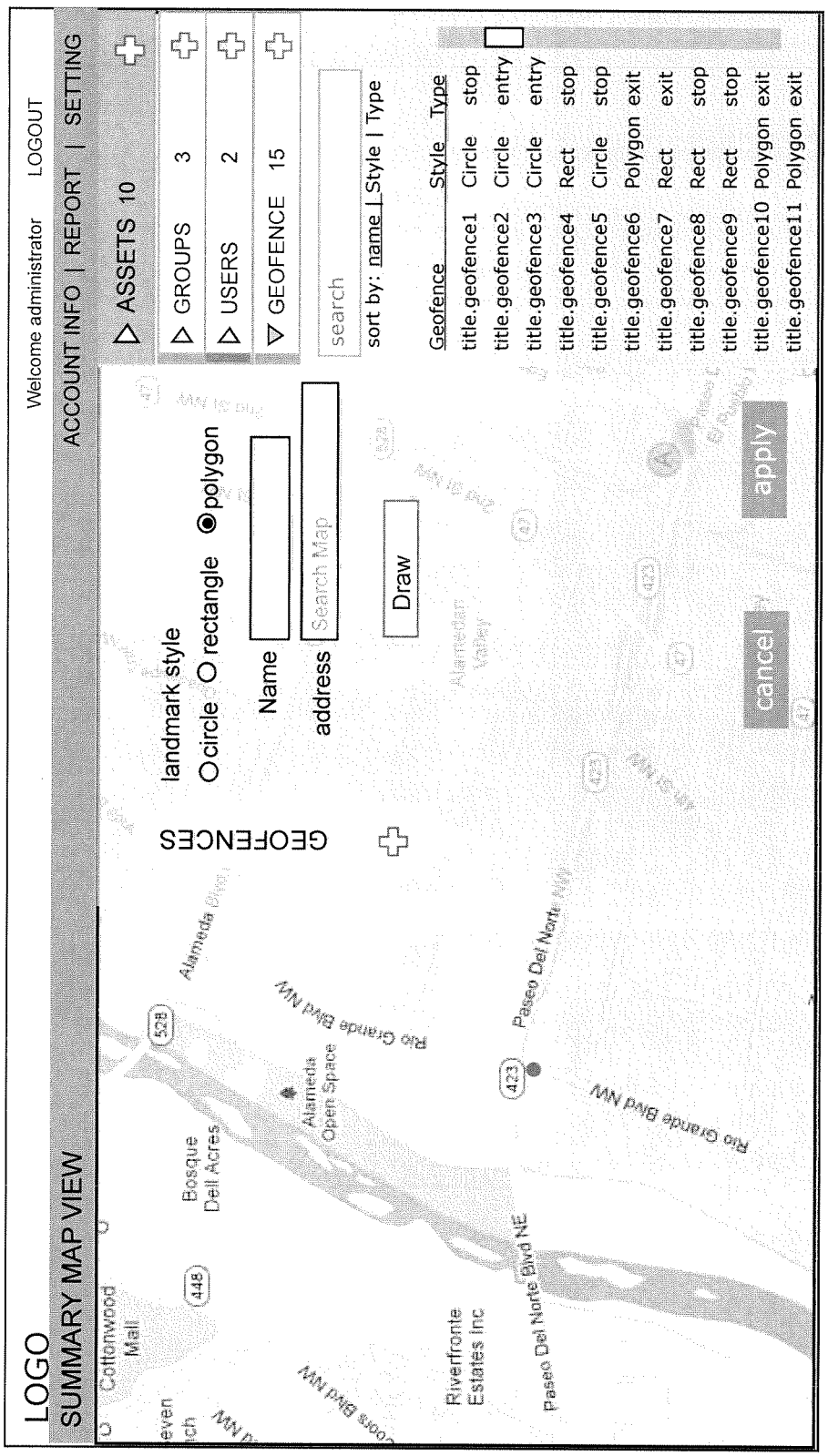
Figure 34:
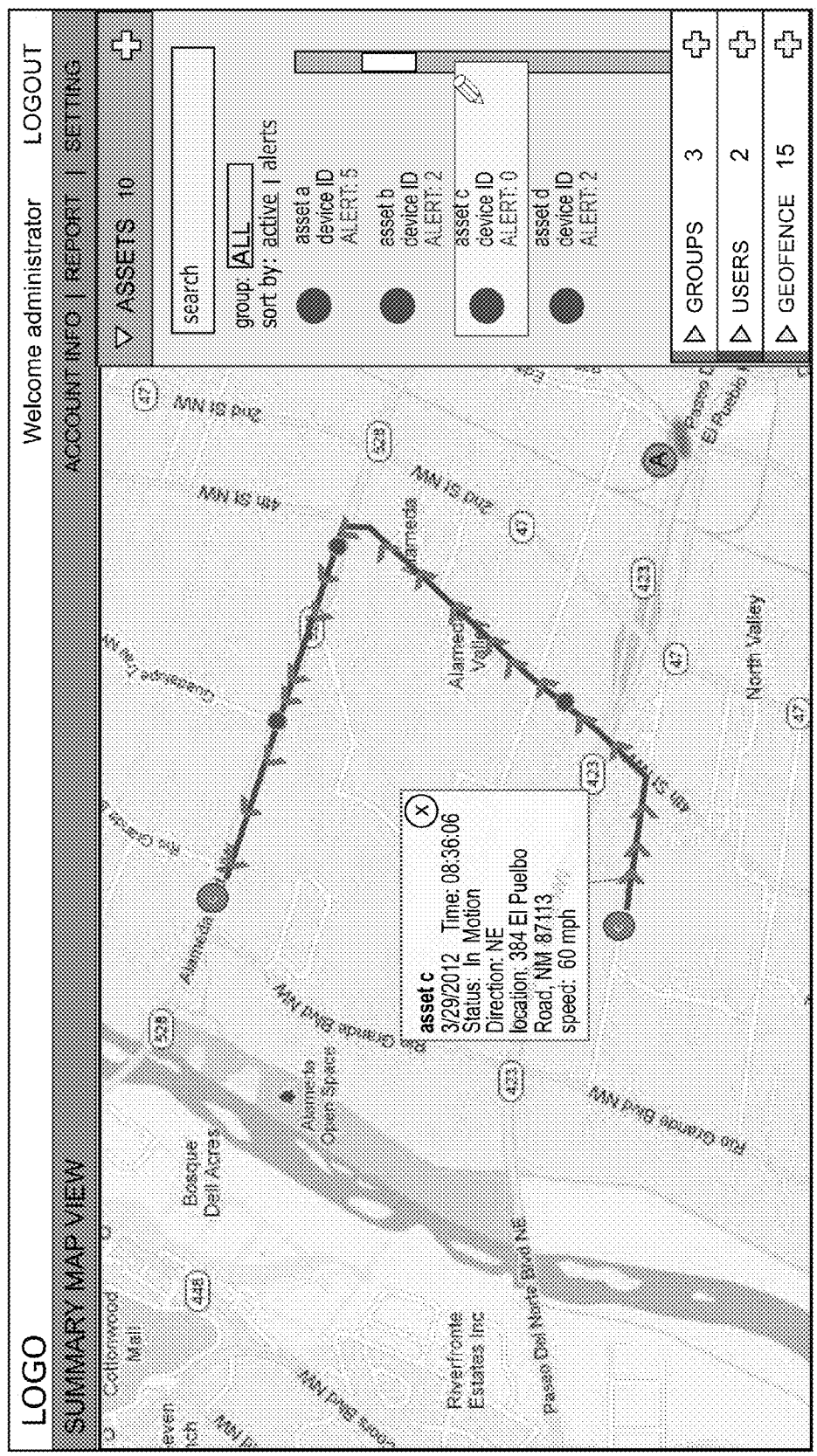

Referring now to FIG. 30, a user interface screen resulting from selection of the "Geofence" navigation element is further illustrated. In the illustrated example, 15 previously-defined geofences are displayed within the resulting "Geofence" panel. As shown, a scroll bar may be supplied thereby allowing the user to view all of the available geofences. Selection of a specific geofence within the panel cause the map display to be focused on and display the boundaries defined by the selected geofence. For example, as illustrated in FIG. 30, the selected geofence "geofence5" is illustrated as a circle on the map. Once again, hovering over a geofence entry in the panel will cause an edit icon to be displayed, whereby edits to the selected geofence may be entered. Selection of the edit icon causes a geofence edit screen as shown in FIG. 31 to be displayed. The geofence edit screen of FIG. 31 comprises functionality substantially similar to that described above relative to FIG. 15. When the geofence edit screen is displayed, it defaults to the original style of the selected geofence, i.e., because "geofence5" in FIG. 30 is defined as a circle, the geofence edit screen of FIG. 31 defaults to those inputs available for editing a circular geofence. However, as further illustrated in FIGS. 32 and 33, editing of a geofence may include redefining the geofence as a rectangular or polygonal geofence using the relevant radio buttons.

FIGS. 35 and 36 illustrate alternative embodiments of user interface screens for editing information regarding a person-type asset. The embodiments illustrated in FIGS. 35 and 36 are substantially similar to the embodiment illustrated in FIG. 12 and described above, with the exception that FIGS. 35 and 36 include user input options permitting the modification and/or uploading of an image to be displayed whenever the asset in question is displayed on a map display.

FIGS. 37-40 illustrate screens that may be used by a user to purchase a subscription for one or more tracking devices. As shown in FIG. 37, a user may enter a quantity of each type of subscription desired and then proceed to a checkout screens, as illustrated in FIGS. 38 and 39, where the user can enter payment information to complete the transaction. Thereafter, a transaction confirmation screen, as illustrated in FIG. 40, may be provided.

The above user interfaces have thus been designed so that they render itself automatically based on the facts being collected. This makes the user interface extensible. The characterization of the facts are laid out in tables—so it is possible add a new alert by adding a new table entry. Alerts are at the server level and/or at the device layer. The translator will transmit new fact information, which gets stored as a unit of measure for this fact. The user can set up its own preference for what they want to see in this fact. Then, the new fact information may become a triggerpoint for the fact itself. Fairly definable features may be based on the "create alert" user input screen.

The user interface tells at a glance whether the fleet is moving or not (red means fleet is not moving enough). These indicators are all actionable. Which ones do I reward for moving? The system administrator or dispatcher can figure out which assets are which, and can take action from that. The system is absolutely configurable. By configuring the alerts, it is possible to automatically configure a new geospatial mapping interface.

Example Non-Limiting Architectures for Trusted Execution and Delegation

FIG. 41 illustrates an example non-limiting architecture for Trusted Execution and Delegation. Leveraging a trusted execution environment is in one example non-limiting embodiment comprised of (2) the trust root and engine, combined with (1) trusted applications. Using such combination it is possible to delegate the use of processing and resources from one trusted application to another.

The FIG. 41 diagram depicts trusted applications running on the same device. Leveraging digital signatures with included rules, applications may be resident on separate physical devices for example if digital signature verification is accomplished within the same key space. In this way, it is possible for one trusted application to "delegate" authority for a task to another trusted application if it has both the capabilities and authority to do so.

For example, if App(1) and App(2) are authorized to and capable of making cellular data calls, and App(1) is not able to transmit data on schedule, it can delegate this function to App(2).

Delegation is accomplished in some non-limiting embodiments on a configurable time and/or usage basis and may be for one time, for a specific number of times, until a particular end date/time or permanently.

Trusted Applications in this example non-limiting context may be applications that have: a) a published set of capabilities that are published on the Trust Bus (5); b) a set of rules governing the capabilities of the application; and c) a digital signature that ensures integrity of the application, its published capabilities and rules while demonstrating authenticity of the issuance of the application.

Trusted Root and Engine provide on demand highly secure processing and governed access to input/output devices attached to the device. Trusted Applications (1) are able to call on the more secure functions.

The example non-limiting application provides access logic and a publishing model for capabilities. These published capabilities, and the authority to run are verified by the App Interpreter (4). The app interpreter runs in a protected memory partition setup by the trust bus (5).

The App Interpreter (4) verifies the application's digital signature, rules, capabilities and formats to a common format for all app interpreters on the Trust Bus (5) to have a common modeling language for capabilities and rules based permissions. App Interpreters run within partitioned memory as defined by the Memory Control Unit (MCU). One example non-limiting mechanism is to use a hypervisor to provide the mapping and governance functions for volatile memory ensuring sensitive "app interpreter" and "trust bus" operations cannot be observed or modified by unauthorized software.

The example non-limiting Trust Bus (5) runs in partitioned memory protected from unauthorized applications. In some example non-limiting embodiments, only "app interpreters" are authorized to add, delete, modify to mappings in the Trust Bus. The Trust Bus publishes capabilities of applications, maintains their associations with hardware I/O (9), and determines the outcome of delegation requests.

The Brokered Services Interface (BSI) (6) in this non-limiting embodiment is software that enhances traditional Remote Procedure Call (RPC) protocols by including event driven triggers, and enables secure communications between the Trusted Processor (8) and the Trust Bus (5).

Trusted storage (7) provides protected on-chip storage for to maintain integrity if sensitive data items and ensuring secrets are not revealed outside the protective boundary.

The trusted processor (8) runs a trusted OS of known good software, verified at boot using a certificate and has dedicated volatile memory for sensitive operations to be protected from reading or changes.

The Trusted I/O Bus (9) is software that receives all read and write requests to devices connected to the Bus. It validates read and write attempts and verifies validity by verifying the digital signature. While this architecture requires the additional overhead of verifying all read and write requests, it can be made more efficient using symmetric key HMACs. This example non-limiting architecture that enables delegation between different applications.

FIG. 42 is an example non-limiting illustration of delegation between separate devices that share the same cryptographic key space. The Trust Bus is virtually extended over the wireless link. Thereafter all operations act the same as if when App(1) resided on the same Printed Circuit Board (PCB) as in FIG. 41.

This example non-limiting architecture enables the physical separation of devices that are logically part of the same secure logical device. This architecture in turn enables "remediation".

In the case where a device is found to be operating outside of prescribed limits, or there is a belief that the device is compromised, it is possible to create a connection—wired or wireless—to a conformant device. The conformant device is able to either reflash the device with trusted software and/or update keys in the Trust Engine.

Remediation may also be performed remotely over cellular or satellite connection. Remediation in some example non-limiting embodiments is bearer agnostic.

NON-LIMITING EXAMPLES

Example I

In one example non-limiting implementation, every interaction done with the map is centered around a particular location including an elevation. The system can inform people about exceptions that they are interested in, for example: A time of idle, or a lengthy stop. The environment and interests of the user varies depending on the particular case. For example, some may wish to monitor threats to safety for example of the driver, the asset or environment. Others may be interested in the maintenance of vehicle or machinery. Some may be in interested in productivity. The system is configurable to configure what alerts a particular user wants. Different devices 150 can collect different types of data/facts, and extensible devices can collect facts that current designers are not thinking about today. The system is able to configure alerts for those new facts. Design and application allows the system to accept new set of facts and based on the data we can store the data in the STAGE database 200, and the user interface will automatically allow a user to configure an alert based on those new facts (for example, I want to know about speeding for a certain amount of time). The speed and the time gap will be captured to define speeding, and which zones or which locations are ones of interested can be used to define the zone locations. If an asset's engine is overheating, it is possible to configure the temperature the engine should be operated at. Biometric data is also collected. The challenge is solved herein by the user interface: when the alert type is "location entry" the user selects which entry he is interested in. This fact of location has been described in the location database. When the user switches it to speeding, what is collected may change to speed and time. The example non-limiting user interface has been designed so that it renders itself automatically based on the facts being collected. This makes the user interface extensible. As discussed above, the characterization of the facts are laid out in tables in one example implementation, so it is possible to add a new alert by adding a new table entry.

The TCOMM and TCOMM database (communication component) uses a standard off the shelf content management system employed as a publishing process. A published page goes from private draft to public page. We can assign roles to various people who can do whatever they wish in the publishing process. We can then empower someone else to authorize publication. We can operate the system with any other environment. Different dealers or other users can use their own rebranded version.

Example II

Mobile Install App

Installation and getting things set up in vehicle on a rollout is where most of the initial work is. Installation/provisioning/activation—enrollment mobile app is performed allowing access to the solution via a smart phone or other user device. Provisioning and installation data collection and management provides simple processes for installing telematics devices 150. For example, asset name, mileage, condition and other information is collected and put into the database. Generally in the past, people would fill out a paper form and then handkey this information in. One example non-limiting implementation makes this electronic and just in time. An account's administrator (owner) mobile extension of the web interface is used for this purpose. We also have a mobile user extension so they can use their smart phone or other interface device to access information from the device.

A smart phone app is provided to manage an install. This allows the owner to have a management tool to self-manage the installation. The client purchasing the system can use this installation app on the smartphone to manage the installation. The app takes the field data related to installation and provides it for incorporation into the database. The device can take a picture of a 2D symbol, or use Bluetooth to access the device, or type in an identification for the device. The installer can provide authorization based on serial numbers associated with the installation job. Meanwhile, the mobile device can obtain various information including the VIN from the vehicle itself. However, this does not indicate the tag number or other more commonly-used identifiers for the asset, which can be inputted in addition. Therefore, some additional data entry may be inputted upon installation to ensure the mobile device is properly bound with the vehicle or other asset.

Smaller fleets (e.g., less than 100 mobile employees) do not necessarily have a dedicated installer. This tool allows smaller customers and other users to "do it yourself" without professional installer support and associated expense.

Example III

Profile User Interfaces

In one example non-limiting implementation, there are two different types of user interfaces: the owner and the worker. These two classes of users have different objectives and may have different technical and other capabilities and interests.

A field service company example may be a plumbing company. Their customer has a plumbing emergency. They call the plumbing company, who sends a job request out to the field to dispatch a field service representative. The system allows the dispatcher to track the field service representative as they travel to the house via GPS tracking. There are also other aspects such as time keeping, collaboration, submitting bid and accepting bids in real time.

The example non-limiting system provides for transparent field data to be sent to the cloud (peer to peer, peer to host). It also provides tools to improve productivity and performance anywhere for any approved users. Decisions and adjustments can be made in real time.

The owner of the business can have their own applications to set up. Such functions manage personnel (e.g., creating, adding, editing and deleting workers). This also permits personnel management by viewing a breadcrumb trail, set exception triggers, ping workers, get real-time status, find nearest, view workers on a map, etc. Installation tokens can be issued on provisioning or issuance of a ticket. This also allows schedule and dispatch to assign an installer to do the installs, monitor work progress, etc. This provides an active engaged environment so the owner knows exactly what is happening when and can see it updating and unfolding online.

Most owners of small businesses are busy and out in the field themselves. They can perform configuration and monitoring on their own smartphone or other mobile interface.

The worker's screen is a different user interface in an example non-limiting implementation. A particular worker is bound to the electronic device in the vehicle or other asset to thereby assign a driver to a particular vehicle via a smart phone. The workers can also see who else is in the field and where their reports are (if they are a supervisor for example). Work management has the need for dispatch and work assignments. Such scheduling and dispatch confirms arrival location at the customer location. The worker can report what they are doing in real time with their smartphone.

The third party installer can become a worker during the install, and can be tracked by the system. This enables the third party to be tracked and to track.

When you marry a smartphone with an installed device, there is logging associated with that. It is possible to synchronize and link, using a Bluetooth interface, the user with the device.

Worker functions include entering worker information such as by providing a token for install. A smart phone application can be downloaded, and the device can be synchronized for provisioning. Individual driver assignments can be provided for the mobile device and mobile interface device synchronization. Users can be granted access to the mobile device user interface.

Mobile applications can be used to integrate GPS tracking with work management and remote collaboration. GPS tracking is one piece of the solution. The application on the mobile device can provide additional functionality to the worker. Workflow control can be provided by such a mobile app. Location, communication and back office functions are all supported in an integrated manner.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. Apparatus for securely binding an asset to a human using computing intermediaries including a handheld computing device comprising a processor and a handheld communications device, the apparatus comprising:
   an asset computing device structured to be tamper-resistantly affixed to the asset, the asset computing device including an asset communications device and a processor disposed and structured to receive signals from at least one sensor; and
   non-transitory memory storing instructions that, when executed by the handheld computing device processor, provides a trust engine that securely binds a human with the handheld computing device using multi-factor authentication including biometrics;
   the asset computing device securely binding with the handheld computing device using at least one of a wired link and a wireless link between the asset communications device and the handheld communications device;
   the secure binding between the human and the handheld computing device and the secure binding between the asset computing device and the handheld computing device securely establishing and maintaining a trusted chain of custody association between the human and the asset.

2. The apparatus of claim 1 wherein the asset computing device comprises a housing that is affixable to the asset using tamper resistance, wherein the asset processor is disposed in the affixable housing.

3. The apparatus of claim 1 wherein the asset computing device includes a memory that stores further instructions that when executed by the asset computing device processor securely manages and executes downloadable applications including a load integrity application that ensures that items associated with the asset are also securely associated with the human.

4. The apparatus of claim 1 wherein the sensor comprises a geographical locating sensor.

5. The apparatus of claim 1 wherein the sensor comprises a biometrics sensor configured to authenticate the human.

6. The apparatus of claim 1 wherein the asset computing device processor is structured to securely receive inputs from the sensor over a wireless link, the sensor detecting events, the asset computing device processor securely associating the detected events with the human.

7. The apparatus of claim 1 wherein at least one of the processors is structured to securely authenticate and bind with an additional, portable device providing said sensor to thereby extend a secure chain of custody to bind additional items to the human.

8. The apparatus of claim 1 wherein at least one of the processors is structured to receive inputs wirelessly from a further sensor disposed in the handheld computing device.

9. The apparatus of claim 1 wherein the trust engine is structured to be securely managed and monitored remotely to ensure compliance of the trust engine to strictly defined behavioral norms including enforcement of fallback to a last good state.

10. The apparatus of claim 1 wherein the trust engine is structured to execute secure intelligent agents of a remotely located management entity.

11. A system for cooperating with a user having a user device, the system comprising:
a sensor that monitors the environmental events acting on an asset to enable determination of whether the asset has been harmed by the environmental events;
at least one intelligent communicating device associated with the asset and configured to provide a trusted intelligent agent that gathers environmental information from the sensor; and
at least one processor configured to securely bind (a) the user to the user device using multi-factor authentication including biometrics, (b) the user device to the intelligent communicating device, and (c) the user and the intelligent communicating device to the asset and any cargo contained therein, the at least one processor associating the user with information monitored by the sensor, thereby securely documenting events concerning the asset for which the user is responsible, the at least one processor providing a trust engine that securely binds with the user device using at least one of a wired link and a wireless link, the secure binding between the user and the user device and the secure binding between the intelligent communicating device associated with the asset and the user device securely establishing and maintaining a trusted chain of custody association between the user and the asset.

12. The system of claim 11 wherein the system uses plural intelligent communicating devices to bind asset to asset.

13. The system of claim 11 wherein the intelligent communicating device enables the system to continually monitor location and interactions, including chain of custody, of the asset over time.

14. The system of claim 11 wherein the system provides binding based on proximity.

15. The system of claim 11 wherein the user device includes a biometric sensor that the system uses to create an authenticated trust bond between the intelligent communicating device and the user.

16. The system of claim 11 wherein the intelligent communicating device is configured to be remotely securely dynamically updated/maintained/extended to return to a last good state.

17. The system of claim 11 wherein the user device comprises a conventional smartphone or other handheld user device providing a user interface capability, and the intelligent communicating device employs the handheld user device user interface capability to interface with the user.

18. The system of claim 11 wherein the intelligent communicating device provides a root of trust within an integrated circuit chip which prevalidates a software environment before starting up.

19. The system of claim 11 wherein the intelligent communicating device determines a trusted environment and once the trusted environment is operational, the system continually validates the trusted environment for health and sanity.

20. The system of claim 19 wherein if the system determines the intelligent communicating device is not acting in accordance with a prescribed healthy device, the system quarantines the intelligent communicating device and then remediates the intelligent communicating device by a side channel that can be reinitialized in accordance with a secure mechanism to bring the intelligent communicating device back to life.

21. The system of claim 11 wherein the system transforms a defensive node into an offensive mode that can be used to disrupt an existing infrastructure.

22. The system of claim 11 wherein the system uses frequency analysis and correlation on an engine or class of combustion engines, based on rpm and other attributes, correlated to vehicle OBD codes.

23. The system of claim 11 wherein the system dynamically defines behavior of the intelligent communicating device based on a set of facts from an asset to define an agent that is to take an action, and uses historical data to generate an alert to detect variance between planned and actual activities.

24. The system of claim 11 wherein the intelligent communicating device is hardware mechanically fixable to the asset, or a secure software entity that is authenticated to a user, the asset comprises a container used to deliver people/products/services, and the intelligent communicating device monitors the geolocation, operation and/or condition of the asset and/or biometrics of the user.

* * * * *